(12) United States Patent
Watanabe et al.

(10) Patent No.: US 6,169,516 B1
(45) Date of Patent: Jan. 2, 2001

(54) NAVIGATION SYSTEM AND MEMORIZING MEDIUM FOR MEMORIZING OPERATION PROGRAMS USED FOR THE SAME

(75) Inventors: Masaki Watanabe, Yokohama; Masayuki Takada, Kanagawa; Toshiaki Takahashi, Yokohama; Ken Oizumi, Tokyo; Norimasa Kishi, Yokohama; Satoru Hirose, Kanagawa, all of (JP)

(73) Assignee: Nissan Motor Co., Ltd., Kanagawa (JP)

( * ) Notice: Under 35 U.S.C. 154(b), the term of this patent shall be extended for 0 days.

(21) Appl. No.: 09/009,188

(22) Filed: Jan. 20, 1998

(30) Foreign Application Priority Data

Jan. 20, 1997 (JP) .................................... 9-007752
Jan. 20, 1997 (JP) .................................... 9-007845
Feb. 7, 1997 (JP) .................................... 9-024756

(51) Int. Cl.$^7$ ................................ H04B 7/185; G01S 5/02
(52) U.S. Cl. ................... 342/357.13; 701/208; 340/995; 345/419

(58) Field of Search .................. 342/357.13; 701/208; 340/995; 345/419, 420

(56) References Cited

U.S. PATENT DOCUMENTS 5,179,638 * 1/1993 Dawson et al. ...................... 395/125
5,566,073 * 10/1996 Margolin .
5,751,289 * 5/1998 Myers ................................. 345/419

FOREIGN PATENT DOCUMENTS 0802516    10/1997   (EP) .
4-125679    4/1992   (JP) .
7-220055    8/1995   (JP) .
8-124095    5/1996   (JP) .
9-138136    5/1997   (JP) .

* cited by examiner

Primary Examiner—Theodore M. Blum
(74) Attorney, Agent, or Firm—McDermott, Will & Emery

(57) ABSTRACT

A navigation system stereoscopically displays an area based on altitude information data of the actual terrain of the area, and puts thereon map display components such as roads, place manes and the like to form a stereoscopic map on the screen, which fits the actual view of the area.

49 Claims, 44 Drawing Sheets

(CONTOUR LINES)

CONNECTION FORM (1,2,6)
(2,7,6)
(2,3,7)
(3,4,7)
(4,6,7)
(4,5,6)
(5,1,6)

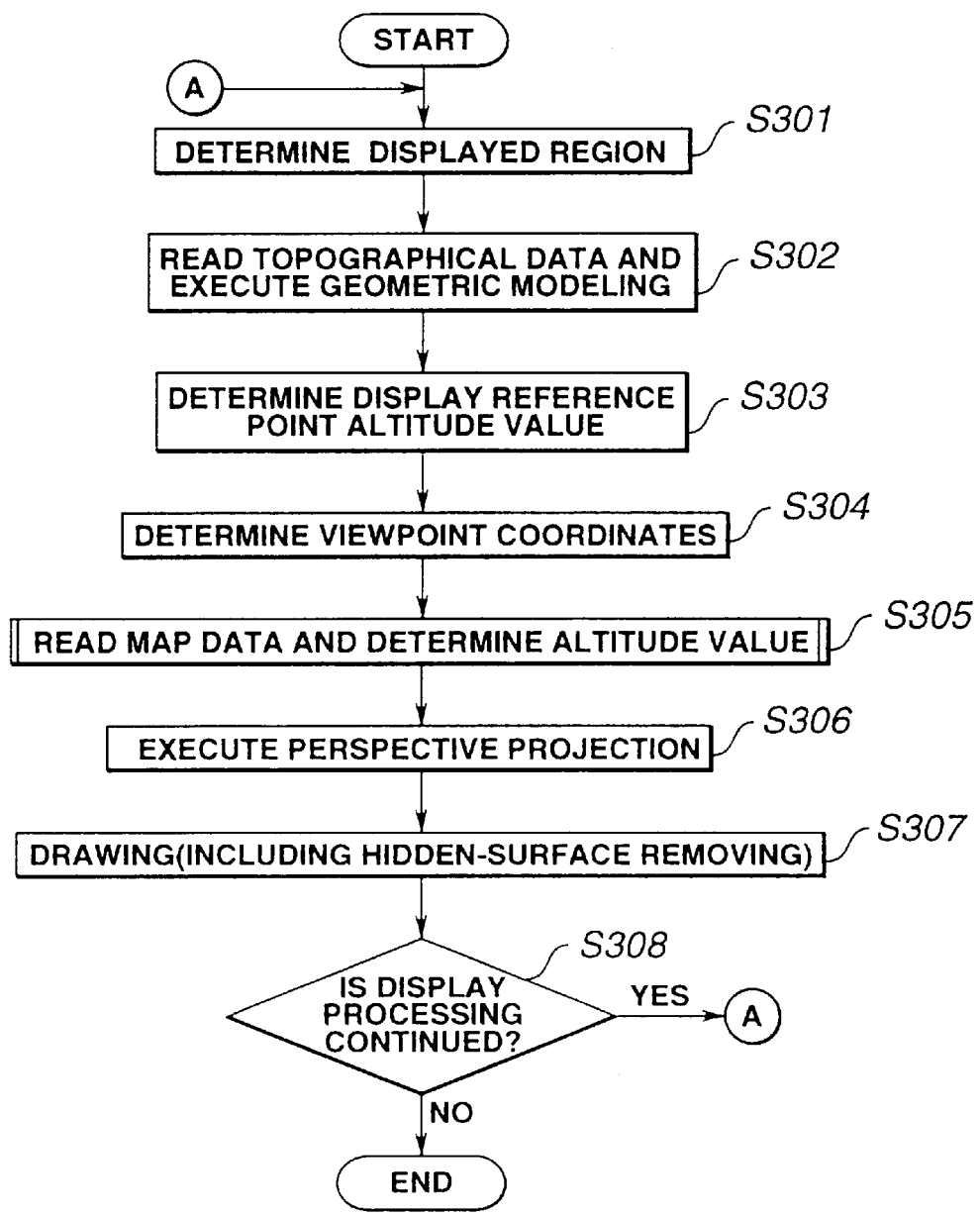

DISPLAY REFERENCE POINT(Px,Py)

ALTITUDE INTERPOLATION
FROM BOTH POINTS OF END

ADDITION OF INTERNAL
CONSTITUTIONAL POINT

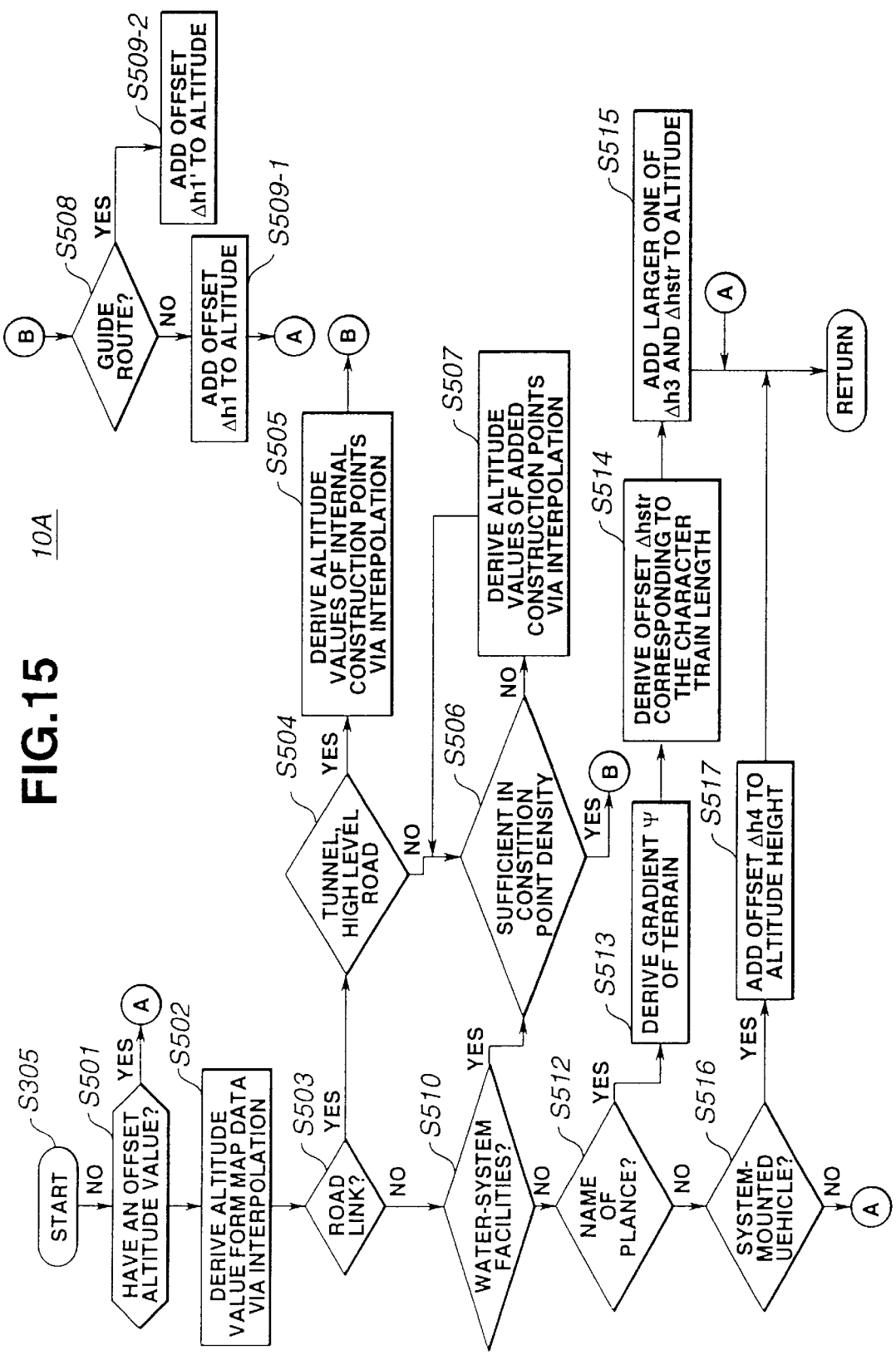

FIG.16
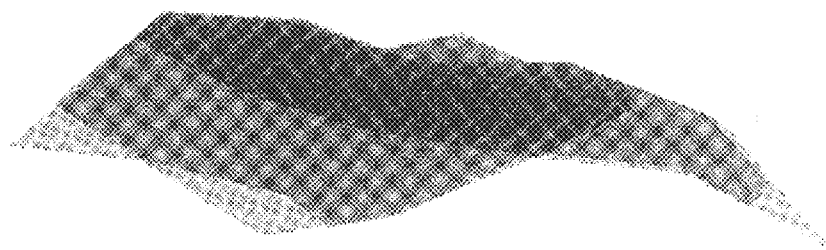
FIG.17
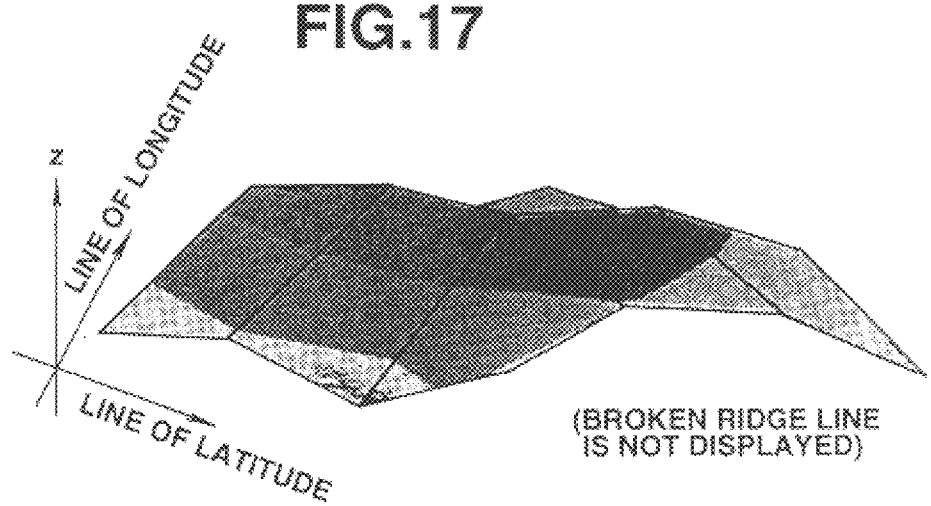
(BROKEN RIDGE LINE IS NOT DISPLAYED)
FIG.18A         FIG.18B
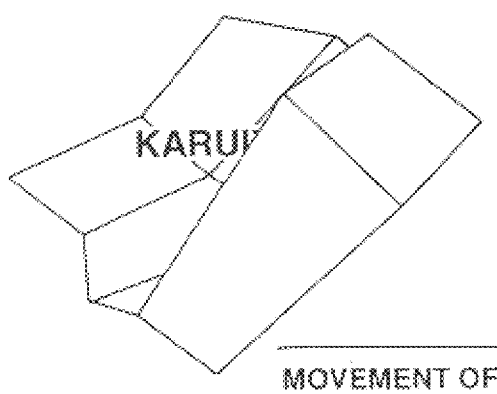   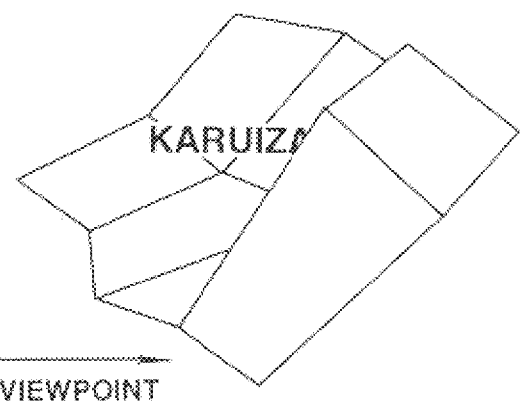
MOVEMENT OF VIEWPOINT

CROSS SECTION

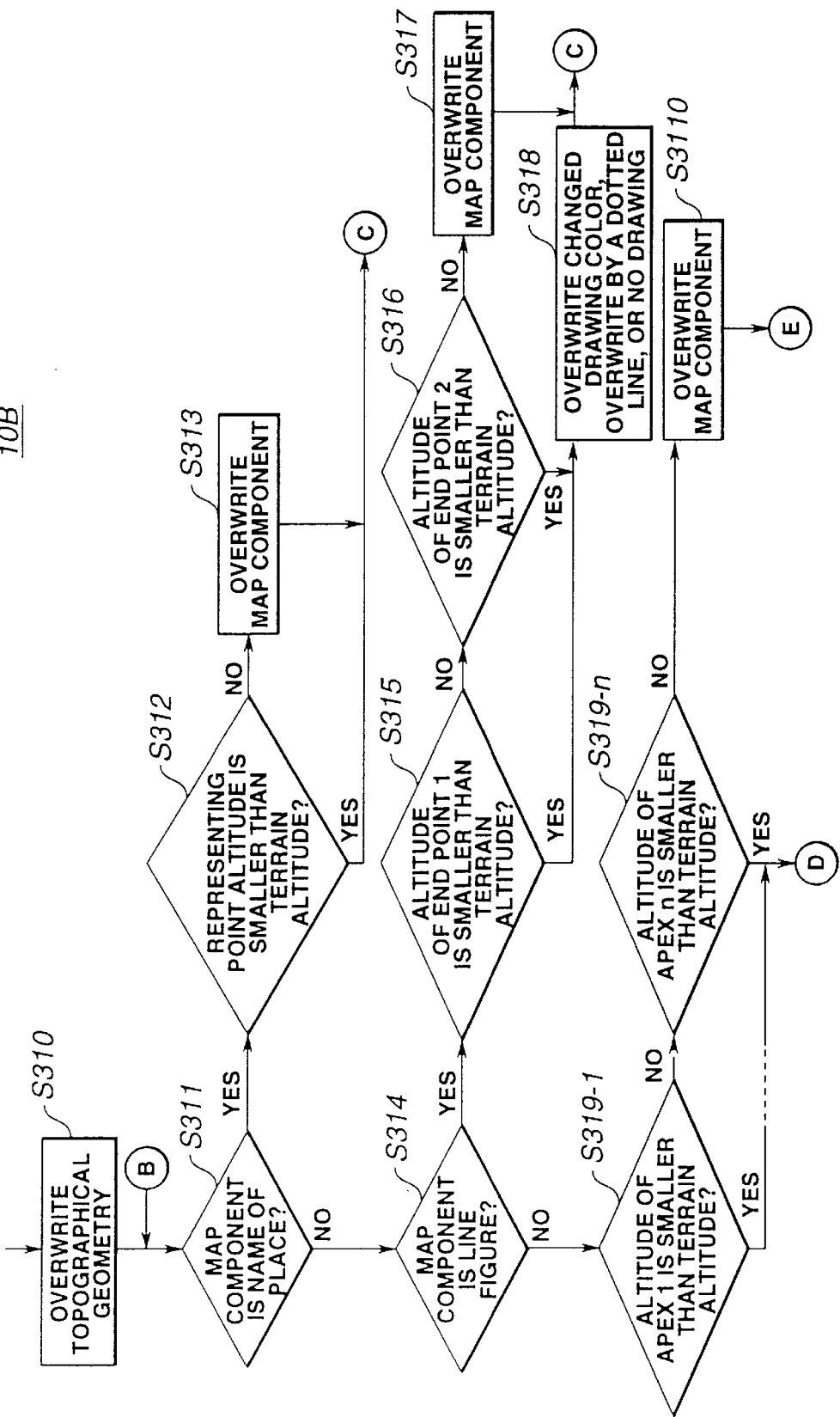

FIG.27
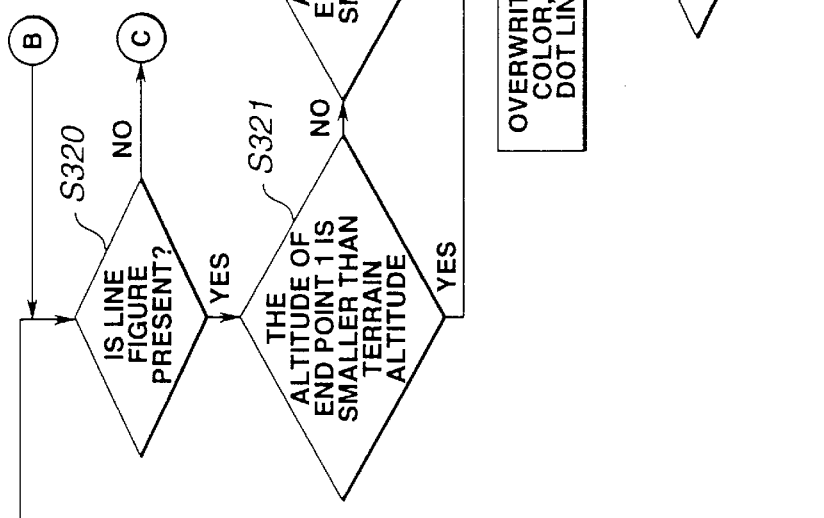
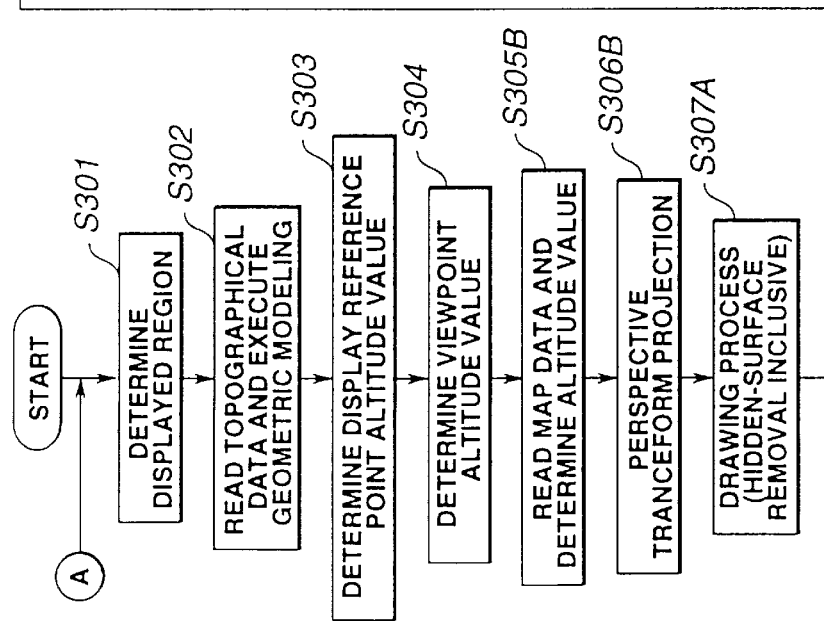

ALTITUDE CHANGING REGION

ORIGINAL GEOMETRIC MODEL

TOPOGRAPHIC GEOMETRY MODEL WITH ALTITUDE MODIFIED

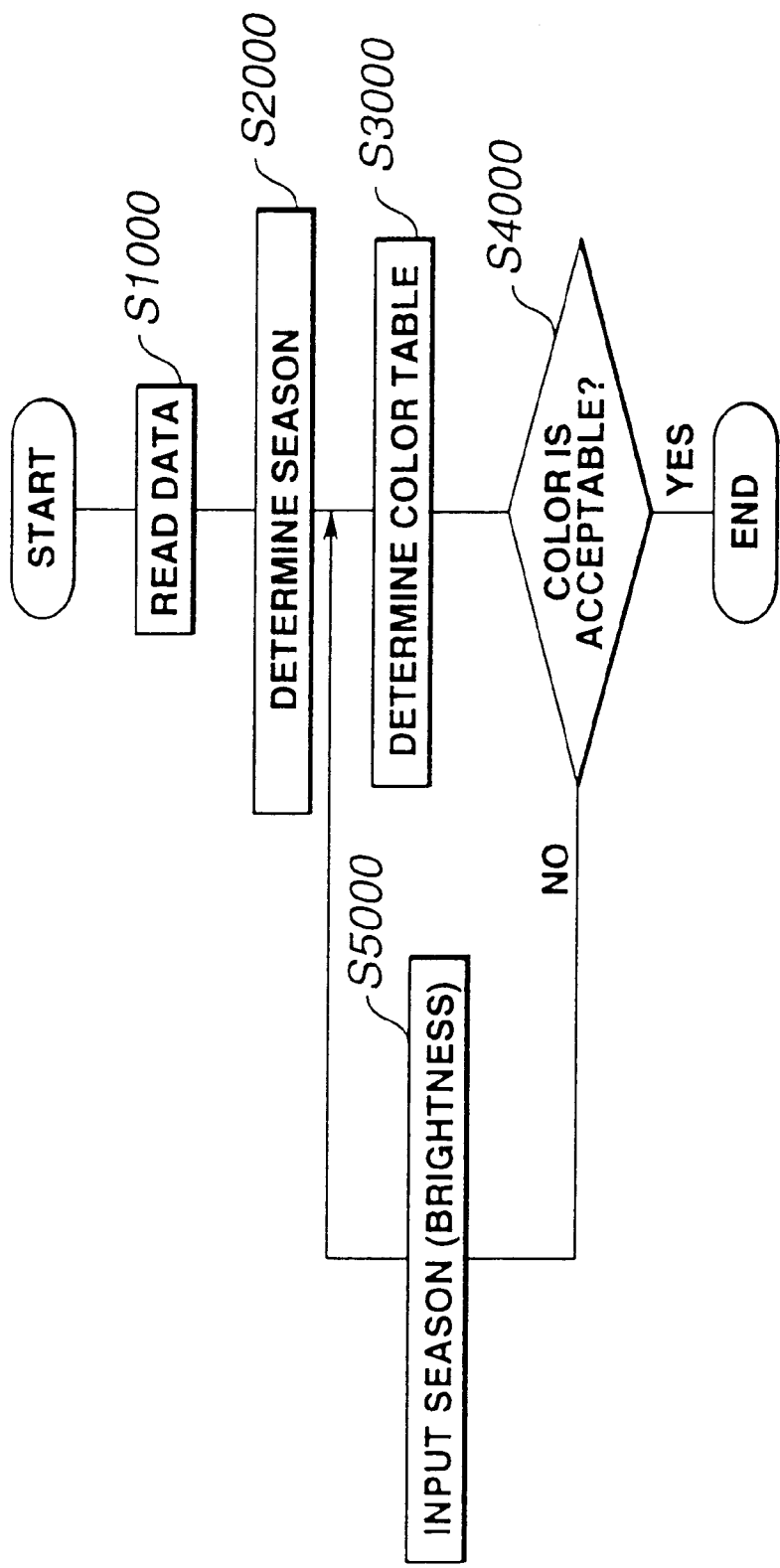

NAVIGATION SYSTEM AND MEMORIZING MEDIUM FOR MEMORIZING OPERATION PROGRAMS USED FOR THE SAME

The contents of Japanese Patent Applications 9-7752, 9-7845 and 9-24756, with filing dates January 20, January 20 and February 7 in Japan, are hereby incorporated by reference.

BACKGROUND OF THE INVENTION

1. Field of the Invention

The present invention relates in general to a navigation system of vehicle-installed type or hand-held type and a memorizing medium for memorizing operation programs used for the system. More specifically, the present invention is concerned with navigation systems of a type which displays topographical information and map information on a screen in the form of a stereoscopic birds-eye view and a memorizing medium for memorizing programs used for the system.

2. Description of the Prior Art

Hitherto, various navigation systems of the above-mentioned type have been proposed and put into practical use particularly in the field of motor vehicles. One of such navigation systems is described in Japanese Patent First Provisional Publication 7-220055. In the system of this publication, by using a global positioning system (viz., GPS) or a self-contained navigation system (viz., SCN), the current position of the user is detected and specified, or by manipulating a keyboard or a remote controller, a desired position is specified. The specified position is determined as a display reference point. Based on the display reference point and the direction of movement of a vehicle which has the navigation system mounted thereon, a viewpoint coordinate and a viewpoint direction are calculated and by applying a so-called perspective projection transformation to map information data stored in an external memory, the specified position is displayed on a screen in the form of a birds-eye view.

For ease of description, the vehicle on which the navigation system is mounted will be referred to as "system-mounted vehicle".

In the above-mentioned conventional system, the surrounding area of the system-mounted vehicle, that is, the area near the display reference point displays a larger and thus detailed map information and with increase of distance from the display reference point, the map information displayed region increases. Thus, this system is advantageous from a point of view that an entire road condition near and far from the user (viz., system-mounted vehicle) can be intuitively and instantly grasped by a viewer of the screen.

However, hitherto, the map data used for the navigation system is provided based on a so-called two dimensional coordinate system, and thus the ground or terrain for the background of the displayed map is shown as a flat surface. Accordingly, even in case of displaying an area whose ground is actually rugged, the screen is obliged to display the area as a flat surface. In particular, when the current position of the system-mounted vehicle is used as the display reference point, the displayed view fails to fit the actual view of the surrounding area of the vehicle. In this case, the viewer feels inconvenience in determining the viewer's current position and grasping the positional relation with the surroundings.

In the field of amusement, there are many types of application software which can display the terrain in a three dimensional mode. However, these software are of a type which displays only a fixed terrain, not of a type which displays road information and place name information needed for the navigation. More specifically, the software of such type displays only a fanciful world which has no connection with the actual terrain, and thus they can not be used as a part of the navigation system.

SUMMARY OF THE INVENTION

It is thus an object of the present invention to provide a navigation system which stereoscopically displays an area based on altitude information data of the actual terrain of the area, and puts thereon map display components such as roads, place manes and the like to form a stereoscopic map on the screen, which fits-the actual view of the area.

It is another object of the present invention to provide a navigation system in which even when the altitude value of the display reference point is changed, a topographical map view taken from a viewpoint is constantly displayed, which has a certain height relative to the display reference point.

It is still another object of the present invention to provide a navigation system which can display or show in a unique way a map display component (such as road or the like) which would be hidden from the displayed image due to presence of a high mountain or the like in front of the map display component.

It is a further object of the present invention to provide a navigation system which, when displaying a character train (place names or the like) for a certain map component hidden due to presence of a high mountain in front of the map component, can show the character train as if it is hidden by the high mountain.

It is a further object of the present invention to provide a navigation system which can constantly display or show the display reference point (such as a mark for indicating the position of the system-mounted vehicle) even when the system-mounted vehicle is running behind a high mountain.

It is a further object of the present invention to provide a navigation system which displays a background of map display components with a color which changes in accordance with the natural condition (such as season, weather, time, etc.,) under which the system-mounted vehicle actually runs.

It is a further object to provide a memorizing medium which memorizes programmed operation steps which are executed in the above-mentioned navigation systems.

BRIEF DESCRIPTION OF THE DRAWINGS

FIGS. 1 to 19C are drawings showing a first embodiment of the present invention, in which:

FIG. 1 is a functional block diagram of the embodiment;

FIG. 3 is an illustration depicting a construction of the other topographical information data;

FIG. 5 is a flowchart for explaining the process of displaying a map;

FIG. 6 is an illustration depicting the principle of determining a viewpoint and a displayed region;

FIG. 8 is an illustration depicting another method of determining sampling point in a displayed region;

FIG. 11 is an illustration depicting the principle of offset determination of displayed map component;

FIG. 15 is a flowchart for explaining the process of determining the altitude value;

FIG. 16 is an illustration showing one example of displayed polyhedrons produced based on the topographical information data;

FIG. 17 is an illustration showing another example of displayed polyhedrons produced based on the topographical information data;

FIGS. 18A and 18B are illustrations showing a change of a displayed view caused by movement of viewpoint;

FIGS. 19A, 19B and 19C are illustrations showing displayed examples each having a road partially concealed.

FIGS. 21 to 25B are drawings showing a second embodiment of the present invention, in which:

FIG. 21 is a functional block diagram of the embodiment;

FIG. 23 is an illustration depicting a display process for a concealed part of a road;

FIG. 24 is a front part of a flowchart for explaining the process of displaying a map; and FIGS. 25A and 25B show a rear part of the flowchart for explaining the process of displaying the map;

FIGS. 26 and 27 are drawings showing a third embodiment of the present invention, in which:

FIG. 26 is a functional block diagram of the embodiment; and

FIG. 27 is a flowchart for explaining the process of displaying a map;

FIGS. 28 to 32 are drawings showing a fourth embodiment of the present invention, in which:

FIG. 28 is a functional block diagram of the embodiment;

FIG. 29 is a flowchart for explaining the process of displaying a map;

FIG. 32 is an example of stereoscopic birds-eye views provided without setting the altitude changing region, so that a display reference point is concealed by a higher topographical part of the surrounding;

FIGS. 33 to 35 are drawings showing a fifth embodiment of the present invention, in which:

FIG. 33 is a functional block diagram of the embodiment;

FIG. 34 is a front part of a flowchart for explaining the process of displaying a map; and FIG. 35 is a rear part of the flowchart of explaining the process of displaying the map;

FIGS. 36 and 37 are drawings showing a sixth embodiment of the present invention, in which:

FIG. 36 is a functional block diagram of the embodiment; and

FIG. 37 is a flowchart for explaining the process of displaying a map;

FIGS. 38 to 40 are drawings showing a seventh embodiment of the present invention, in which:

FIG. 38 is a functional block diagram of the embodiment;

FIGS. 39A, 39B, 39C and 39D are illustrations depicting the displaying process employed in the seventh embodiment; and FIG. 40 is an illustration showing a stereoscopic birds-eye view of a road map provided by the seventh embodiment;

FIGS. 41 to 44C are drawings showing an eighth embodiment of the present invention, in which:

FIG. 41 is a block diagram of the embodiment;

FIG. 42 is a flowchart for explaining the process of changing the color with which a map information is displayed;

FIGS. 44A, 44B and 44C are graphs depicting the results of calculation of the vector luminance difference "ΔATD";

FIGS. 45 and 46 are drawings showing a ninth embodiment of the present invention, in which:

FIG. 45 is a block diagram of the embodiment; and

FIG. 46 is a flowchart for explaining the process of changing the color with which navigation map information is displayed.

DETAILED DESCRIPTION OF THE EMBODIMENTS

Referring to FIGS. 1 to 19C of the drawings, there is shown a navigation system 10A of a first embodiment of the present invention.

Figure 1:
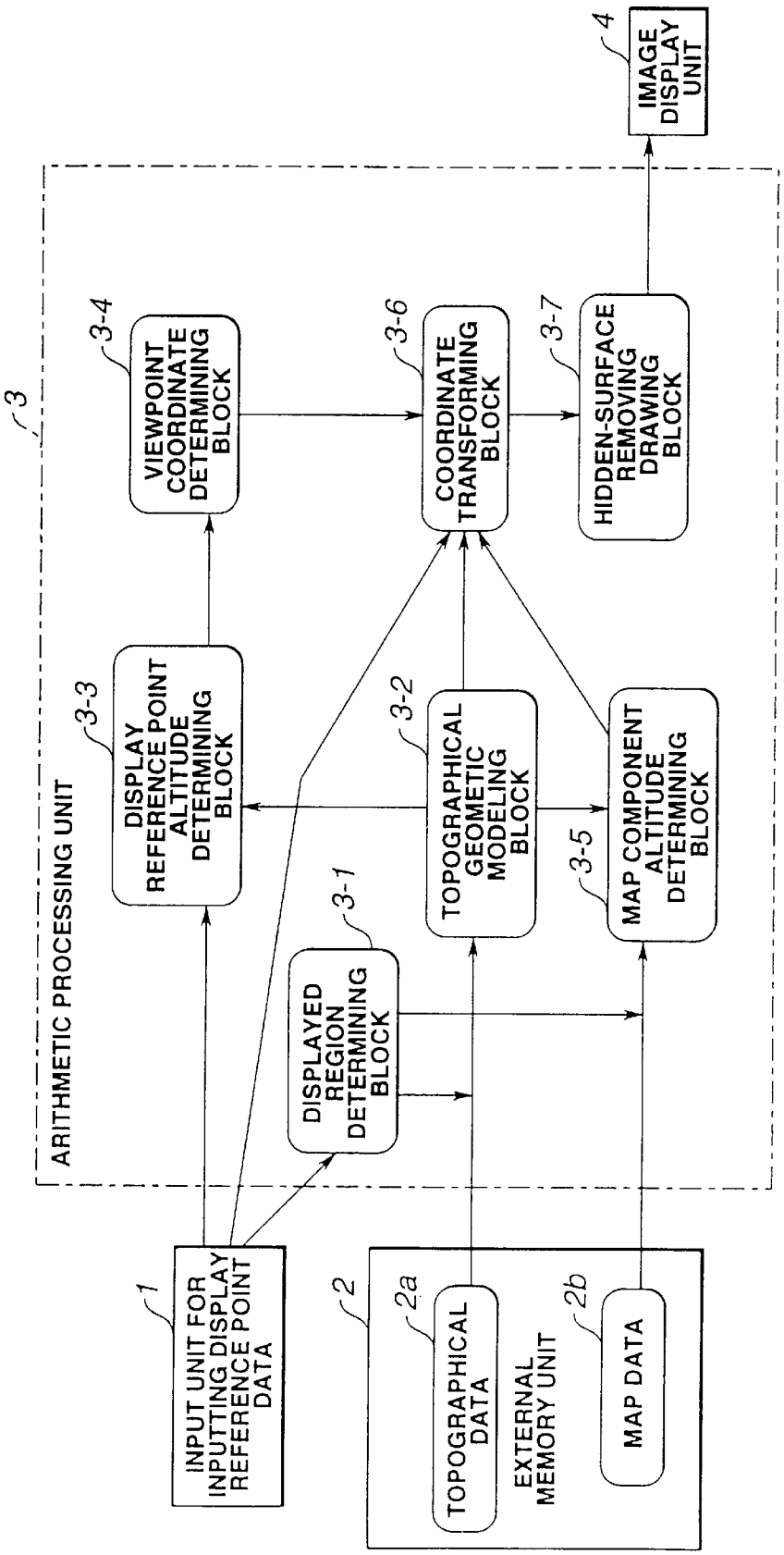

FIG. 1 shows a functional block diagram of the navigation system 10A.

The navigation system 10A comprises an input unit 1 which inputs display reference point data by which a display reference point position coordinate and a viewing line directional angle are derived. That is, by specifying the current position and the advancing direction of a system-mounted vehicle which have been detected by a GPS or a self-contained navigation system or by specifying a desired position and a desired advancing direction of the system-mounted vehicle by manipulating a keyboard or a remote controller, such display reference point data are inputted to the input unit 1. Designated by numeral 2 is an external memory unit 2 which memories both a topographical data 2$a$ including altitude value data and a map data 2$b$ including information on roads and place names. Designated by numeral 3 is an arithmetic processing unit or computer which includes a high speed CPU, a RAM, a ROM and input and output interfaces. Designated by numeral 4 is an image display unit which displays an image upon receiving a picture signal from the computer 3.

Figure 2A:
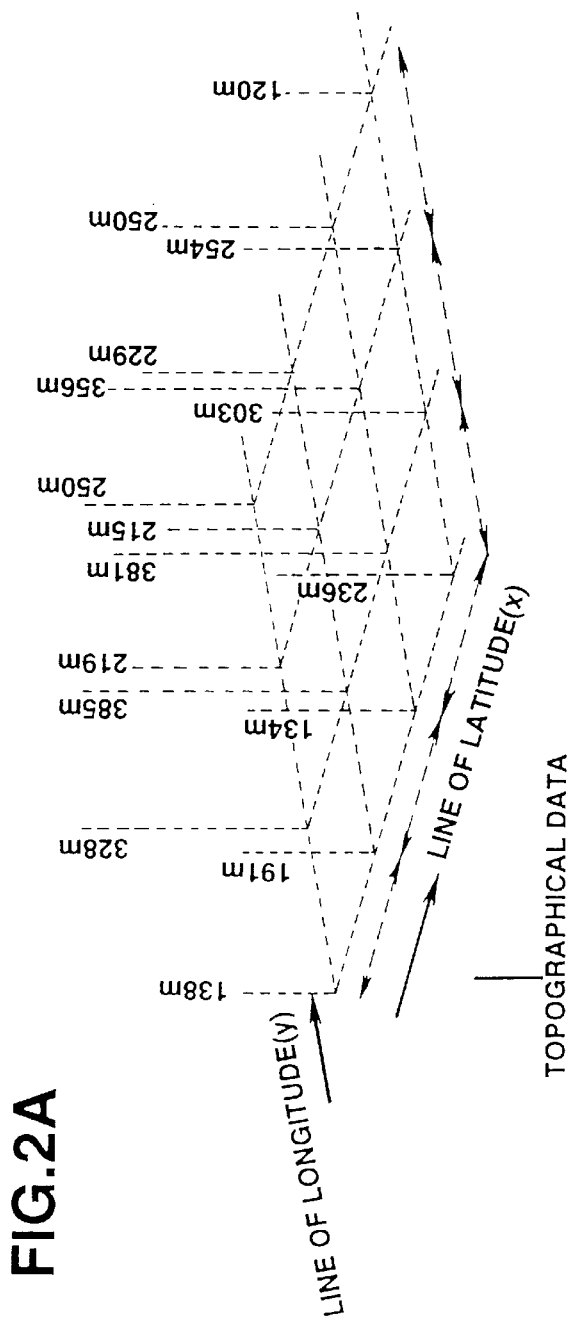
FIGS. 2A and 2B are illustrations depicting a construction of topographical information data.
Figure 2B:
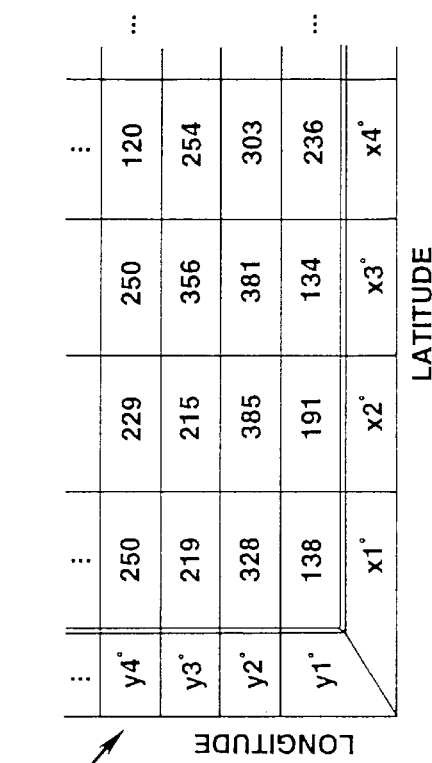

As is shown in FIG. 2A, the topographical data 2a is stored in the form of a matrix table, that is, the altitude value data at each longitude/latitude coordinate point is stored in the form of the matrix table. More specifically, sampling points of the data are evenly plotted on a horizontally flat surface at a given density, that is, for example, the sampling points are arranged on lattice points defined by evenly spaced lines of longitude (x) and evenly spaced lines of latitude (y). Each sampling point describes the actual altitude value.

The external memory unit 2 can memory some of the altitude value data on the sampling points of different density as topographical data each having a different accuracy, or data with a different accuracy. That is, for example, the altitude value data on the sampling points at every 100 m, at every 500 m and at every 5 Km are separately stored as three types of topographical data with respective accuracy. Furthermore, if the altitude value data on the sampling points at every 100 m are stored as a topographical data, the data can be directly used upon requirement of displaying a map. Furthermore, in this case, the altitude value data on every five sampling points can be stored as a topographical data of medium accuracy or the altitude value date on every fifty sampling points can be stored as a topographical data of lower accuracy.

Figure 3:
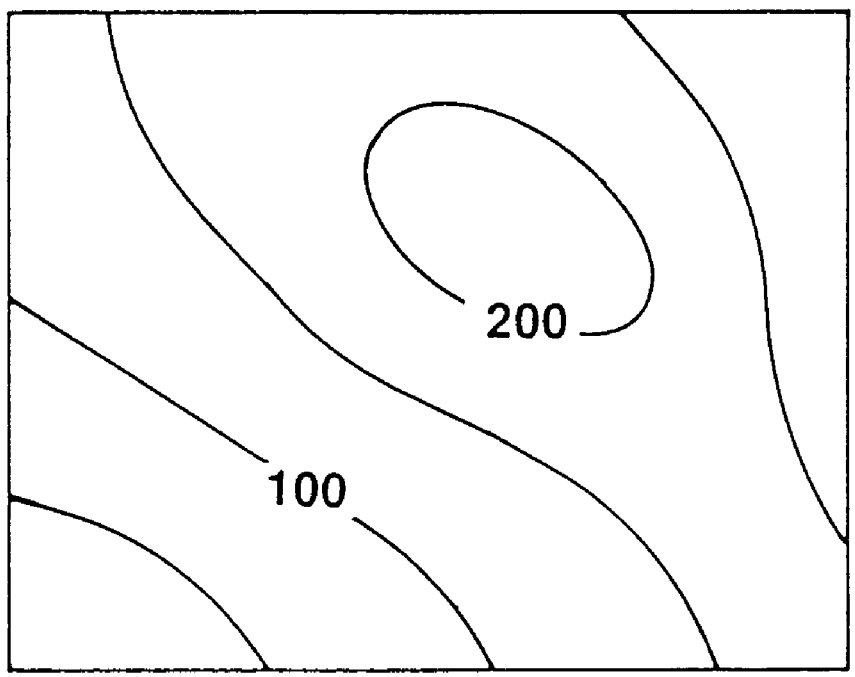

The data form for the topographical data 2a is not limited to the above-mentioned one. That is, as is shown in FIG. 3, the data form may be of a type wherein the data is represented by contour lines. Furthermore, the altitude value data may be stored in the form of a curved surface equation wherein with the latitude and longitude represented by "x" and "y", each altitude value "zz" is represented by "z=f (x, y)".

The map data 2b includes indication elements, such as roads, place names and the like which are to be put on a displayed map and information on the position of them, and if needed, information on attribute of them. For example, in case of a road to be displayed by ridgelines or group of ridgelines, a position coordinate of sequence of points each indicating a terminal end can be used as the information of the position, and in case of a lake, broad river, golf course and/or station yard (each being of surface graphics) to be displayed in the form of a polygon, a position coordinate of sequence points each indicating a vertex or a dividing point can be used as the information on the position of such water system and facility, the position coordinate being equipped with a connection form for each point as the attribute.

Figure 4A:
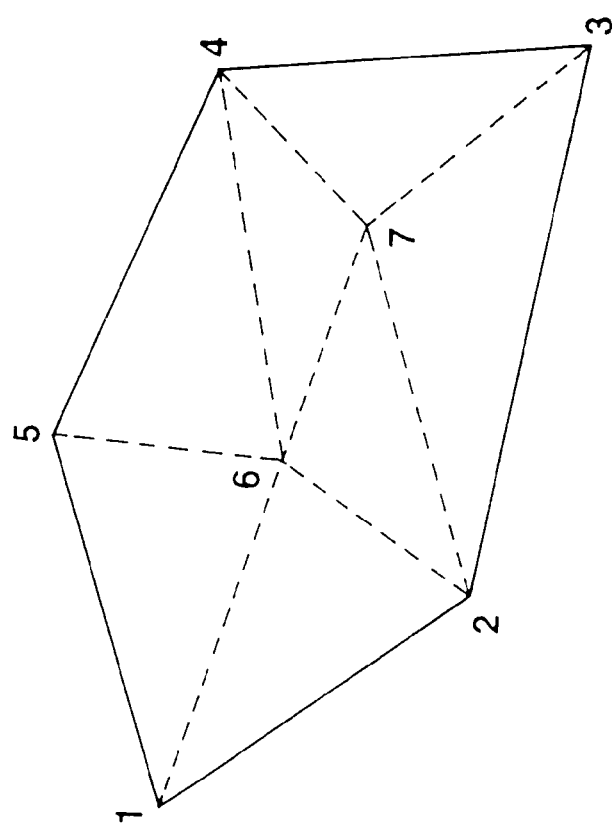
FIGS. 4A and 4B are illustrations depicting a construction of surface graphic data.
Figure 4B:
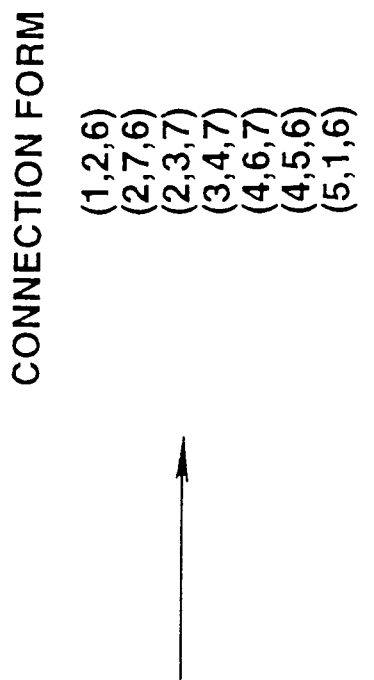

That is, in case wherein as is shown in FIG. 4A, a water system or facility is defined by vertexes 1, 2, 3, 4 and 5 and inner points 6 and 7, the connection form shown in FIG. 4B is stored as the attribute, which includes seven groups of vertex block. As is seen from the drawings, the seven groups of vertex block include each three vertexes of one of seven smaller triangles provided by the polygon having the vertexes 1, 2, 3, 4 and 5. When the water system or facility is to be displayed, the seven mutually contacting smaller triangles are described in accordance with the attribute, that is, the connection form.

In addition, for displaying the name of places and roads on a displayed map, the position coordinate for displaying a character train on the map is stored as information on the position and the character train is provided as attribute. The information on attribute of road link includes information on type of the road (viz., express-high-way, national road and prefectural road which are displayed in different colors) and information on form of the road (viz., normal road, tunnel, high level road and so on). These position information can be stored in the form of a two-dimensional coordinate including longitude and latitude lines or in the form of a three-dimensional coordinate including these longitude and latitude lines and an altitude value data. Furthermore, a guide route to destination obtained by having the CPU execute a specified program or a guide route set by the user himself is stored in an internal memory in such a manner that by setting a flag at each link of corresponding road, the guide route can be discriminated from normal roads. For example, in case wherein a road data is represented by connection of shorter straight lines (viz., links), the road data is processed to connect the coordinates "(x0, y0), (x1, y1), (x2, y2), (x3, y3) . . . (xn, yn) " by straight lines. When the road data thus represented in this manner is indicated as a guide route, a flag is set in each coordinate like the following "(x0, y0; 1), (x1, y1; 1), (x2, y2; 1), (x3, y3; 1) . . . (xn, yn; 1) ".

The arithmetic processing unit 3 has various function blocks which are a displayed region determining block 3-1, a topographical geometric modeling block 3-2, a display reference point altitude determining block 3-3, a viewpoint coordinate determining block 3-4, a map component altitude determining block 3-5, a coordinate transform block 3-6 and a hidden-surface removing drawing block 3-7.

The displayed region determining block 3-1 is a block which determines a displayed region of a map on a virtual horizontal plane placed on the same altitude as the display reference point. The topographical geometric modeling block 3-2 is a block which forms a three-dimensional data (x, y, z) by setting suitably distributed point groups in the displayed region determined by the block 3-1 and reading from the topographical data 2a an altitude value "z" corresponding to the plane coordinates (x, y) of each point, and forms a polyhedron (which indicates a topographical geometry) by connecting vertexes indicated by the three-dimensional data (x, y, z).

The display reference point altitude determining block 3-3 is a block which derives a coordinate value "Pz" of the display reference point in the direction "z" of height through interpolation from both the x, y coordinate value (Px, Py) of the display reference point inputted from the input unit 1 and the topographical geometry derived by the topographical geometric modeling block 3-2. The viewpoint coordinate determining block 3-4 is a block which derives the coordinate (Vx, Vy, Vz) of the viewpoint based on the coordinate (Px, Py, Pz) of the display reference point derived by the display reference point altitude determining block 3-3. The map component altitude determining block 3-5 is a block which reads from the map data 2b a map component data within the displayed region, and, if no altitude value is present, derives a corresponding altitude value through interpolation by executing the same processing as that of the display reference point altitude determining block 3-3. Furthermore, to reduce an error inevitably produced upon producing an approximate terrain and to lower inevitable blear of the display caused by an after-mentioned removing of hidden surface, the block 3-5 applies a slight offset to the derived altitude value.

The coordinate transform block 3-6 is a block which derives both a two-dimensional coordinate (Sx, Sy) on a displayed screen and a depth coordinate Sz on the same through a perspective projection transformation. The hidden-surface removing drawing block 3-7 is a block which compares the depth coordinate for each picture element and produces a stereoscopic map drawing signal which has a hidden-surface removing function. This is provided by drawing only picture elements whose depths are smaller than those already drawn. The block 3-7 outputs the stereoscopic map drawing signal to the image display unit 4 to cause the same to display a stereoscopic road map. The color of the drawing changes according to the altitude value of the map component, and different colors are allocated to the drawings of roads, rivers and place names. A loud color, such as red, yellow, or blue is allocated to the guide route.

In the following, operation of the above-mentioned navigation system 10A of the first embodiment will be described with reference to the flowchart of FIG. 5. The display processing for the image display unit 4 by the arithmetic processing unit 3 is so made that every time the display reference point inputted from the input unit 1 is updated, a series of processing steps repeats which includes determination of displayed region, reading of topographical and map data, determination of viewpoint coordinate, preparation of graphic data for display, coordinate transformation by a perspective projection method and drawing process such as clipping.

As is seen from the flowchart of FIG. 5, when the position coordinate of the display reference point and the viewing line directional angle are outputted from the input unit 1, the displayed region determining block 3-1 determines a displayed region of a map based on the position coordinate of the display reference point and the viewing line directional angle (S301). It is to be noted that the display reference point is a reference point in an image screen for determining a displayed position of the map, and the viewing line directional angle is an azimuth angle possessed by an orthogonal projection of a viewing line on a horizontal plane. As has been described hereinabove, as the input unit 1, GSP, self-contained navigation system, keyboard input device or remote controller type input device is used.

Figure 6:
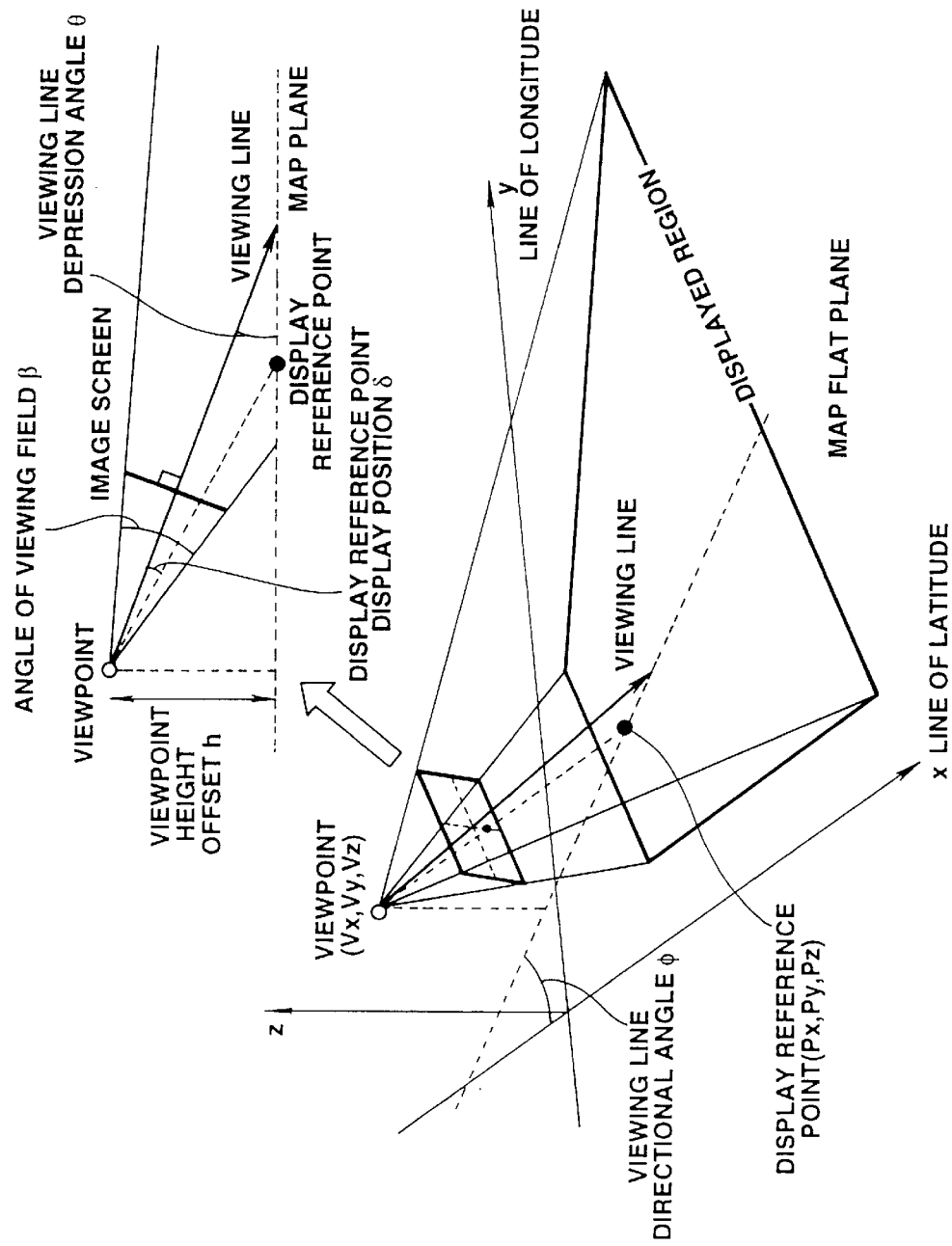

The positional relation between, the viewpoint, the display reference point and the display region will be described with reference to FIG. 6. Irrespective of the altitude value, the displayed region is specified by a two-dimensional coordinate system (x, y) whose two axes correspond to longitude and latitude. A horizontal plane having the same altitude as the display reference point will be assumed as a map plane. When the height of the viewpoint coordinate is described in terms of offset "h" from the altitude value of the display reference point, the positional relation depicted by FIG. 6 is always established irrespective of the altitude value, so that like in a conventional birds-eye type navigation system, the displayed region can be specified. That is, when the two-dimensional coordinate (Px, Py) and the viewing line directional angle "φ" except the altitude value of the display reference point are fed from the input unit 1, the displayed region can be specified by using viewpoint height offset "h", viewing line depression angle "θ", viewing field angle "β" and display reference point display position "δ".

Then, as is seen from FIG. 7, at the topographical geometric modeling block 3-2, a topographical data with a range sufficiently covering the displayed region derived at step S301 is read from the external memory unit 2 and a geometric modeling is executed (S302). In case wherein the displayed region is divided into several parts and each part uses a different data, the topographical data to be read for each part has a range sufficiently covering the part. In case wherein a part or entire of data needed in a current display processing has been already used in the last display processing and thus has been stored in the internal memory unit (not shown) of the arithmetic processing unit 3, the data can be used in the current display processing. With this, data transfer time can be reduced or saved.

Figure 7A:
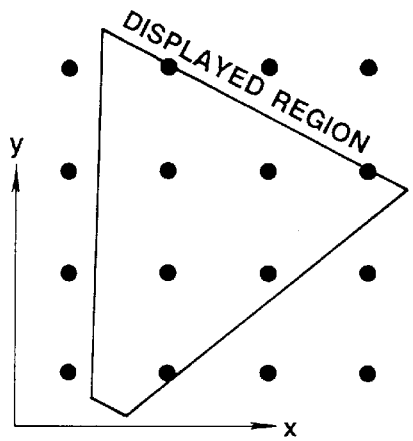
FIGS. 7A, 7B and 7C are illustrations depicting a modeling process for a topographical form.
Figure 7B:
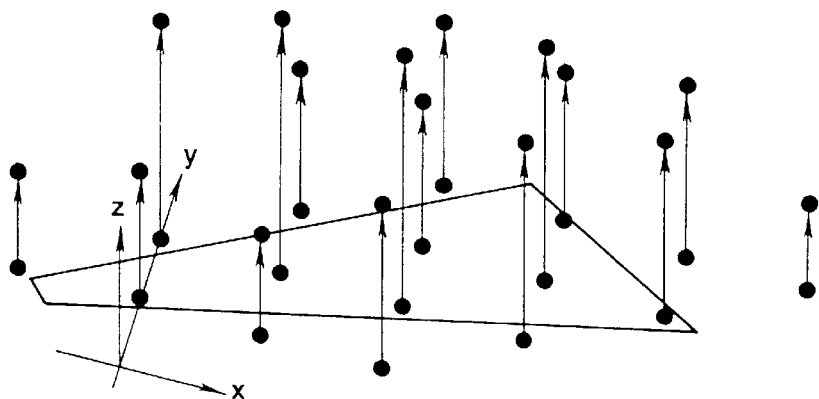

As is shown in FIG. 7(a), in the modeling of topographical geometry, sampling points included in a range which sufficiently cover the displayed region derived by the displayed region determining block 3-1 (viz., (x, y) point group in which the topographical data is registered) are set and altitude value data "z" is read at each sampling point. Furthermore, as is seen from FIG. 7B, a vertex in (x, y, z) coordinate is produced at each sampling point, and as is seen from FIG. 7C, vertexes whose latitude and longitude are adjacent to one another are connected to produce a smaller quadrilateral (which is not always plane), and each quadrilateral is divided into two smaller triangles (each having a plane) by a diagonal line which connects for example a vertex on a southeast position and another vertex on a northwest position. With this, a polyhedron is produced.

Figure 8:
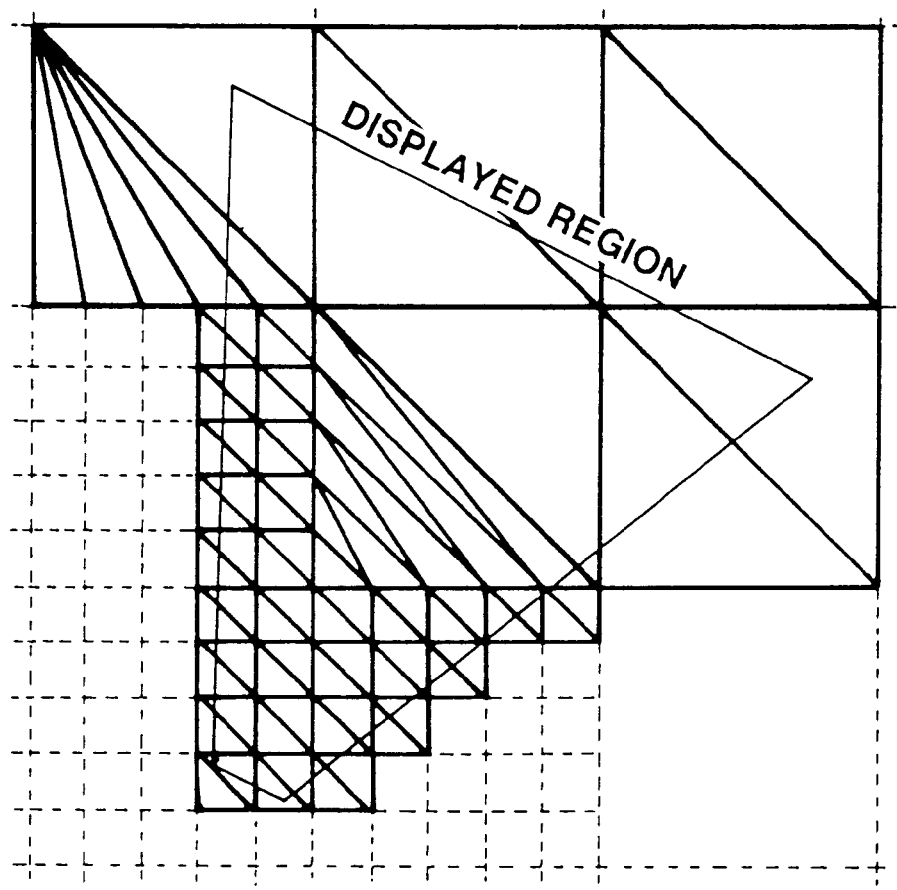

As is seen from FIG. 8, in case wherein a topographical geometry of a displayed region is modeled by using two types of topographical data which have different accuracy, a region near the viewpoint is made by using the topographical data of higher accuracy, a remote region from the viewpoint is made by using the topographical data of lower accuracy and a boundary portion where the two types of topographical data adjoin each other is made by connecting real partition points, so that all surfaces for constituting the polyhedron are triangle in shape.

Then, at the display reference point altitude determining block 3-3, an altitude value "Pz" of the display reference point (Px, Py) is determined (S303). In case wherein the input unit 1 inputs an altitude value "Pz" having a sufficient accuracy, the value "Pz" can be directly used. However, in case wherein a sufficient accuracy is not assured by the system and the altitude value "Pz" is not derived by the system, an approximate altitude value "Pz" is derived from the two-dimensional coordinate (Px, Py) of the display reference point and a topographical information data read at the step S302.

Figure 9A:
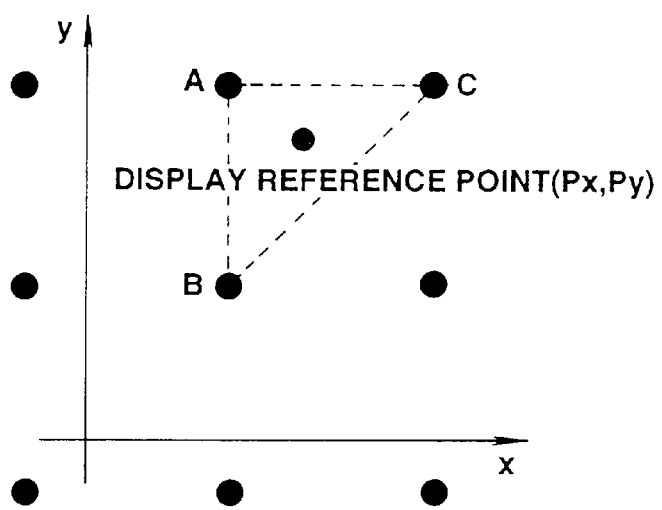
FIGS. 9A and 9B are illustrations depicting a method of deriving altitude value of a display reference point.
Figure 9B:
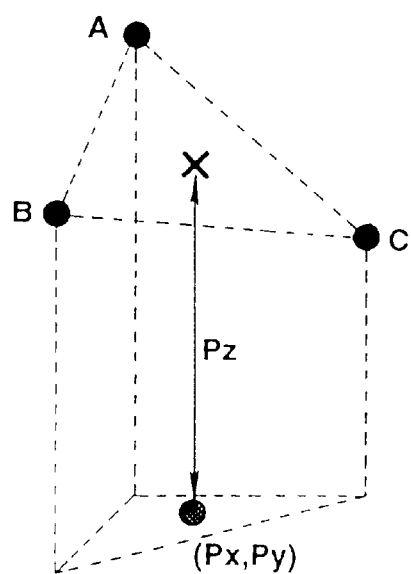

This method will be described with reference to FIGS. 9A and 9B. First, among the sampling points given the altitude values of the topographical information data, three points of the "xy" two-dimensional coordinate in the vicinity of the display reference point (Px, Py) are derived. Then, with the altitude values of these three points being designated by points A, B and C in a three-dimensional space, an equation of a plane passing through these points A, B and C is derived, and then, the value "z" obtained by putting "(x, y)=(Px, Py)" to the equation is put as the altitude value "Pz" of the display reference point. That is, when the position vectors of the three points A, B and C in the space are expressed by A, B and C, the value "Pz" is represented by the following equation (1).

$$Pz=[A(B\times C)-DxPx-DyPy]/Dz \qquad (1)$$

However, in this case, the equality:

$$(Dx,Dy,Dz)=(B-A)\times(C-A) \qquad (2)$$

is established and (Dx,Dy,Dz) represents vectors perpendicular to the plane defined by the three points A, B and C.

Then, at the viewpoint coordinate determining block 3-4, to the altitude value Pz derived in the above-mentioned manner, there is added a predetermined viewpoint height offset value "h" to derive a value Vz (=Pz+h) of the viewpoint coordinate in the direction of height. Furthermore, the xy coordinate (Vx,Vy) of the viewpoint is derived based on the viewing line directional angle (S304). That is, with reference to FIG. 6, the viewpoint coordinate (Vx,Vy,Vz) is calculated based on the following equation (3).

$$\begin{bmatrix} Vx \\ Vy \\ Vz \end{bmatrix} = \begin{bmatrix} Px - h\cot(\theta + \delta)\cos\varphi \\ Py - h\cot(\theta + \delta)\sin\varphi \\ Pz + h \end{bmatrix} \quad (3)$$

Then, at the map component altitude determining block 3-5, based on the display region determined by the displayed region determining block 3-1, map component data, such as roads, place names and the like in the determined display region are read from the map data 2b of the external memory unit 2. If no altitude value data is present, corresponding altitude value is derived through interpolation like in the case of deriving the altitude value of the display reference point, and offset processing is made to the altitude value.

That is, the map data 2b has position coordinates of various map display components as positional information. When the position information is described in a two-dimensional coordinate (x, y), three sampling points are specified for each map display component like in the case of the display reference point, and from the topographical data read at step S302, the altitude value data for the three sampling points are looked up, and based on the above-mentioned equation (1), the altitude value of each map display component is derived.

Figure 10A:
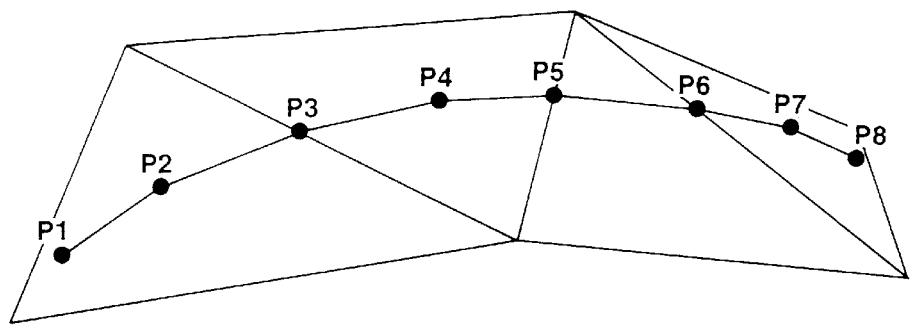
FIGS. 10A and 10B are illustrations depicting the principle of altitude interpolation for a road in a tunnel and the principle of addition of internal constitutional points of the road.
Figure 10B:
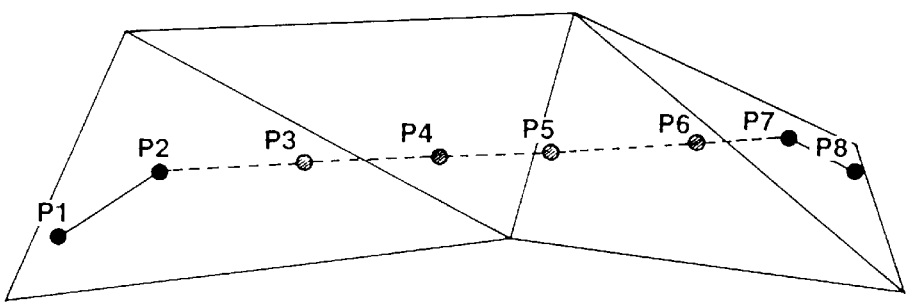

If in this case the map display component is a road link, an exceptional process as depicted by FIGS. 10A and 10B is carried out. It is now assumed that there is a road link constituted by sequence of points. If the altitude values derived from the topographical data through interpolation are added to construction points and displayed with the topographical geometry, such an image as shown in FIG. 10A is provided. Since each altitude value is derived to match an altitude value on the ground level, entire of the road links P1 to P8 extends along the ground level. If, in an actual road, a portion corresponding to the sequence of points P2 to P7 is a tunnel, the display of FIG. 10A lacks a reality.

Accordingly, if, in addition to the position information of the construction points of the road link, the map data 2b is provided with a data as to whether the links of attribute information correspond tunnel or not, the following calculation is carried out. That is, first, the altitude values of both ends P2 and P7 of a link train P2 to P7 are derived based on the topographical data, and then, by using the results of this derivation, the altitude values of inner construction points are derived. That is, in case of FIG. 10B, by checking the attribute information, it becomes known that the points P2 to P7 correspond to a tunnel. Thus, the altitude values h2 and h7 of the end points P2 and P7 are derived from the topographical data through interpolation, and the altitude values h3, h4, h5 and h6 of the inner construction points P3, P4, P5 and P6 are derived by applying a proportional distribution to the altitude values h2 and h7 of the points P2 and P7 in accordance with the distance between each point P3, P4, P5 or P6 to each of both points P2 and P7. That is, the altitude value hi of each point in the tunnel is calculated from the following equation (4).

$$h_i = (d_{2i}h_7 + d_{i7}h_2)/d_{27} \quad (4)$$

In this case, djk is a distance obtained by adding values from Pj to Pk. When the road links and topographical geometry are displayed based on the altitude values thus derived, such a display as shown in Fig. 10B is provided in which a part extending between the road links P2 and P7 is shown as a tunnel.

In case wherein due to shortage of the number of construction points by which the links are defined, connecting the construction points by straight lines can not represent an actual condition, it is necessary to indicate ups and downs along the topographical geometry. In this case, a process for adding internal construction points to the condition of FIG. 10B is carried out to obtain the condition of FIG. 10A. That is, in case wherein as is shown in FIG. 10B the road links are defined by P1, P2, P7 and P8 (in this case, the road links by P2 to P7 show a long straight road), the internal construction points P3, P4, P5 and P6 are added to the space between the end points P2 and P7 and respective position coordinates (x, y) of them are derived, and by carrying out a processing similar to the processing through which the altitude value of the display reference point is derived through interpolation, the altitude values h3, h4, h5 and h6 of the points are calculated, and as is shown in FIG. 10A, the road links P2 to P7 are actually illustrated extending on and along the ground level. When the density of the internal construction points is lower than that of the sampling points (that is, when the link is longer), additional construction points are added to a space between the internal construction points in the road link. This point adding process is repeated until the density of entire of the internal construction points becomes higher than that of the sampling points. Thereafter, based on the topographical data, the altitude values of the points P3 to P6 are derived.

The above-mentioned correction process is applied to also road links indicating a high level road. In this case, the topographical geometry has a recessed form. That is, in case wherein the part between the points P2 and P7 is a high level road, the attributes of the construction points of the points P2 to P7 induce that the road links of these points indicate a high level road. Upon this, the links of the construction points P3 to P6 between the points P2 and P7 are displayed to extend over a depressed ground surface. Furthermore, in case wherein as is shown in FIG. 10B, a long road link extends between the points P2 and P7 and there is a depressed ground surface therebetween, additional construction points are added to a space between the construction points P2 and P7, and this point adding process is repeated until the density of entire of the internal construction points becomes higher than that of the sampling points. Thereafter, based on the topographical data, the altitude values of the points P3 to P6 are derived. To the altitude values of the map display components derived in the above-mentioned manner, or if the position information on the map display components is described in the map data in the form of a three-dimensional coordinate, to the altitude values indicated as the coordinate value in the direction of height, the following offset processing is carried out to provide a coordinate value in the direction of height to which a slight offset is applied.

In an after-mentioned drawing process, the hidden-surface removing drawing process is carried out. That is, for example, when a certain plane and a straight line which is to be intimately present on the plane are displayed, it tends to occur that the display of the straight line has a blear and the image of the same is partially hidden by the plane due to the display definition and/or rounding error of the calculating part. In displaying a stereoscopic map, this undesired phenomenon should be avoided. (However, in displaying an after-mentioned reference line, such blearing is practically used). Thus, in producing the graphic data of the map display components, such as roads and the like, the coordinate value of the component in the direction of height is slightly increased. Since derivation of an optimum offset value for the coordinate value is difficult and such derivation tends to induce overload of the CPU, stepwise changing values are used as will be described in the following.

Figure 11:
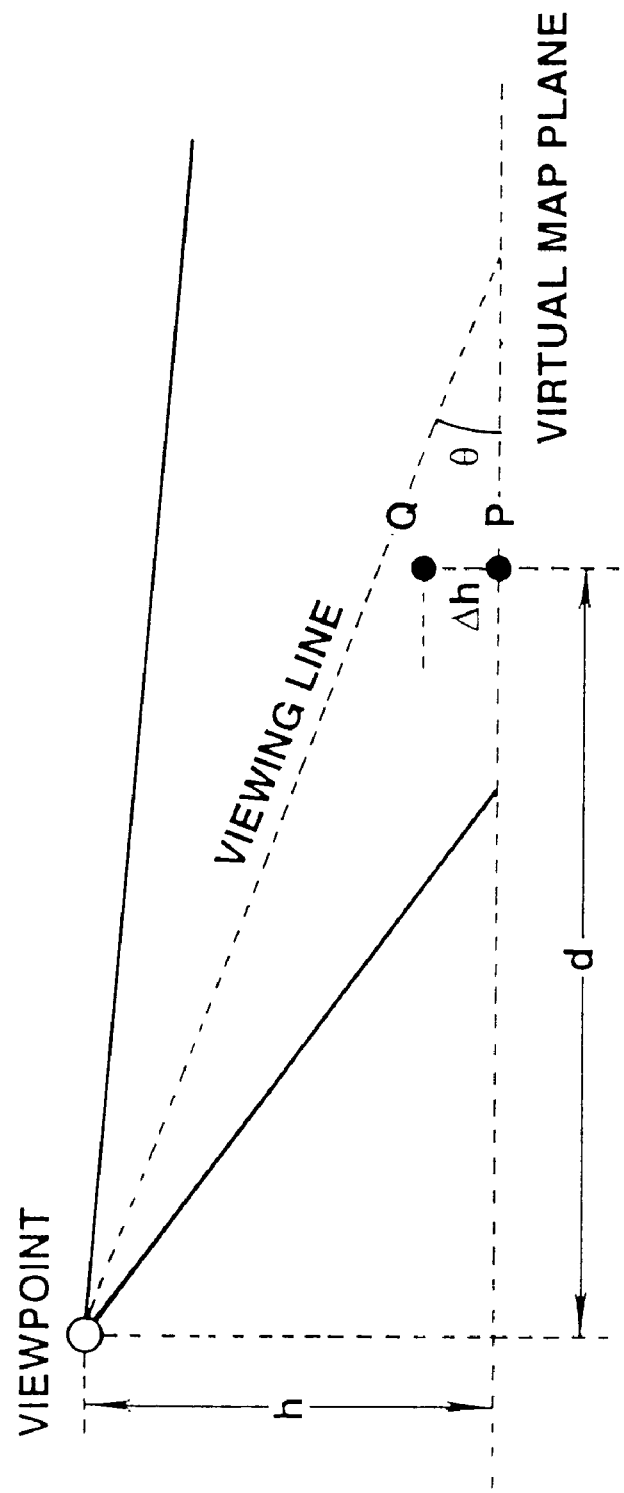
Figure 12A:
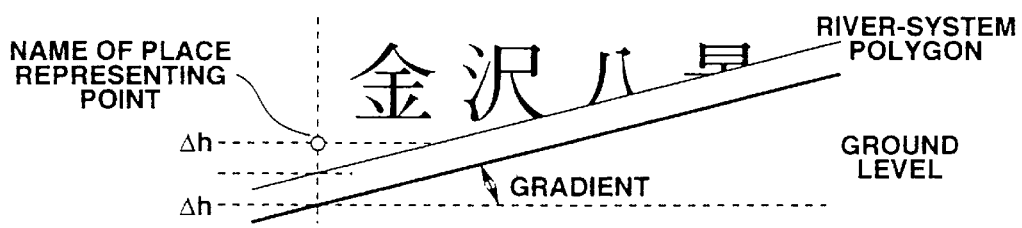
FIGS. 12A and 12B are illustrations depicting a concealing phenomenon wherein part of a character train is concealed.
Figure 12B:

As is shown in FIG. 11, now, it is assumed that the point "P" is placed on a virtual map plane lower than the viewpoint by an offset "h" and is apart from the viewpoint by distance "d". If a point upper than the point "P" by "$\Delta h$" is denoted by point "Q", clear displaying of the point "P" on a virtual map plane in the displayed stereoscopic map needs the following condition. That is, the difference between depth coordinates "Pdepth" and "Qdepth" derived from the points "P" and "Q" through an after-mentioned perspective projection transformation should be greater than the resolution of a predetermined depth coordinate. The value "Qdepth" is derived from the following equation (5).

$$\text{Qdepth} = (f+n) - fn/[d \cos \theta + (h - \Delta h) \sin \theta] \quad (5)$$

It is to be noted that "f" and "n" are upper and lower limit values of the depth coordinate for defining a space for the perspective projection transformation. Thus, if derived depth coordinate is not present within such range, clipping process is executed and thus corresponding point is not displayed. The value "Pdepth" is derived from the equation (5) with the value "$\Delta h$" substituted by 0. Thus, the difference "$\Delta$depth" between "Pdepth" and "Qdepth" is derived from the following (6).

$$\Delta\text{depth} = \text{Pdepth} - \text{Qdepth} = fn\Delta h \sin \theta / (d \cos \theta + h \sin \theta)^2 \quad (6)$$

If the memory capacity of a resistor for storing the depth coordinates is assumed "M", that is, if the depth coordinates are assumed to be held by integers with a range from "0" to "M−1", the resolution "Res" is represented by the following equation (7) considering that the depth coordinate subjected to the display ranges from "n" to "f" as has been described hereinabove.

$$\text{Res} = (f-n)/(M-1) \quad (7)$$

By deriving the value "$\Delta h$" from the equations (6) and (7) under the condition of "$\Delta$depth >Tes", necessary condition for the height-offset "$\Delta h$" is obtained. In the equation (6), the value "$\Delta$depth" increases as the value "d" decreases, that is, the value "$\Delta$depth" shows a larger value to the value "$\Delta h$" with decrease of the distance between the point "P" and the viewpoint. Thus, if the value "$\Delta h$" of a certain point apart from the viewpoint by a distance "d" is used constantly as the offset, a point placed nearer to the viewpoint than the certain point always satisfies the necessary condition. Actually, since points at a great distance from the viewpoint have a displayed image compressed, the visibility of the points in the screen is low. Thus, even when the points are displayed while being offset in height, satisfied advantage is not obtained. Thus, by solving a conditional expression using the value of "$\Delta$depth" determined when "d" is "h cos $\theta$", that is, when the point "P" is in an intersection between the viewing line and the virtual map plane, the following equation (8) is obtained.

$$\Delta h > (f-n)h^2/(M-1)fn \sin^3\theta \quad (8)$$

Although the above description is directed to the case wherein the point "P" is placed on the virtual map plane, necessary condition is changed when the height distance between the viewpoint and the point "P" changes. Since the ground level which actually has a free curved-surface is represented by a polyhedron figure, the error of the height difference between the road (or the like) and the ground level is remarkable. Accordingly, the condition derived by the equation (8) shows only a rough barometer. That is, in practical use, the value "$\Delta h$" should be much greater than the right side of the equation (8).

Furthermore, in case wherein the map display components stored as the map data $2b$ include polygons of lake, river (these are water system) and golf course and station yard (these are facilities), the altitude value of the road should be offset upward relative to the offset altitude values of the water system and the facility. Thus, when the offset for the altitude values of the water system and facility uses "$2\Delta h$", the offset for the road may use "$2\Delta h$". The offset "$2\Delta h$'" for the altitude value of the guide route is set greater than that "$2\Delta h$" of the road.

Furthermore, when there is need of displaying a certain mark (viz., current position mark for the system-mounted vehicle) for indicating the current position of the system-mounted vehicle which corresponds to the display reference point, the offset for the altitude value of the mark may be set $2\Delta h$. In this case, the display reference point of the mark is not hidden by the water system and the facility. Furthermore, if the offset for the lo altitude value of the mark is set $3\Delta h$, the display reference point of the mark is not hidden by the road.

In case of producing the graphic data for displaying place names, that is, in case of producing a character train, offset treatment is needed to the altitude value. The position information on the place names is stored in the map data $2b$ in the form of a coordinate of a representing point which specifies the displayed position of the character train on a map. Accordingly, making the altitude value of the representing point offset upward above the ground level is not a main purpose. However, as is seen from FIG. 12, if the height coordinate of the representing point is arranged in agreement with a lower edge of the character train, a correction in the altitude value is needed so that the altitude value of the lower edge of the character train is greater than that of the ground level and/or the display component for clearly displaying the entire of the character train.

Figure 13A:
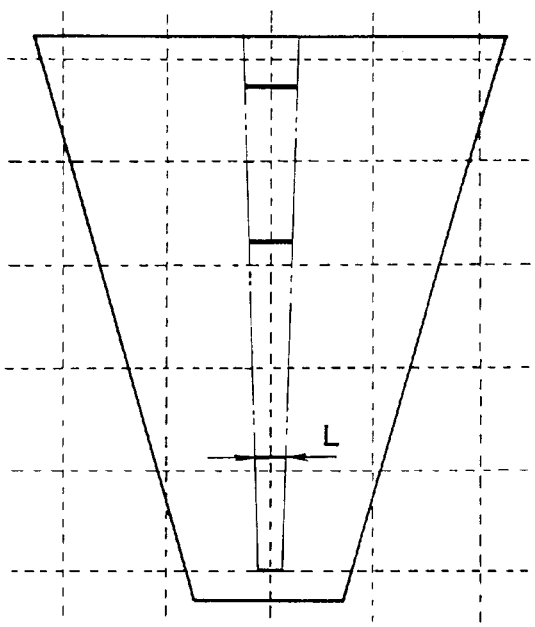
FIGS. 13A and 13B are illustrations showing relative and absolute distances of a character train of a place name in terms of size of a map.
Figure 13B:
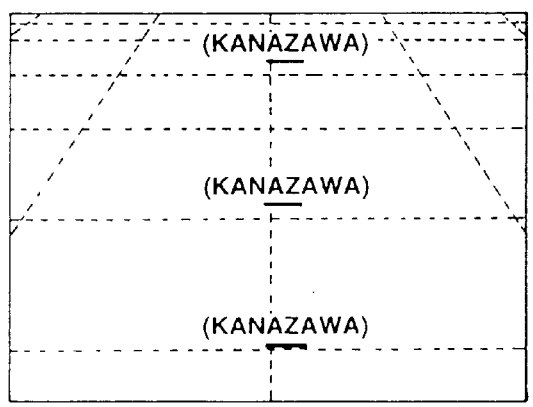

The character train of the place name has a certain length. Thus, as is seen from FIG. 12, when the ground level is inclined, it tends to occur that even when the represent point is placed above the ground level, one part of the character train is hidden by the ground level. In order to avoid this undesired phenomenon, the offset value for the character train is determined in accordance with the gradient (or inclination) of the ground level as well as the length of the character train. As is shown in FIG. 13A, the length of the character train is constant in every position of the displayed image provided through the perspective projection transformation. Thus, as is seen from FIG. 13B, when the character train is displayed in the map space, the length of the character train relative to surrounding displayed components is seen to change according to displayed position. Thus, as a representing value, a real space distance "L" corresponding to the width of one character placed at or near a center of the character train is previously derived, and the representing value is multiplied by the number of the characters of the character train to derive the length of the character train. From the two-dimensional coordinate of the representing point, three topographical data sampling points near the representing point are derived, and from the surface geometry given by the three sampling points, the maximum gradient "$\psi$" is derived. That is:

$$\tan\psi = \sqrt{Dx^2 + Dy^2} / |Dz| \qquad (9)$$

It is to be noted that Dx, Dy and Dz are derived from the equation of (2).

Figure 14A:
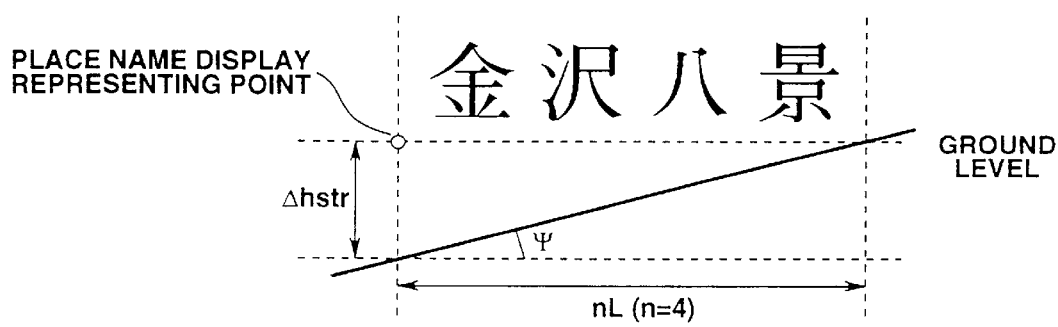
FIGS. 14A and 14B are illustrations showing an example of offset determination of character train of the place name, the character trains in FIGS. 14A and 14B being written in Japanese and English respectively.
Figure 14B:
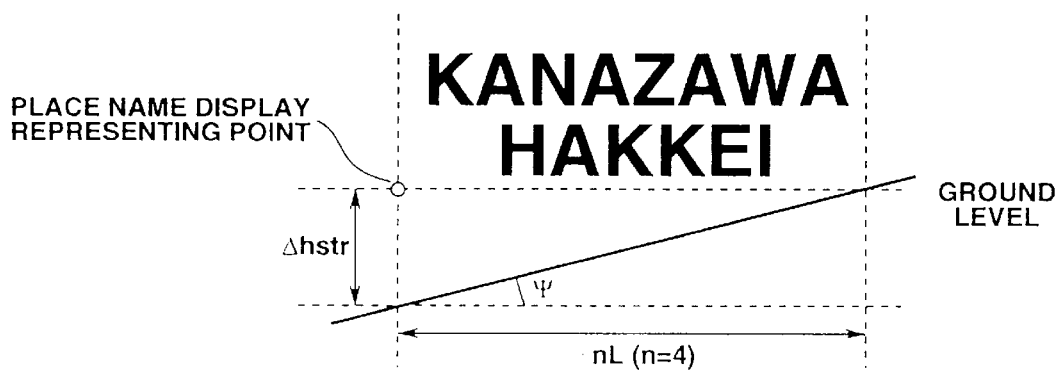

From the above-mentioned values, the offset "Δhstr" for the altitude value of the character train, which is suitable for the length of the train, is derived, as is depicted in FIGS. 14A and 14B. That is:

$$\Delta hstr = nL \tan\psi \qquad (10)$$

In case wherein the number of the characters of the character train is great and the gradient of the ground level is also great, the value "Δhstr" becomes great. Thus, in this case, in tends to occur that the character train is displayed at a position extremely far from a desired display position. For avoiding this undesired phenomenon, an upper limit of the value "Δhstr" may be previously provided. That is, if the right side of the equation (10) exceeds the upper limit, the value of the upper limit is used as the "Δhstr". When the gradient of the ground level is small, the value of the "Δhstr" is small. Thus, in this case, it tends to occur that the altitude value of the character train becomes smaller than the altitude value of the polygon of the water system and/or the facility which is offset by "Δh". For avoiding this undesired phenomenon, a lower limit of the value "Δhstr" may be previously set to for example 2Δh. In this case, the offset for the altitude value of the character train uses the larger one between the value 2Δh and the right side of the equation (10).

The flowchart of FIG. 15 depicts in detail the step S305 (see FIG. 5) executed by the map component altitude determining block 3-5. At step S501, judgment is carried out as to whether each of the map display components has been provided with an offset altitude value or not. If YES, the operation flow returns. While, if NO, that is, when there is a map display component whose altitude value has been offset yet, an offset treatment for the altitude value is carried out in this routine in the following manner.

That is, in such case, similar to the case of the above-mentioned display reference point, based on the equations (1) and (2), an altitude value interpolation for the map display component is carried out with reference to the topographical data 2a (S502). Then, at step S503, judgment is carried out as to whether the map display component is a road link or not. If YES, the operation flow goes to step S504 to judge whether the map display component is one of a tunnel and a high level road, or not. If YES at step S504, that is, when the map display component is one of a tunnel and a high level road, the operation flow goes to step S505. At this step, based on the equation (4), the altitude values of internal construction points are derived from the altitude values of both end points through interpolation. If NO at step S504, that is, when the map display component is not a tunnel nor a high level road, the operation flow goes to step S506. At this step, judgment is carried out as to whether the construction point density of the road link is sufficient or not. If NO, that is, if the construction point density is not sufficient, the operation flow goes to step S507. At this step, the road link is divided to add construction points thereto, and the altitude values of the added construction points are derived from the topographical data.

If YES in the step S506, that is, when the construction point density is sufficient, the operation flow goes to step S508. At this step, judgment is carried out as to whether the altitude values of the construction points are for a guide route or not. If NO, that is, when the values are for a normal road, not for a guide route, the operation flow goes to step S509-1 where a predetermined offset value "Δh1" (for example, 2Δh) is added to the altitude values. While, if YES, that is, when the values are for the guide route, the operation flow goes to step S509-2 where a predetermined larger offset value "Δh1'" (>Δh1) is added to the altitude values.

If NO at step S503, that is, if the map display component is not a road link, the operation flow goes to step S510. At this step, judgment is carried out as to whether the map display component is one of the water system and the facility or not. If YES, the operation flow goes to step S511 where a smallest offset value "Δh2" (for example, Δh) is added to the altitude values. If NO, the operation flow goes to step S512. At this step, judgment is carried out as to whether the map display component is a place name or not. If YES, the operation flow goes to step S513 where the gradient "$104$," of the terrain is derived. That is, from the two-dimensional coordinate of the representing point of display of the place name, three topographical data sampling points near the representing point are derived, and from the surface geometry given by the three sampling points, the maximum gradient "ψ" is derived. Then, the operation flow goes to step S514 where an offset value "Δhstr" corresponding to the length of the character train is derived. The operation flow goes to step S515 where larger one of the offset value "Δhstr" and a predetermined lower limit value "Δh3" is added to the altitude value of the representing point.

If NO at step S512, that is, when the map display component is not a place name, the operation flow goes to step S516. At this step, judgment is carried out as to whether or not the map display component is the system-mounted vehicle. If YES, the operation flow goes to step S517 where a largest offset value "Δh4" is added to the altitude value of the vehicle.

With the above-mentioned manner, the altitude values of all of the map display components are determined. Then, the coordinate transform block 3-6 carries out the perspective projection transformation of the step S306 of the flowchart of FIG. 5. In this step, a perspective projection transformation is applied to the display graphic data such as the topographical geometry data, the map display component data and the display reference point data to derive coordinate values of them on a displayed screen. The transformation is represented by the following equation (11).

$$T = \begin{bmatrix} Ds & 0 & 0 & 0 \\ 0 & Ds & 0 & 0 \\ 0 & 0 & -(f+n) & -fn \\ 0 & 0 & -1 & 0 \end{bmatrix} \begin{bmatrix} 1 & 0 & 0 & 0 \\ 0 & \sin\theta & \cos\theta & 0 \\ 0 & -\cos\theta & \sin\theta & 0 \\ 0 & 0 & 0 & 1 \end{bmatrix} \times \begin{bmatrix} \sin\phi & -\cos\phi & 0 & 0 \\ \cos\phi & \sin\phi & 0 & 0 \\ 0 & 0 & 1 & 0 \\ 0 & 0 & 0 & 1 \end{bmatrix} \begin{bmatrix} 1 & 0 & 0 & -Vx \\ 0 & 1 & 0 & -Vy \\ 0 & 0 & 1 & -Vz \\ 0 & 0 & 0 & 1 \end{bmatrix} M \qquad (11)$$

Designated by reference "M" is a vector which is given by providing the map space coordinate (Mx, My, Mz) of the display graphic data with "1" as a fourth component. Designated by Vx, Vy and Vz are viewpoint coordinates derived from the equation of (3). References "φ" and "θ" designate respectively the viewing line directional angle and angle of depression, references "f" and "n" designate upper and lower limit values which define a clipping range of the depth coordinate, and reference "Ds" designates a theoretical distance between the viewpoint and a displayed screen in terms of picture element.

With the transformation, a homogenous coordinate "T= (Tx, Ty, Tz, Tw)" is derived. The two-dimensional coordinate (Sx, Sy) used for drawing is derived from the condition "Sx=Tx/Tw, Sy=Ty/Tw". The depth coordinate is represented by "Sz=Tz/Tw".

After the transparent projection transformation is finished, the hidden-surface removing drawing block 3-7 carries out the drawing operation of the step S307 of the flowchart of FIG. 5. That is, at this step, the drawing process is executed to output corresponding signal to the image display unit 4, so that a stereoscopic birds-eye view of a road map is displayed on the screen. In this drawing process, a clipping treatment is applied to each draw component which has been subjected to the coordinate transformation. Clipping in the direction of "x" and "y" is so made that only the draw components whose coordinates (Sx, Sy) are within a predetermined drawing range are drawn. Clipping in the direction of depth is so made that only the draw components which satisfy "n≦Sz≦f" are drawn. In the draw components to be drawn, the depth coordinates are compared, so that only draw components whose depths are smaller than those of draw components which have been already drawn are newly drawn. With this, drawing of a stereoscopic map is achieved with effective removing of hidden surface.

Each draw component to be drawn is displayed using a predetermined color. For example, in case of the topographical geometry, as is seen from FIG. 16, the color continuously changes in accordance with the altitude value of the displayed component. That is, in this case, the correspondence between the altitude values and colors applied to them is previously determined and the altitude values are parted into several groups which are for example 0–50 m range group, 50–100 m range group, 100–200 m range group, 200–400 m range group and above range group. The altitude values in the same range group are applied with the same color.

In addition to drawing surfaces of a polygon which represents the topographical geometry, the ridgeline defined between the adjacent surfaces may be drawn, as is shown in FIG. 17. Among all ridgelines, only ridgelines having the same directions as the latitude and longitude lines are drawn, and dotted ridgelines are not drawn. With this, the ridgelines are clearly displayed to raise the stereoscopic effect possessed by the displayed topographical geometry. In addition, the azimuth in the stereoscopic map is clearly recognized by viewers.

For drawing each draw component, corresponding picture elements on the displayed screen are drawn with predetermined color. When a picture element positioned at a screen coordinate "(Sx, Sy)" is drawn, a corresponding depth coordinate Sz is stored in a register corresponding to the coordinate (Sx, Sy). With this, when then the same picture elements (viz., (Sx, Sy)) are drawn for a different draw component, a new depth coordinate "Sz1" is compared with a value "Sz0" which has been stored in the corresponding register. When the value "Sz1" is smaller than "Sz0", that is, when the draw component intended to be drawn later is nearer to the viewpoint, the color for the picture elements and the depth coordinate stored in the register are updated. While, when the value "Sz1" is greater than "Sz0", such updating is not carried out. This process is called "Z-buffering" and is one of hidden-surface removing techniques. That is, in this technique, irrespective of order of drawing each draw element, any draw component near the viewpoint is constantly drawn with the picture elements.

With this Z-buffering, as is shown in FIGS. 18A and 18B, the back side draw component is displayed with a part thereof hidden, the part being overlapped on the same viewing line. In accordance with movement of the viewing point, the visible region gradually changes, so that the image on the screen can have a reality.

Figure 19A:
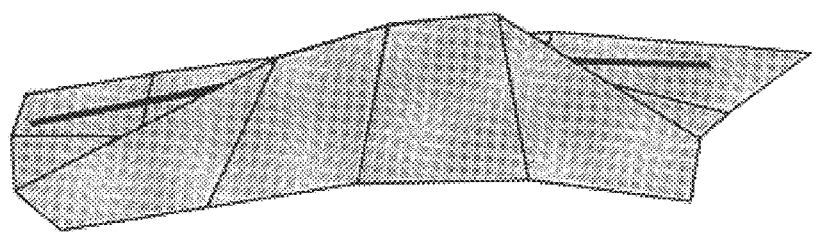
Figure 19B:
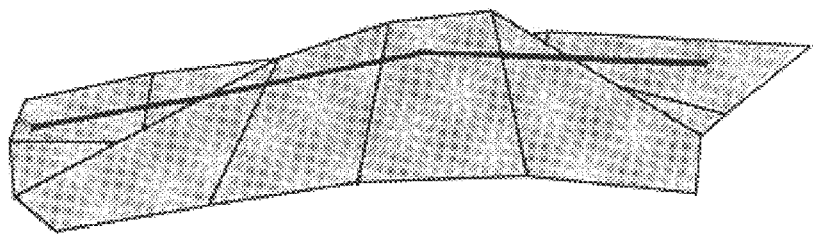
Figure 19C:
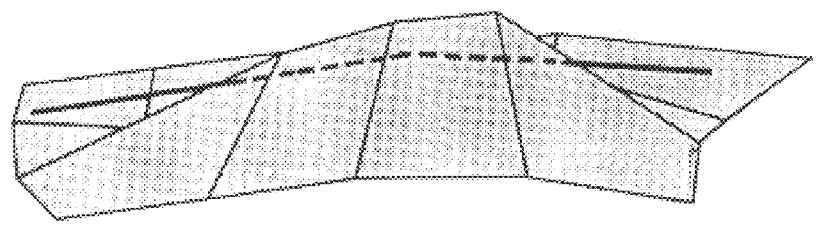

If, as is shown in FIG. 19A, a draw component, such as guide route, would have a part which is hidden due to the Z-buffering irrespective of its important information, such measures as depicted by FIGS. 19B and 19C may be employed. That is, in the measure of FIG. 19B, the part corresponding to the hidden part is drawn with a different color, and in the measure of FIG. 19C, the corresponding part is drawn with a dotted line. For these measures, after the topographical geometry and the road link are drawn through normal Z-buffering, a reversed condition is set for the comparison between the depth coordinates Sz0 and Sz1, so that the road link far from the viewpoint is drawn with a different color or drawn with a dotted line. For the different color, a color provided by mixing the original color of the road link and the color of the topographical geometry may be used. With this, there is given the impression that the hidden road is seen through the topographical geometry.

By executing the processes to step S307 (see FIG. 5), one stereoscopic map image to be displayed by the image display unit 4 is produced. Then, at step S308, judgment is carried out as to whether the map display processing is continued or not. If YES, the operation flow goes back to step 5301 to repeat the above-mentioned processes. If NO, the above-mentioned processes are ended, and then, subsequent processes, such as, a process for detecting the system-mounted vehicle, a process for calculating the guide routing and the like are followed.

Figure 20:
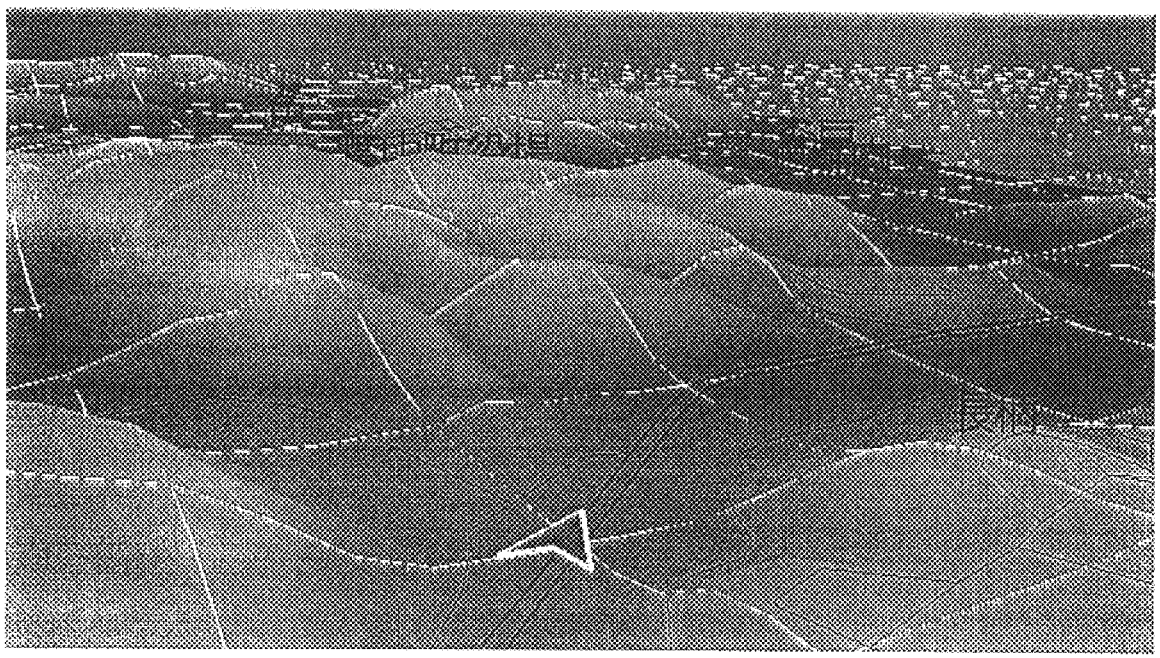
FIG. 20 is an illustration showing a stereoscopic birds-eye view of a road map provided by the first embodiment.
Figure 21:
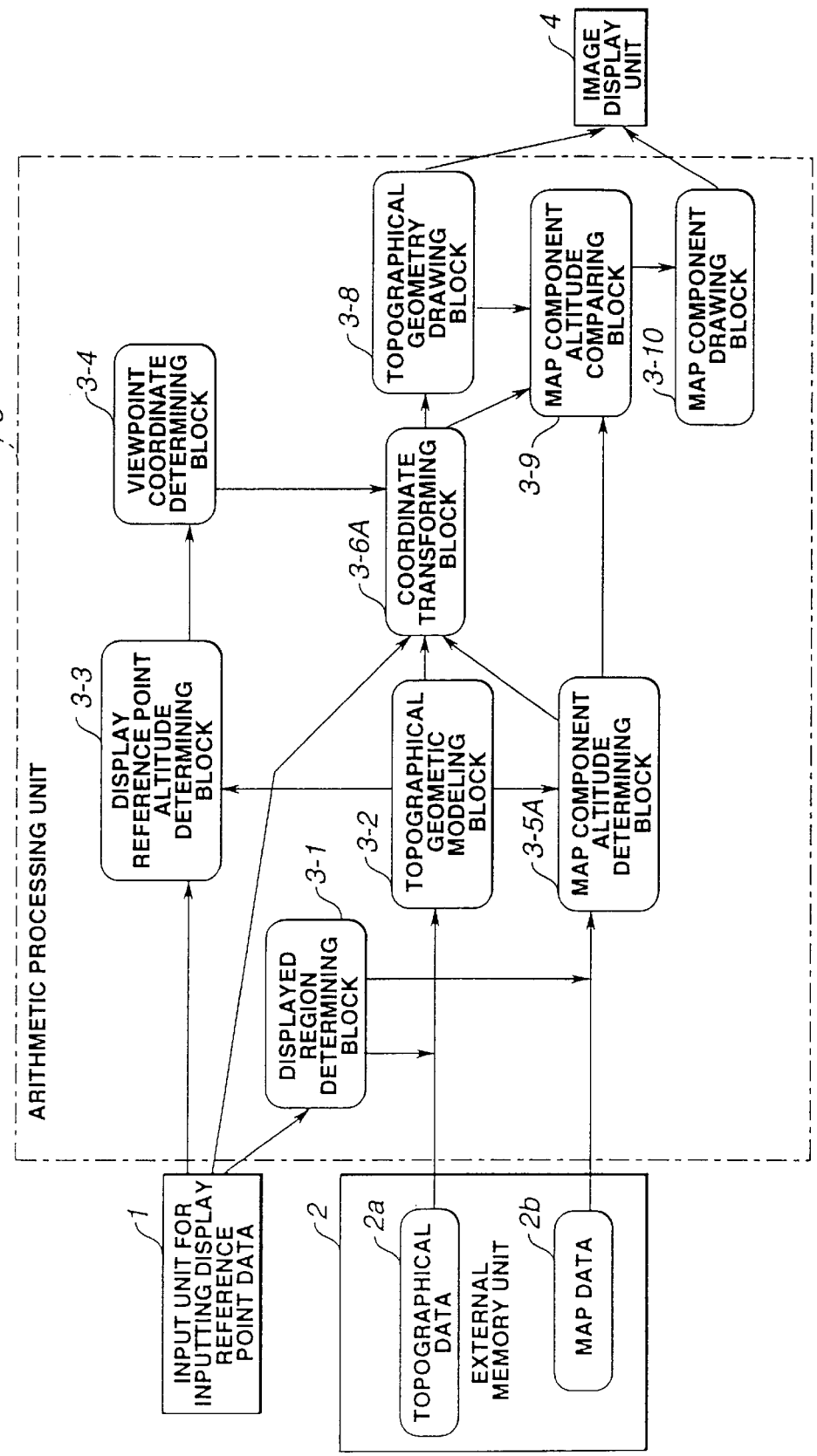
Figure 22A:
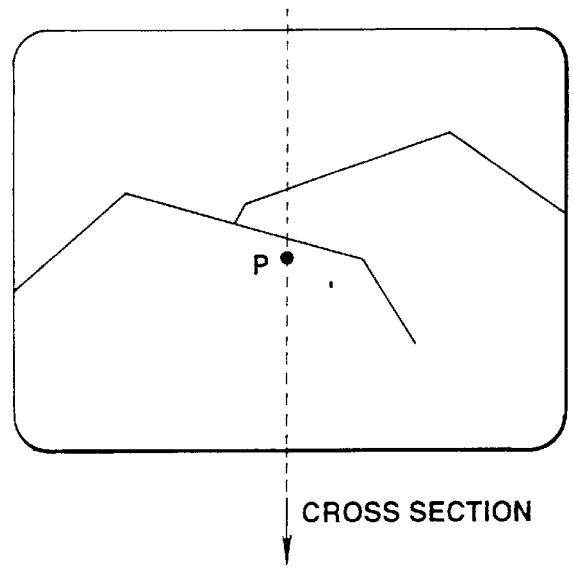
FIGS. 22A and 22B are illustrations depicting the principle of displaying a stereoscopic birds-eye view provided by the embodiment.
Figure 22B:
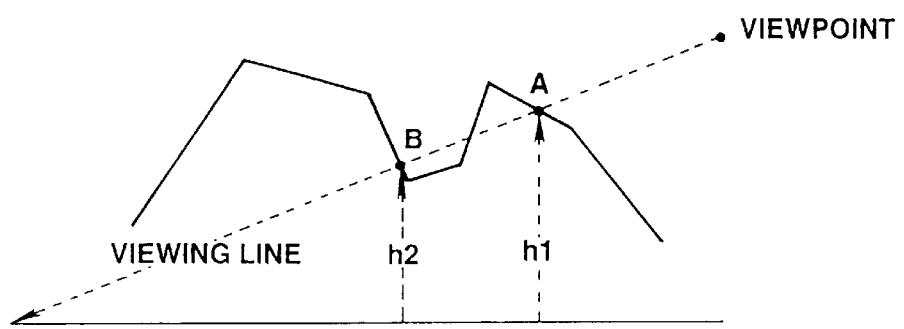
Figure 23:
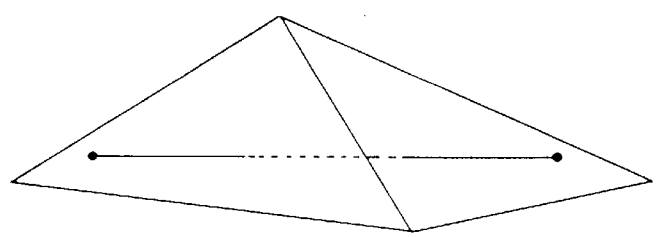
Figure 24:
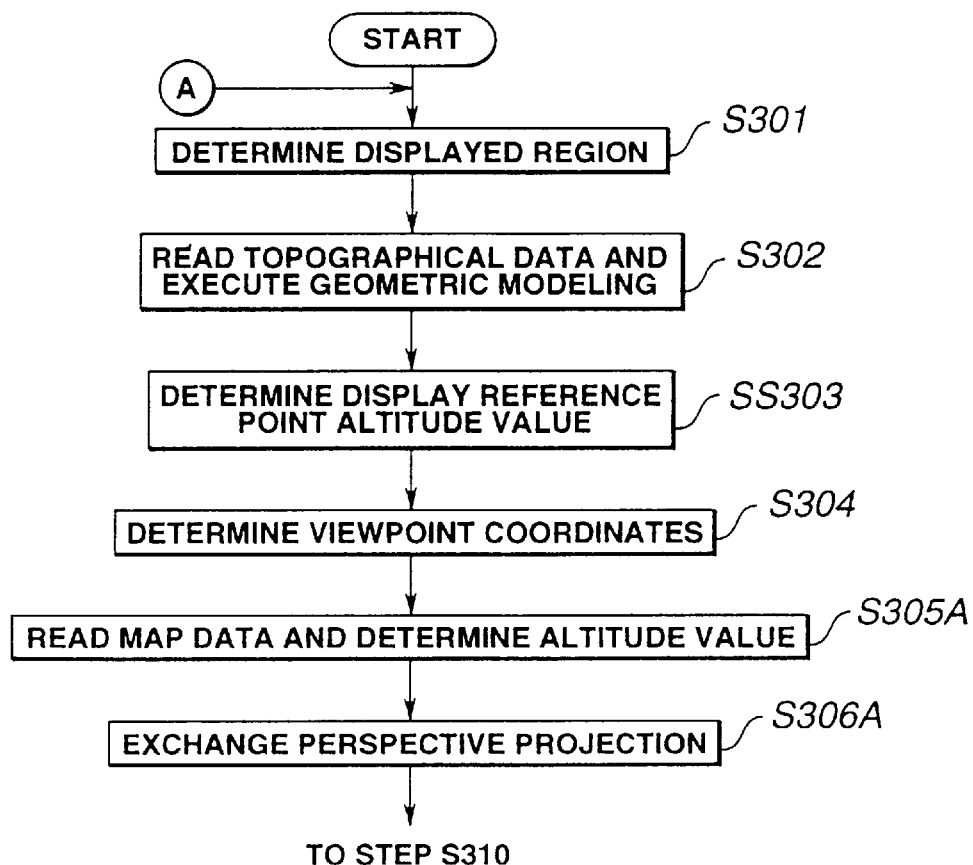

FIG. 20 shows a stereoscopic birds-eye view display of a road map provided by the above-mentioned first embodiment 10A of the present invention. As is seen from this display, the topographical geometry provided based on the altitude data of a real topographical geometry and a map data are stereoscopically displayed, and the map display components are put on the displayed topographical geometry. In fact, the displayed map on the screen can give a viewer a reality, so that the viewer can instantly grasp the position of the system-mounted vehicle (viz., viewer) and instantly grasp the positional relation of the vehicle with the surrounding.

In the following, a second embodiment 10B of the present invention will be described with reference to FIGS. 21 to FIG. 25B.

In the second embodiment 10B, in place of the hidden-surface removing drawing process carried out at the coordinate transform block 3-6 of the first embodiment 10A (see FIG. 1), there is employed a process through which drawing of displayed members in the displayed region is carried out in order from the deepest surface toward this surface in a so-called overwriting method.

The hardware of this second embodiment 10B is the same as that of the above-mentioned first embodiment 10A. However, as is seen from FIG. 21, the arithmetic processing unit 3 employed in the second embodiment 10B has different functions, as is understood from the following.

That is, similar to that of the above-mentioned first embodiment 10A, the arithmetic processing unit 3 of the second embodiment 10B has a displayed region determining block 3-1, a topographical geometric modeling block 3-2, a display reference point altitude determining block 3-3 and a viewpoint coordinate determining block 3-4. In addition to these blocks, the unit 3 has a map component altitude determining block 3-5A, a coordinate transforming block 3-6A, a topographical geometry drawing block 3-8, a map component altitude comparing block 3-9 and a map component drawing block 3-10 which are different from those of the first embodiment 10A.

In the map component altitude determining block 3-5A, a map component data within the display region is read from the map data 2b. If no altitude value is registered, a corresponding altitude value is derived through interpolation based on the equations (1) and (2) by using three sampling points surrounding a representing point, like in the case of the display reference point altitude determining block 3-3. However, unlike the case of the first embodiment, offset for the altitude value is not made in the second embodiment.

In the coordinate transforming block 3-6A, a two-dimensional coordinate (Sx, Sy) on the displayed screen is derived through the perspective projection transformation. However, in the second embodiment 10B, the depth coordinate Sz is not derived.

In the topographical geometry drawing block 3-8, the polygon representing the topographical geometry is drawn in order from the deepest surface with respect to the viewpoint. That is, overwriting is carried out one after another. Similar to the case of the first embodiment 10A, in accordance with the altitude value, the color for the drawing of the topographical geometry changes. In the map component altitude comparing block 3-9, the altitude value of the map display component (viz., the construction points in case of road, water-system and facility, and the representing point in case of place name) is compared with the topographical altitude value which has been already drawn on the same position of the screen. If the altitude value of the map display component is smaller than the topographical altitude value, it is regarded that the map display component is placed nearer to the viewpoint than the ground level. As is seen from FIGS. 22A and 22B, if, in case of drawing the map display component at a point "P" on a birds-eye view, the topographical geometry is drawn with a color which has been determined in accordance with the altitude value, the color of the picture element of the point "P" represents the altitude value "h1" of the point "A" which is nearest to the viewpoint. Accordingly, if the altitude value of a map display component to be drawn is lower than the value "h1", it is so regarded that the map display component is positioned at the point "B" placed on a back side of the illustrated mountain, so that the map display point is hidden.

In the map component drawing block 3-10, if, in case of road or the like, the altitude values of both ends of each link are larger than the altitude value of the ground level, an instruction is given to the image display unit 4 so that the road is drawn in a normal manner. While, when at least one of the ends of the link is lower than the ground level in altitude value, an instruction is given to the unit 4 so that the road is drawn with a changed color or drawn with a dotted line or not drawn. While, in case of the water-system and facility which are illustrated in the form of a surface geometry, if all of the vertex points of the surface elements which constitute the surface geometry are higher than the ground level in the altitude value, an instruction is given to the unit 4 so that the water system or the facility are drawn in a normal manner. While, if at least one of the vertex points is lower than the ground level in the altitude value, an instruction is given to the unit 4 so that the water system or the facility are drawn with a different color, or only the ridge line of them is drawn with a dotted line, or they are not drawn. If, in case of the place names, the altitude value of the representing point is greater than that of the ground level, the place name is drawn in a normal manner in the unit 4. While, if smaller than that of the ground level, the place name is not drawn by the unit 4. That is, as is seen from FIG. 23, in the invention, the topographical geometry is modeled in the form of polygon. Thus, even when the altitude value of the road is derived at each construction point, the road would be hidden if the topographical geometry between the construction points is projected. In the hidden surface removing drawing process effected in the above-mentioned embodiment 10A, the judgment as to whether the road is viewed or not is carried out for each picture element. Thus, in the first embodiment 10A, it tends to occur that the road is partially hidden with both ends kept viewed. While, in the second embodiment 10B, depending on the judgement whether both ends of the road are viewed or not, judgment is carried out as to whether entire of the road should be drawn or not. Thus, the drawback of the first embodiment can be eliminated. In the second embodiment, undesired phenomenon wherein a road is partially hidden at an area other than tunnel is suppressed.

Figure 25B:
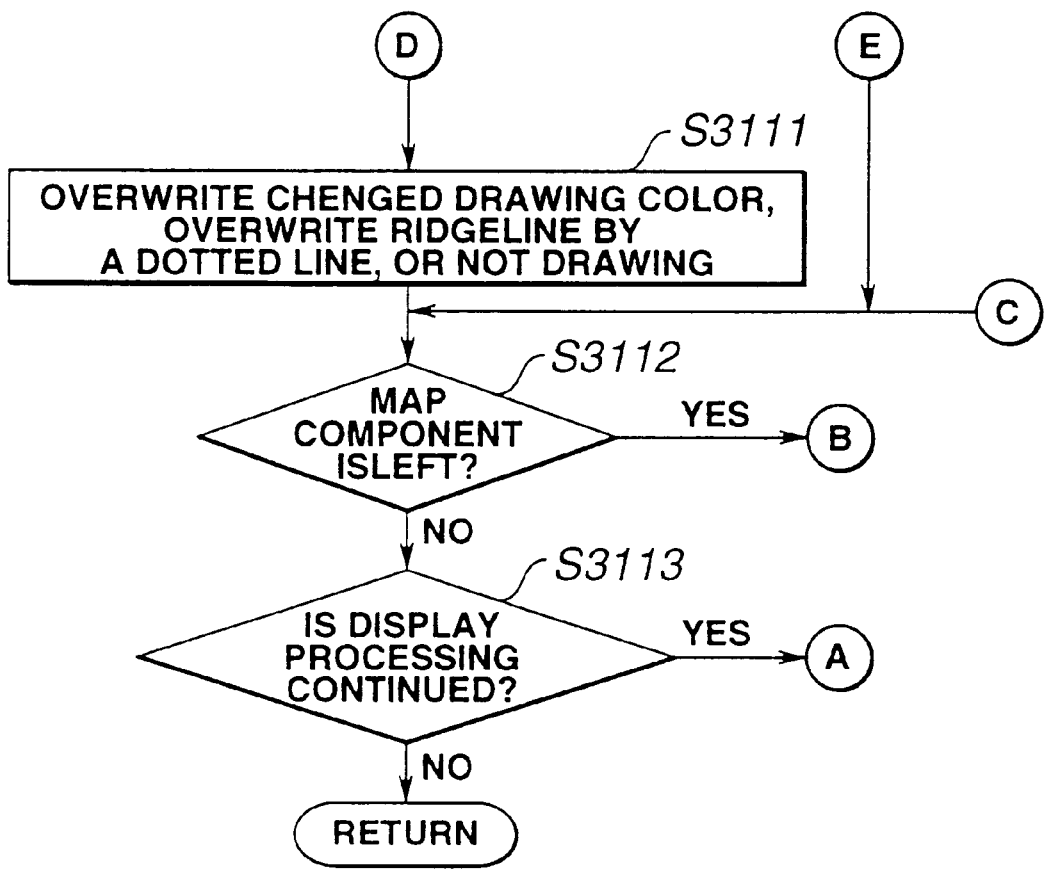

In the following, operation of the above-mentioned navigation system 10B of the second embodiment will be described with reference to the flowchart of FIGS. 25, 25A and 25B.

At the displayed region determining block 3-1 of the arithmetic processing unit 3, a displayed region is determined (S301), at the topographical geometric modeling block 3-2, topographical data is read and geometric modeling is executed (S302), at the display reference point altitude determining block 3-3, an altitude value of a display reference point is determined (S303), and at the viewpoint coordinate determining block 3-4, a viewpoint coordinate is determined (S304), which are the same as those of the flowchart of FIG. 5 of the first embodiment 10A.

At the map component altitude determining block 3-5A, similar to the case of the map component altitude determining block 3-5 of the first embodiment, a map component data of roads and place names within the display region determined by the block 3-1 is read from the map data 2b (S305A). If altitude value data is not present, a corresponding altitude value is derived through interpolation by using a technique similar to that of deriving the altitude value of the display reference point. It is to be noted that in the second embodiment 10B, offset processing mentioned in the flowchart of FIG. 15 is not carried out.

At the coordinate transforming block 3-6A, a transparent projection transformation is carried out (S306A). With this transformation, a homogenous coordinate "T=(Tx, Ty, Tz, Tw)" is derived. The two-dimensional coordinate (Sx, Sy) used for drawing is derived from the condition "Sx=Tx/Tw, Sy=Ty/Tw". However, in this second embodiment, the depth coordinate "Sz" is not derived.

Then, at the topographical geometry drawing block 3-8, a polygon representing the topographical geometry is drawn in order from the deepest surface with respect to the viewpoint (S310). That is, overwriting is carried out one after another in order from the farthest part. In this case, the drawing color is changed in accordance with the altitude value.

At the map component altitude comparing block 3-9 and the map component drawing block 3-10, judgment is carried out as to whether the map display component in the displayed region is a place name or not (S311). If YES, the operation flow goes to step S312. At this step, judgment is carried out as to whether the altitude value of the representing point of the character train of the name is smaller than that of terrain or not. If NO, the operation flow goes to step S313 where the name of place is overwritten on the topographical geometry.

If NO at step S311, the operation flow goes to step S314. At this step, judgment is carried out as to whether or not the map component is in the line figure representing a road, river or rail road. If YES, the operation flow goes to steps S315 and S316. At these steps, altitude values of ends of each link are compared with those of the corresponding terrain presented by a two-dimensional coordinate. When the altitude values of the link ends are greater than the altitude value of the corresponding terrain, the operation flow goes to step S317 where the map component is overwritten on the displayed terrain. However, when either one of the altitude values of the link ends is smaller than that of the corresponding terrain, the map component is drawn with a changed color, or is drawn with a dotted line, or is not drawn (S318).

If NO at step S314, that is, when the map component is in the shape of surface geometry, such as a lake, river, station facility, golf course or the like, the operation flow goes to steps S319-1 . . . S319-n. At these steps, judgment is carried out as to whether or not all vertexes "1 to n" (see FIGS. 4A and 4B) of all smaller polygons provided by the division depicted by FIG. 4A are smaller than the corresponding terrain in altitude value. If NO, that is, when the altitude values of all vertexes are greater than the altitude value of the terrain, the operation flow goes to step S3110 where the map component is overwritten on the displayed terrain. However, if YES is answered by one of the steps S319-1 . . . S319-n, the map component is drawn with a changed color, or is drawn with a dotted line, or is not drawn (S3111).

The above-mentioned steps from S311 to S3111 are applied to all of the map components which are within the displayed region. Displaying of a display reference point mark such as a mark for indicating the position of the system-mounted vehicle is carried out in substantially the same manner (S3112). With these steps, such a stereoscopic birds-eye view as shown in FIG. 20 is displayed by the image display unit 4.

At step S3113, judgment is carried out as to whether display processing is continued or not. If YES, the operation flows goes back to step S301. While, if NO, the above-mentioned processes are ended, subsequent processes, such as, a process for detecting the system-mounted vehicle, a process for finding the guide route and the like follow.

The second embodiment 10B has the following advantages in addition to the advantages possessed by the first embodiment 10A. That is, since, in case of the second embodiment 10B, there is no need of providing the CPU with a function to execute the hidden surface removing drawing process. Thus, high speed processing and lower cost production of the system are achieved. In addition, undesired partial dropping of display of a line-figured map component (such as road and the like) is suppressed, which would be caused by inevitable errors produced when rounding the topographical geometry.

In the following, a third embodiment 10C of the present invention will be described with reference to FIGS. 26 and 27.

Since the third embodiment 10C is similar to the above-mentioned first and second embodiments 10A and 10B, only portions which are different from those of the first and second embodiments will be described in the following.

Figure 26:
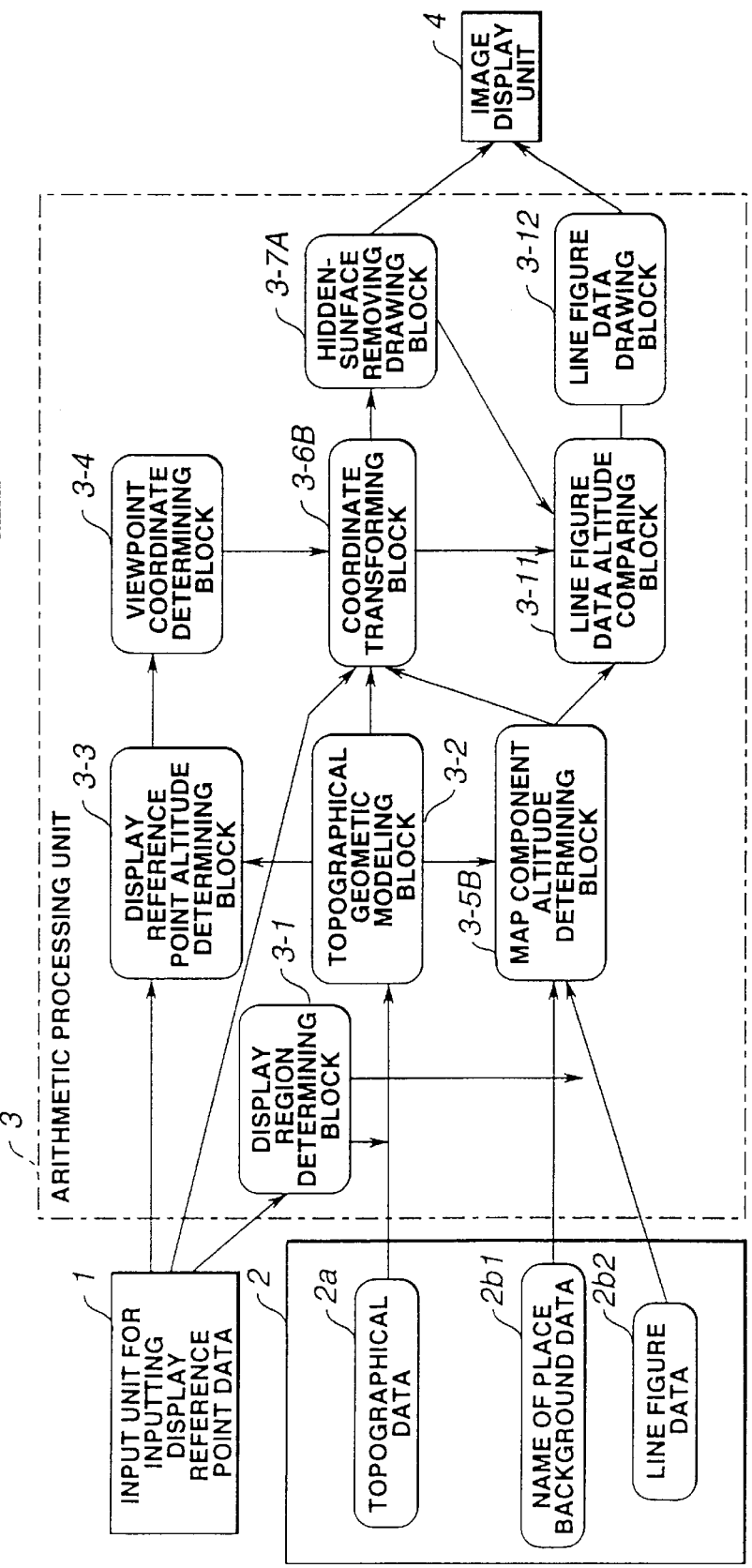

As is seen from FIG. 26, in the third embodiment 10C, the map data 2b of the external memory unit 2 is divided into two groups 2b 1 and 2b 2, one being a place name and background data 2b 1 which includes position information on the representing point for topography and icon, auxiliary information on the character train of each place name, position information on map components and auxiliary information on the connection form and, the other being a line figure data 2b 2 which includes position information on the line-figured components (such as road, railway, river and the like) and auxiliary information on the attribute.

The arithmetic processing unit 3 has, in addition to the blocks 3-1 to 3-4 which are the same as those of the first and second embodiments 10A and 10B, a map component altitude determining block 3-5B, a coordinate transforming block 3-8B, a hidden surface removing drawing block 3-7A, a line figure data altitude comparing block 3-11 and a line figure data drawing block 3-12.

In the map component altitude determining block 3-5B, data of the map components within the displayed region are read from the two data groups 2b 1 and 2b 2 of the external memory unit 2, and if no altitude value is registered, a corresponding altitude value is derived through interpolation based on the equations (1) and (2) by using three sampling points surrounding a representing point, like in the case of the display reference point altitude determining block 3-3. However, unlike the case of the first embodiment, offset for the altitude value of the line figure data is not made in this third embodiment.

In the coordinate transforming block 3-6B, a two-dimensional coordinate (Sx, Sy) on the displayed screen is derived through the perspective projection transformation. On the place name and background data 2b 1 and the topographical data 2a, there is derived the depth coordinate Sz.

In the hidden surface removing drawing block 3-7A, the hidden surface removing process is applied to the topographical data and the place name and background data.

In the line figure data altitude comparing block 3-11, similar to the comparing block 3-9 of the second embodiment, the altitude value of the terminal point of each link of the line figure data is compared with the topographical altitude value (given through drawn color) which has been already drawn on the same position of the screen.

In the line figure data drawing block 3-12, similar to the drawing block 3-10 of the second embodiment, if the altitude values of both ends of each link are larger than the altitude value of the ground level, the road is normally drawn, and if at least one of the ends of the link is lower than the ground level in altitude value, the road is drawn with a changed color or drawn with a dotted line or not drawn.

In the following, operation of the above-mentioned navigation system 10C of the third embodiment will be described with reference to the flowchart of FIG. 27.

Steps S301 to S304 are the same as those of the first embodiment 10A of FIG. 5. After execution of these steps, the operation flow goes to step S305B. At this step, similar to the block 3-5 of the first embodiment, data of the map components (such as roads, place names, etc.,) within the displayed region determined by the block 3-1 are read from the two data groups 2b 1 and 2b 2 of the external memory unit 2, and if altitude value is not present, a corresponding altitude value is derived through interpolation by using a technique similar to that of deriving the altitude value of the display reference point. In this third embodiment, offset processing mentioned in the flowchart of FIG. 15 is not carried out.

In the coordinate transforming block 3-6B, similar to the block 3-6 of the first embodiment, a transparent projection transformation is carried out. With this transformation, a homogenous coordinate "T=(Tx, Ty, Tz, Tw)" is derived. The two-dimensional coordinate (Sx, Sy) used for drawing is derived from the condition "Sx=Tx/Tw, Sy=Ty/Tw". On data other than the line figure data, that is, on the topographical data and place name and background data, the depth coordinate Sz (=Tz/Tw) is derived (S306B).

At the hidden surface removing drawing block 3-7A, on data other than the line figure data (viz., the topographical data and the place name and background data), a hidden surface removing process is executed (S307A), similar to the block 3-7 of the first embodiment 10A.

At the line figure data altitude comparing block 3-11 and the line figure data drawing block 3-12, altitude values of ends of each link of the line figure within the displayed region are compared with those of the corresponding terrain presented by a two-dimensional coordinate (S320 to S322). When the altitude values of the link ends are greater than the altitude value of the corresponding terrain, the operation flow goes to step S323 where the map component (viz., line figure) is overwritten on the displayed terrain, place name or icon. However, when either one of the altitude values of the link ends is smaller than that of the corresponding terrain, the map component is drawn with a changed color, or drawn with a dotted line or not drawn (S324). The above-mentioned processes from S320 to S324 are applied to all of line figures within the displayed region (S325). With these steps, such a stereoscopic birds-eye view as shown in FIG. is displayed by the image display unit 4.

At step S326, judgment is carried out as to whether the map display processing is continued or not. If YES, the operation flow goes back to step S301. If NO, the above-mentioned processes are ended, and subsequent processes, such as, a process for detecting the system-mounted vehicle, a process for calculating the guide routine and the like follow.

The third embodiment 10C has the following advantages in addition to the advantages possessed by the first embodiment 10A. That is, since, in case of the third embodiment 10C, judgment as to whether the line-figured map component (such as roads and the like) should be displayed or not depends on the conditions of the ends of the component, undesired partial dropping of the line-figured map component from the displayed image is suppressed, which would be caused by inevitable errors produced when rounding the topographical geometry. Furthermore, since the drawing process is based on the hidden surface removing process for the place name and icon, the line-figured map component can be partially displayed even when the representing point thereof is hidden.

Although the above-description on the first, second and third embodiments 10A,10B and 10C has been directed to a navigation system, the functions installed in the arithmetic processing unit 3 of the navigation system can be installed in an internal memory unit in the form of a software program, or can be installed in a suitable memorizing medium in the form of an application software program.

In the following, a fourth embodiment 10D of the present invention will be described with reference to FIGS. 28 to 32.

Since the fourth embodiment 10D is similar to the above-mentioned first embodiment 10A, only portions which are different from those of the first embodiment will be described in the following.

The arithmetic processing unit 3 has, in addition to the blocks 3-1 to 3-4 of the first embodiment 10A, an altitude changing region determining block 3-5C, a topographical geometry altitude changing block 306C, a map component altitude determining block 3-7C, a coordinate transforming block 3-8C and a drawing processing block 3-9C.

Figure 31A:
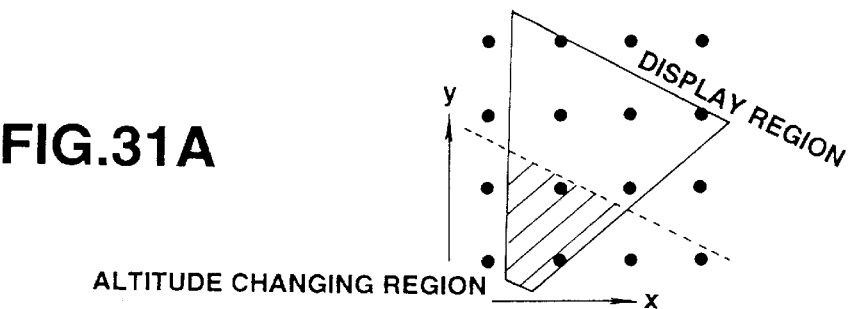
FIGS. 31A, 31B, 31C and 31D are illustrations depicting a remodeling process for a topographical form to which the altitude changing is applied.
Figure 31B:
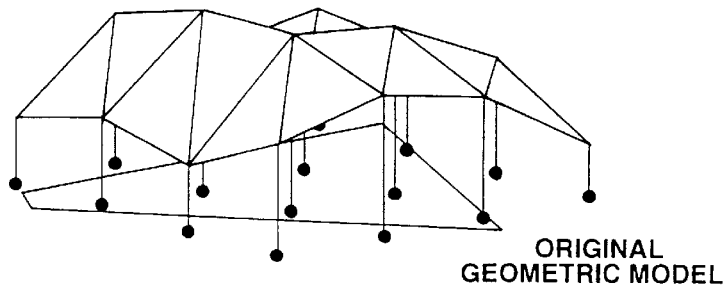
Figure 31C:
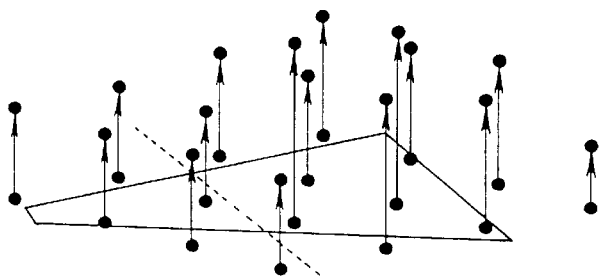

In the altitude changing region determining block 3-5C, as is seen from FIG. 31A or FIG. 31B, a certain region of the displayed region around the display reference point is determined as an altitude changing region. That is, in case of FIG. 31A, the altitude changing region is a region (viz., hatched region) which is perpendicular to the viewing line with respect to the viewpoint, and in case of FIG. 31B, the changing region is a region (viz., triangular region) which is defined around the display reference point. It is to be noted that the following description is based on the altitude changing region depicted by FIG. 31A.

Figures 30A, 30B:
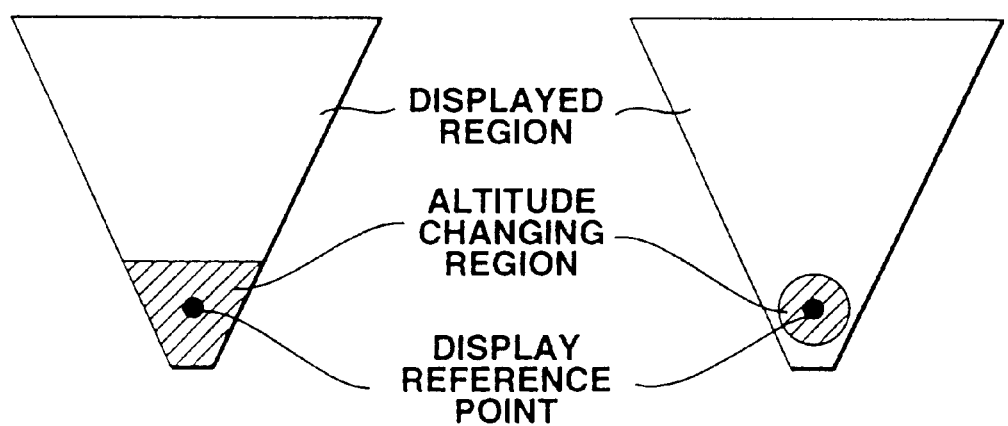
FIGS. 30A and 30B are illustrations showing examples of determining an altitude changed region.

In the topographical geometry changing block 3-6C, as is seen from FIG. 30A or 308, with respect to the topographical geometry modeled by the block 3-2, the altitude values of sampling points in the altitude changing region are enforcedly changed to values similar to the altitude value of the display reference point derived by the block 3-3. That is, the topographical geometry model derived by the block 3-2 is remodeled in the block 3-6.

In the map component altitude determining block 307C, map component data within the displayed region is read from the map data $2b$. If no altitude value is present, a corresponding altitude value is derived through interpolation by using a technique similar to that of the block 3-3.

In the coordinate transforming block 3-8C, the two-dimensional coordinate (Sx, Sy) and the depth coordinate Sz on the displayed image are derived through a perspective projection transformation. In the drawing processing block 3-9C, comparison of the depth coordinate is carried out for each picture element. That is, by drawing only picture elements whose depths are smaller than those of picture elements which have been already drawn, there is produced a stereoscopic map drawing signal which makes the hidden surface removing effective. The signal is applied to the image display unit 4 to display a stereoscopic road map. Different colors are allocated to the drawing according to the altitude value, and different colors are allocated to the drawings of roads, rivers and place names. A loud color, such as red, yellow or blue is allocated to the guide route.

In the following, operation of the fourth embodiment 10D of the invention will be described with reference to FIG. 29.

Steps S1, S2, S3 and S4 are substantially the same as those S301, S302, S303 and S304 of the first embodiment 10A.

As has been described hereinabove, in the altitude changing region determining block 3-5C, an altitude changing region is defined from the displayed region determined by the block 3-1. At the topographical geometry modeling block 3-2, a topographical data with a range sufficiently covering the displayed region derived at step S1 is read from the external memory unit 2 and a geometric modeling is executed (step S2). In case wherein a part or entire of the data needed in a current display processing has been already used in the last display processing and thus has been stored in the internal memory unit (not shown) of the arithmetic processing unit 3, the data can be used in the current display processing. With this, data transfer time can be saved. The method of modeling of the topographical geometry has been described in the part of the first embodiment 10A with reference to FIGS. 7A, 7B and 7C.

Figure 7C:
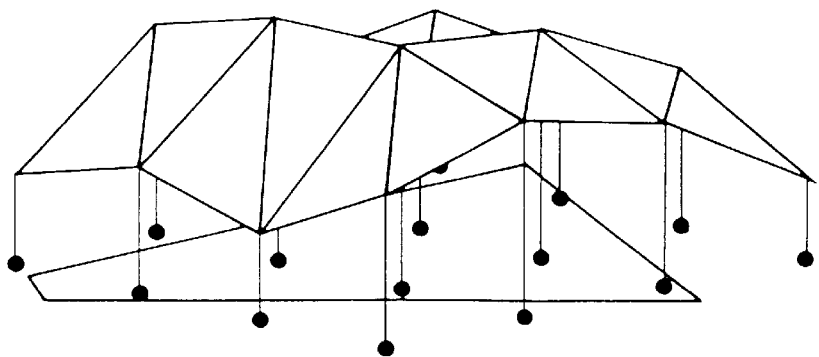

In the topographical geometry altitude changing block 3-6C, with respect to the topographical geometry model, such as the open-shaped model shown in FIG. 7C or FIG. 316 derived by the block 3-2, the following change is applied to the altitude data "hi" of the sampling points which belong to the altitude changing region. That is, based on the display reference point altitude value "Pz", the altitude data "hi" changed in accordance with the following equation (12).

$$hi \leftarrow (hi - Pz)\, x\alpha + Pz \tag{12}$$

wherein: $1 > \alpha \geq 0$

Figure 31D:
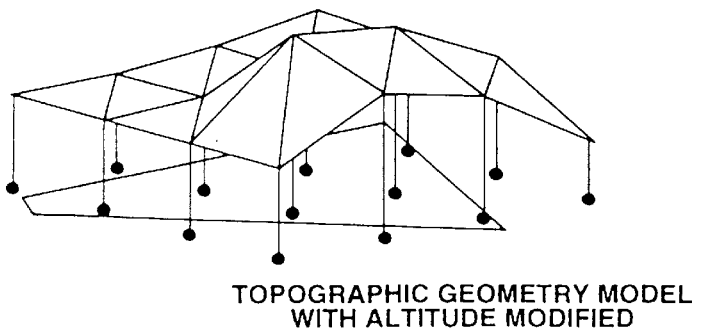

That is, the altitude values of the sampling points "i (x, y)" within the altitude changing region are derived from the equation (12). That is, the altitude values of the sampling points are in the form of (x, y, hi). While, the altitude values of remaining portions in the altitude changing region are derived based on the original topographical data(x, y, z) without using the equation (12). With this, such a polygonal geometry as shown in FIG. 31D is obtained (step S5). In the fourth embodiment 10D, by putting the value "α" to 0 (zero), the altitude values "hi" of all sampling points within the altitude changing region are equalized to the altitude value "Pz" of the display reference point.

In the map component altitude determining block 3-7C, a map component data for roads and place names within the display region are read from the damp data 2b of the external memory unit 2, and if no altitude value is present, a corresponding altitude value is derived through interpolation by executing the same processing as that for deriving the display reference point altitude value (step S6).

Figure 29:
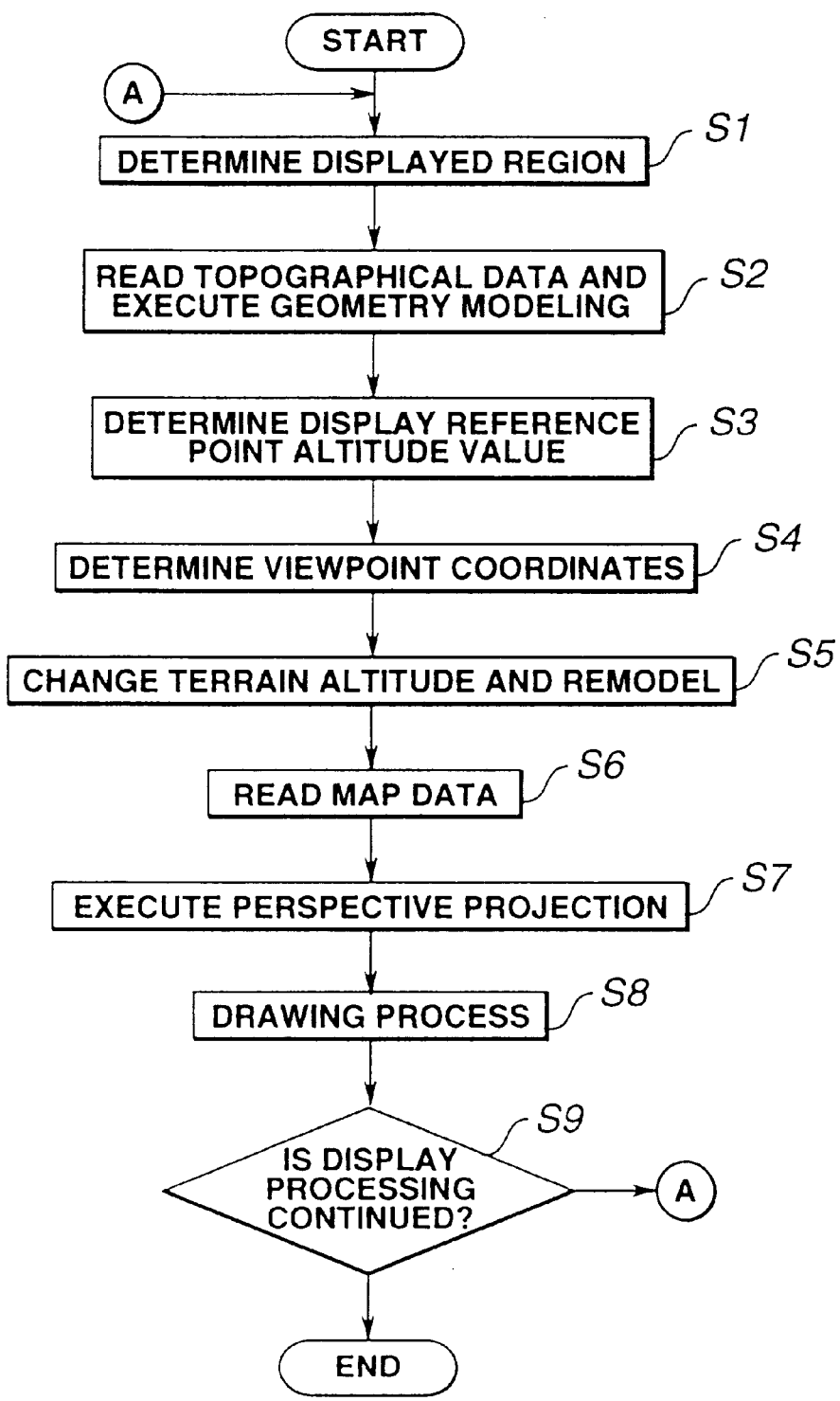

When processing for determining the altitudes of all map display components is finished, operation steps of steps S7, S8 and S9 of the flowchart of FIG. 29 are executed. Since these steps are substantially the same as those of the steps S306, S307 and S308 of the flowchart of FIG. 5 of the first embodiment 10A, explanation of them will be omitted.

With the steps mentioned hereinabove, the fourth embodiment ROD can provide such a stereoscopic birds-eye views as obtained by the first embodiment 10A.

Figure 32:
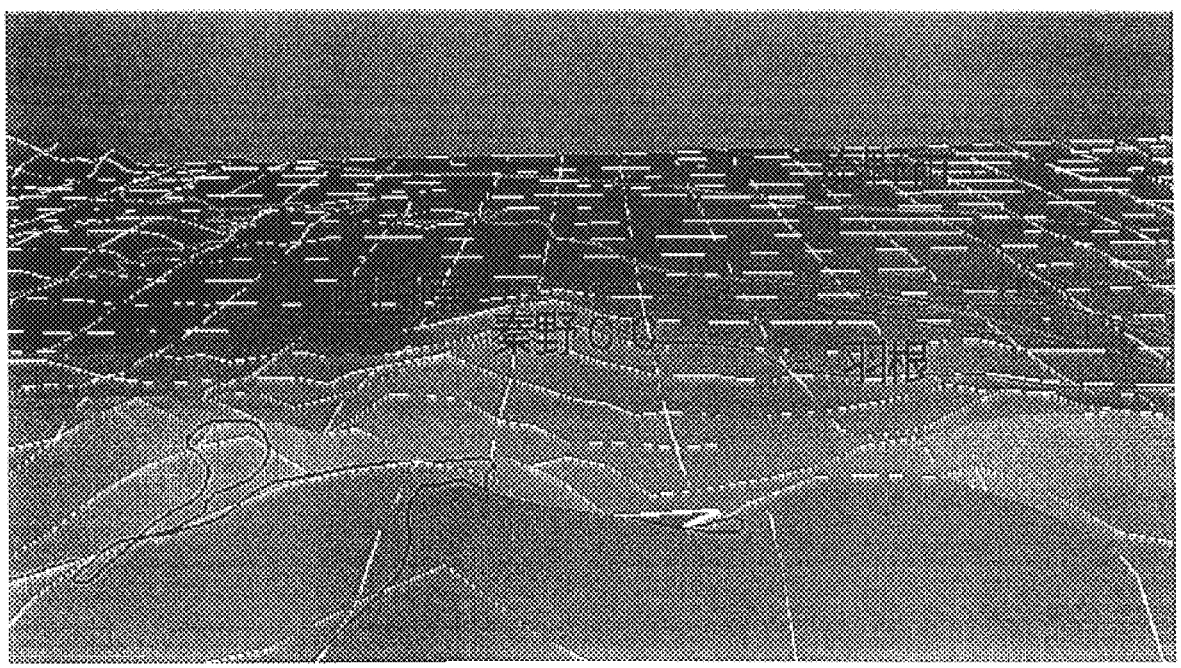

The fourth embodiment 10D has the following advantages in addition to the advantages possessed by the first embodiment 10A. That is, in case of the fourth embodiment 10D, a correction is so made that the altitude values of sampling points within the altitude changing region in the vicinity of the display reference point are changed or modified to values similar to the altitude value of the display reference point. Accordingly, undesired phenomenon depicted by FIG. 32 is overcome. That is, in the display of FIG. 32, due to presence of a higher mountain located near the viewpoint, the display reference point (viz., arrow-shaped current position mark) is partially concealed by the displayed mountain. However, in the fourth embodiment, such display reference point and its surrounding are always displayed.

Figure 33:
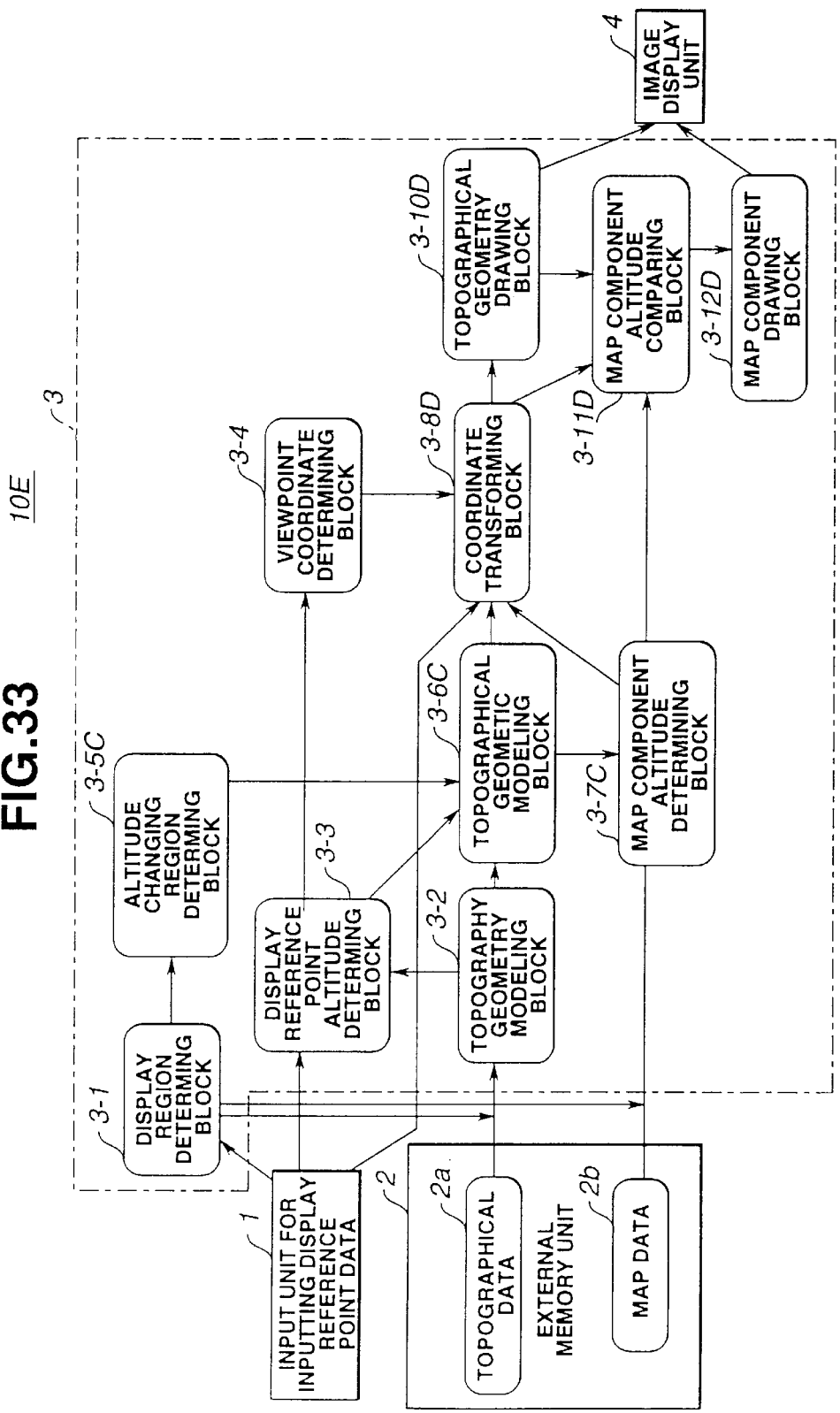
Figure 34:
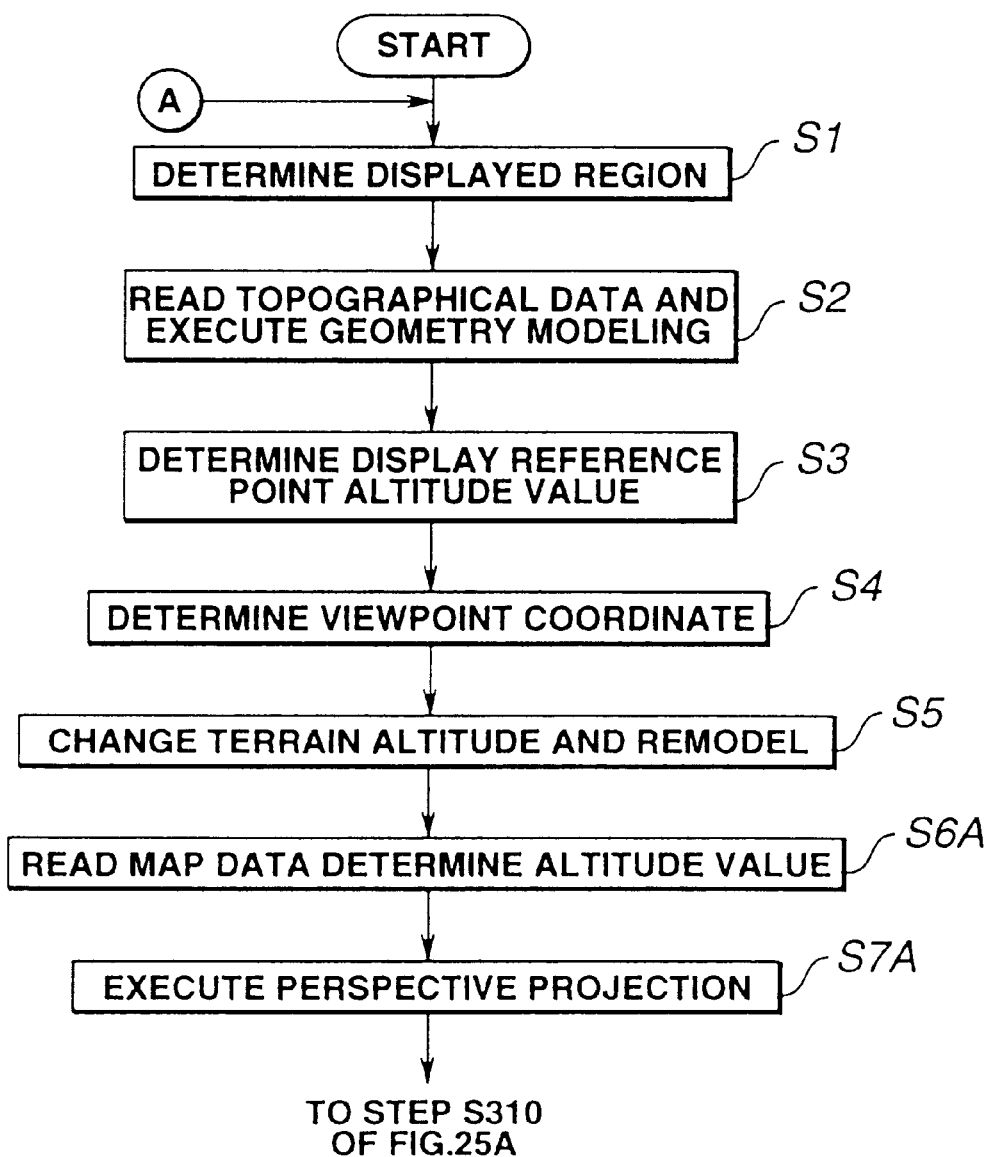
Figure 35:
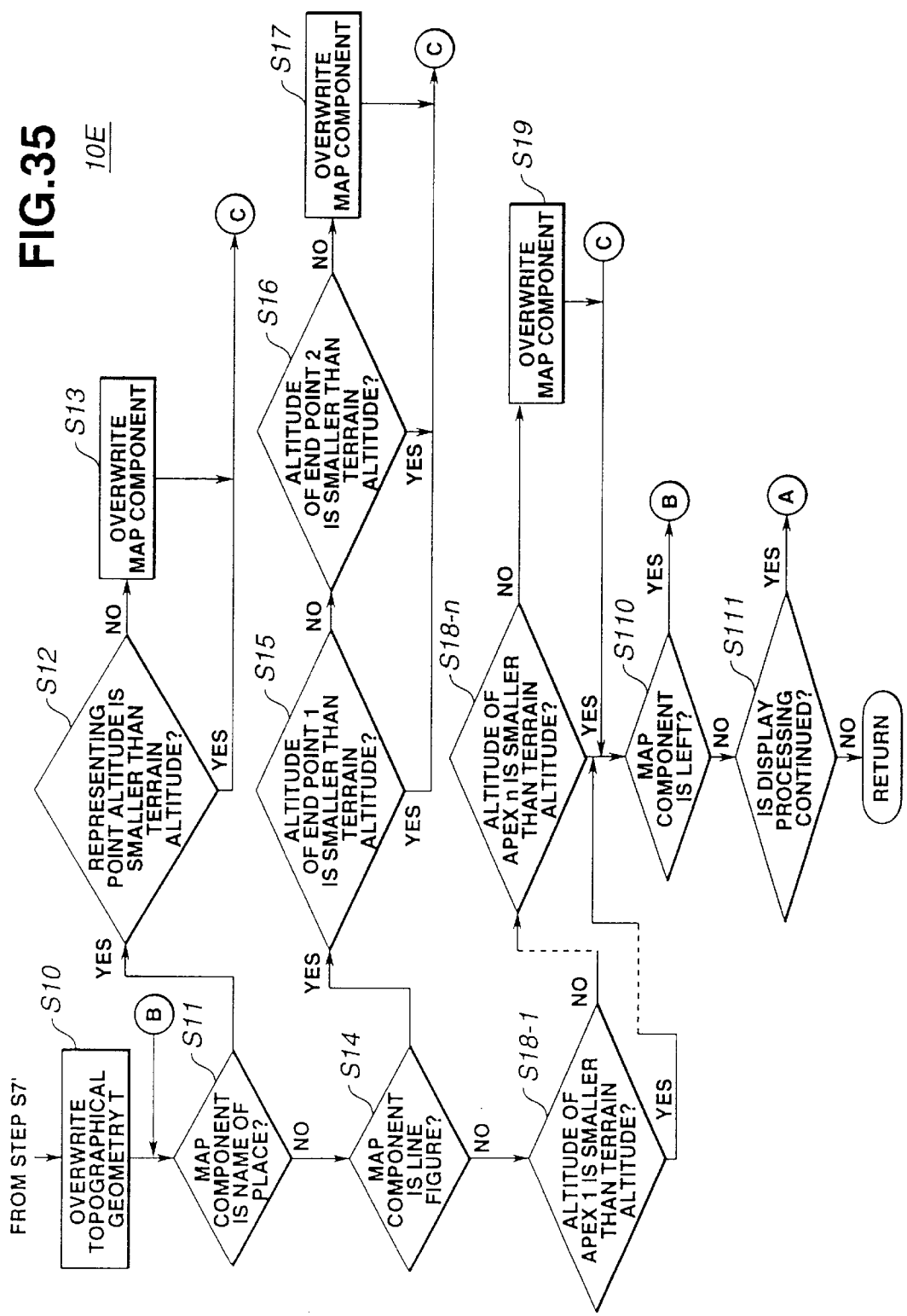

In the following, a fifth embodiment POE of the present invention will be described with reference to FIGS. 33 to 35.

Since the fifth embodiment 10E is similar to the above-mentioned fourth embodiment 10D, only portions which are different from those of the fourth embodiment 10D will be described in the following.

The arithmetic processing unit 3 has, in addition to the blocks 3-1 to 3-4, 3-5C, 3-6C of 3-7C of the fourth embodiment 10D, a coordinate transforming block 3-8D, a topographical geometry drawing block 3-10D, a map component altitude comparing block 3-11D and a map component drawing block 3-12D.

In the coordinate transforming block 3-8D, the two dimensional coordinate (Sx, Sy) on the displayed image is derived through a perspective projection transformation. However, unlike the case of the fourth embodiment 10D, the depth coordinate Sz is not derived.

In the topographical geometry drawing block 3-10D, substantially the same operation as that of the block 3-8 of the second embodiment 10B is carried out. That is, overwriting on the displayed topographical geometry is carried out from the deepest surface with respect to the viewpoint. In the map component altitude comparing block 3-11D, substantially the same operation as that of the block 3-9 of the second embodiment 108 is carried out. In the map component drawing block 3-12D, substantially the same operation as that of the block 3-10 of the second embodiment 10B is carried out.

In the following, operation of the fifth embodiment 10E of the invention will be described with reference to FIGS. 34 and 35.

Steps S1, S2, S3, S4 and S5 are substantially the same as those S1, S2, S3, S4 and S5 (see FIG. 29) of the fourth embodiment 10E.

After these steps are finished, the map component altitude determining block 3-7C carries out the step of S6A which is as follows. That is, similar to the map component altitude determining block 3-7C of the fourth embodiment 10D, a map component data for roads and place names within the display region determined by the block 3-1 is read from the map data 2b of the external memory unit 2, and if altitude value data is not present, a corresponding altitude data is derived through interpolation by using a technique similar to that of deriving the altitude value of the display reference point.

At the coordinate transforming block 3-8D, a transparent projection transformation is carried out (step S7A). That is, with this transformation, a homogenous coordinate "T=(Tx, Ty, Tz, Tw)" is derived. The two-dimensional coordinate (Sx, Sy) used for drawing is derived from the condition "Sx=Tx/Tw, Sy=Ty/Tw". However, in this second embodiment, the depth coordinate "Sz" is not derived.

At the topographical geometry drawing block 3-10D, an operation of the step S10 (see FIG. 35) is carried out. That is, a polygon representing the topographical geometry is drawn in order from the deepest surface with respect to the viewpoint. That is, overwriting is carried out one after another in order from the farthest part. In this case, the drawing color is changed in accordance with the altitude value.

At the map component altitude comparing block 3-11D and the map component drawing block 3-12D, judgment is carried out as to whether the map display component in the displayed region is a place name or not (S11). After this, operations of steps S14, S12, S13, S15, S16 and S17 are carried out in accordance with selected conditions. S1nce these operations are substantially the same as those of the steps S314, S312, S313, S315, S316 and S317 (see FIG. 25A) of the above-mentioned second embodiment 10B, explanation of them will be omitted. If NO at step S14, that is, when the map component is in the shape of surface geometry, such as a lake, river, station facility, golf course or the like, the operation flow goes to steps S18-1 . . . S18-n. The operations of these steps are substantially the same as those of steps S319-1 . . . S319-n of the second embodiment 10B. If NO is answered by all of these judging steps S319-1 . . . S319-n, the operation flow goes to step S19 where the map component of the surface geometry is overwritten on the displayed terrain. However, if YES is answered by one of these steps, the operation flow goes to step S110. At this step, judgment is carried out as to whether map component to be displayed is left or not. If YES, that is, when, for example, a display reference point mark such as a mark for indicating the position of the system-mounted vehicle is left, the above-mentioned operations are carried out for displaying the mark. At step W111, judgment is carried out as to whether display processing is continued or not. If YES, the operation flow goes back to step S1. While, if NO, the above-mentioned processes are ended, subsequent processes, such as a process for detecting the system-mounted vehicle, a process for finding the guide route and the like follow.

The fifth embodiment 10E has the following advantages in addition to the advantages possessed by the fourth embodiment 10D. That is, since, in case of the fifth embodiment, there is no need of providing the CPU with a function to execute the hidden surface removing drawing process. Thus, high speed processing and lower cost production of the system are achieved. In addition, undesired partial dropping of display of a line-figured map component (such as road and the like) is suppressed, which would be caused by inevitable errors produced when rounding the topographical geometry.

In the fifth embodiment 10E, due to function of the block 3-10D, the color of the topographical geometry changes depending on the altitude value. If desired, such color changing may be applied to a portion whose topographical geometry is changed.

Figure 36:
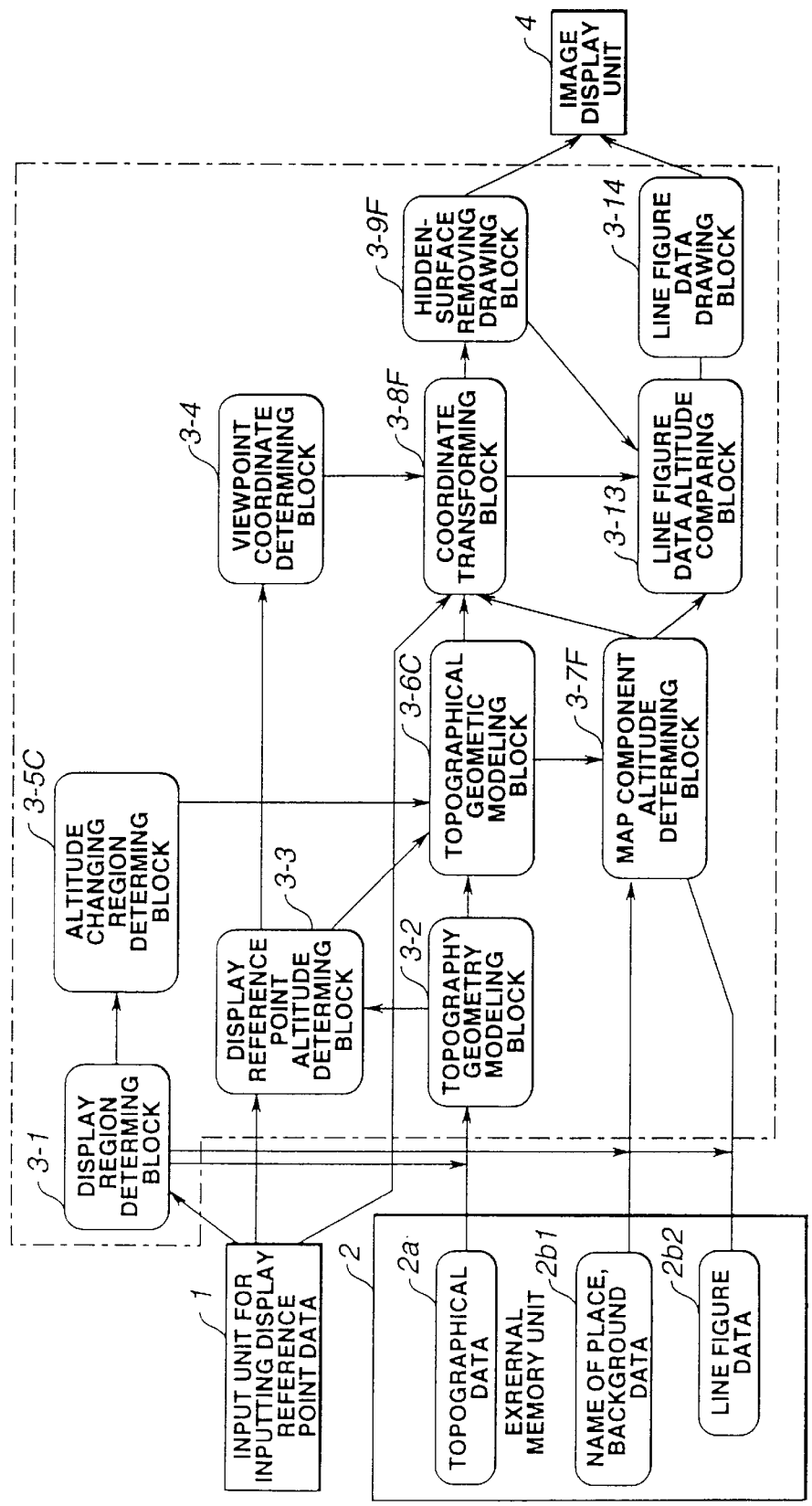
Figure 37:
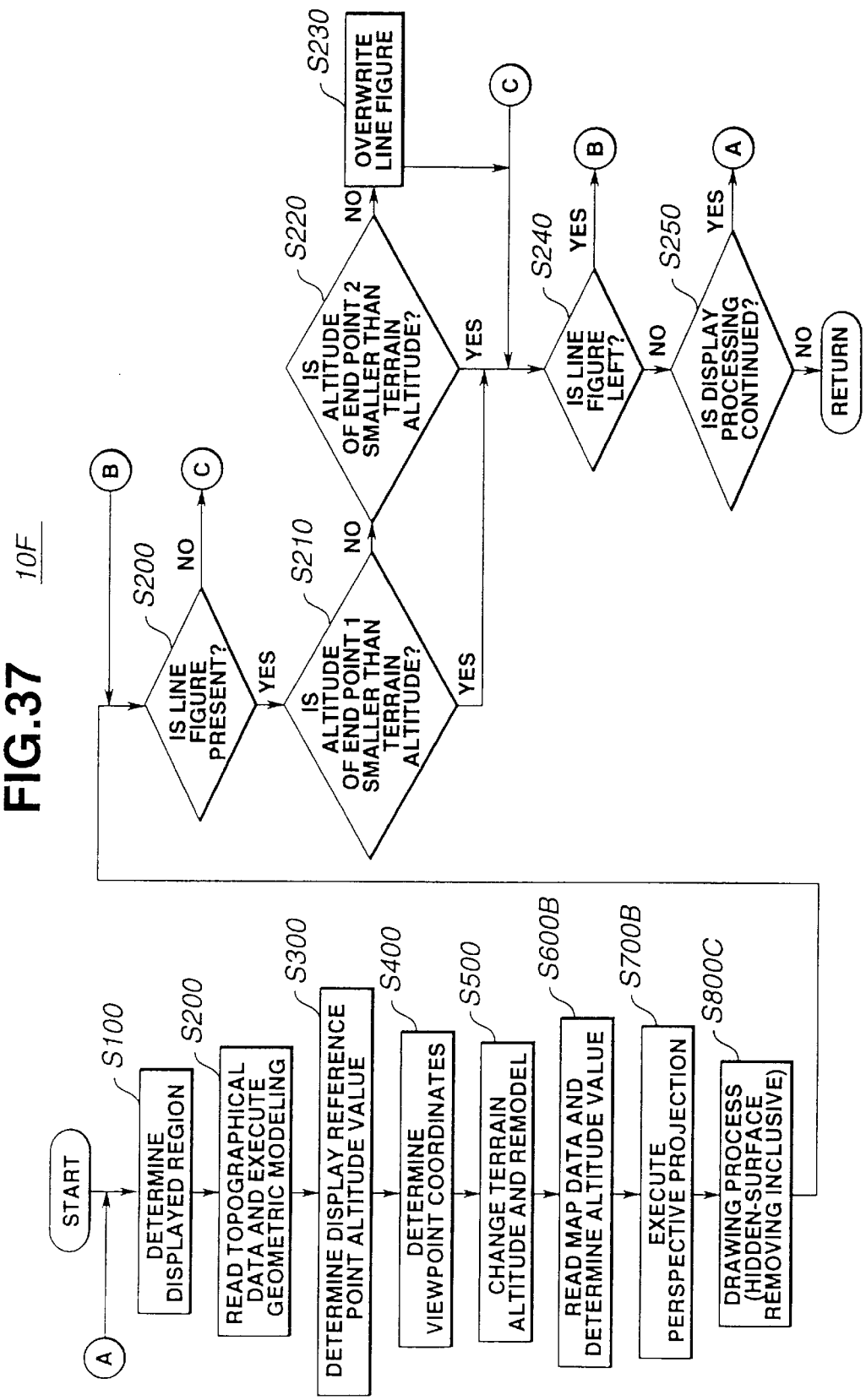

In the following, a sixth embodiment 10F of the present invention will be described with reference to FIGS. 36 and 37.

Since this sixth embodiment 10F is similar to the above-mentioned fourth and fifth embodiments 10D and 10E, only portions which are different from those of the embodiments 10D and 10E will be described in the following.

As is seen from FIG. 36, in the sixth embodiment 10F, similar to the above-mentioned third embodiment 10C (see FIG. 26), the map data 2b of the external memory unit 2 is divided into two groups 2b 1 and 2b 2 which have been described in detail hereinabove in the part of the third embodiment 10C.

The arithmetic processing unit 3 has, in addition to the blocks 3-1, 3-2, 3-3, 3-4, 3-5C and 3-6C of the fifth embodiment 10E, a map component altitude determining block 3-7F, a coordinate transforming block 3-8F, a hidden surface removing drawing block 3-9F, a line figure data altitude comparing block 3-13 and line figure data drawing block 3-14 which are the same as the blocks 3-5B, 3-6B, 3-7A, 3-11 and 3-12 of the above-mentioned third embodiment 10C.

In the following, operation of the navigation system 10F of the sixth embodiment will be described with reference to the flowchart of FIG. 37.

Steps S100 to S500 are the same as the steps S1 to S5 of the fourth embodiment 10D of FIG. 29. After execution of these steps, the operation flow goes to step S600B. At this step, similar to the block 3-7C of the fourth embodiment 10D, data of the map components (such as roads, place names, etc.,) within the displayed region determined by the block 3-1 are read from the two data groups 2b 1 and 2b 2 of the external memory unit 2, if altitude value is not present, a corresponding altitude value is derived through interpolation by using a technique similar to that of deriving the altitude value of the display reference point. In the coordinate transforming block 3-8F, a transparent projection transformation is carried out. . With this transformation, a homogenous coordinate "T=(Tx, Ty, Tz, Tw)" is derived. The two-dimensional coordinate (Sx, Sy) used for drawing is derived from the condition "Sx=Tx/Tw, Sy=Ty/Tw". On data other than the line figure data, that is, on the topographical data and place name and background data, the depth coordinate Sz (=Tz/Tw) is derived (S700B).

At the hidden surface removing drawing block 3-9F, on data other than the line figure data (viz., the topographical data and the place name and background data), a hidden surface removing process is executed (S800C), similar to the block 3-9C of the fourth embodiment 10D.

At the line figure data altitude comparing block 3-13 and the line figure data drawing block 3-14, altitude values of ends of each link of the line figure within the displayed region are compared with those of the corresponding terrain presented by a two-dimensional coordinate (S200 to S220). When the altitude values of the link ends are greater than the altitude value of the corresponding terrain, the operation flow goes to step S230 where the map component (viz., line figure) is overwritten on the displayed terrain, place name or icon. The above-mentioned processes S200 to S230 are applied to all of line figures within the displayed region (S240). With these steps, such a stereoscopic birds-eye view as obtained by the fourth embodiment 10D is obtained.

At step S240, judgement is carried out as to whether the map display processing is continued or not. If YES, the operation flow goes back to step S100. If NO, the above-mentioned processes are ended, and subsequent processes, such as a process for detecting the position of the system-mounted vehicle, a process for calculating the guide routine and the like follow.

The sixth embodiment 10F has the following advantages in addition to the advantages possessed by the fourth embodiment 10D. That is, since, in case of the sixth embodiment 10F, judgment as to whether the line-figured map component (such as roads and the like) should be displayed or not depends on the conditions of the ends of the component, undesired partial dropping of the line-figured map component from the displayed image is suppressed, which would be caused by inevitable errors produced when rounding the topographical geometry.

Figure 38:
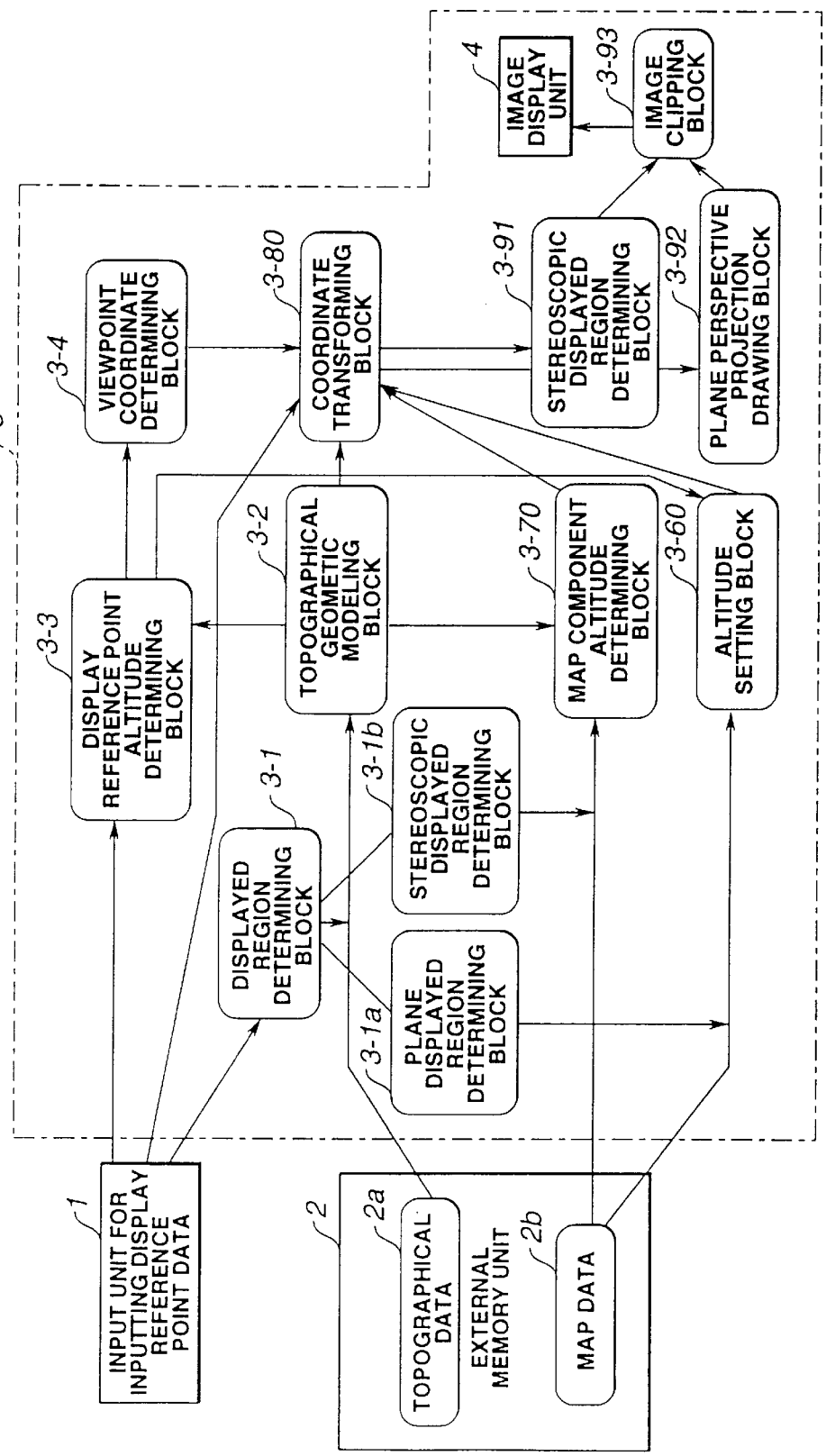
Figure 39:
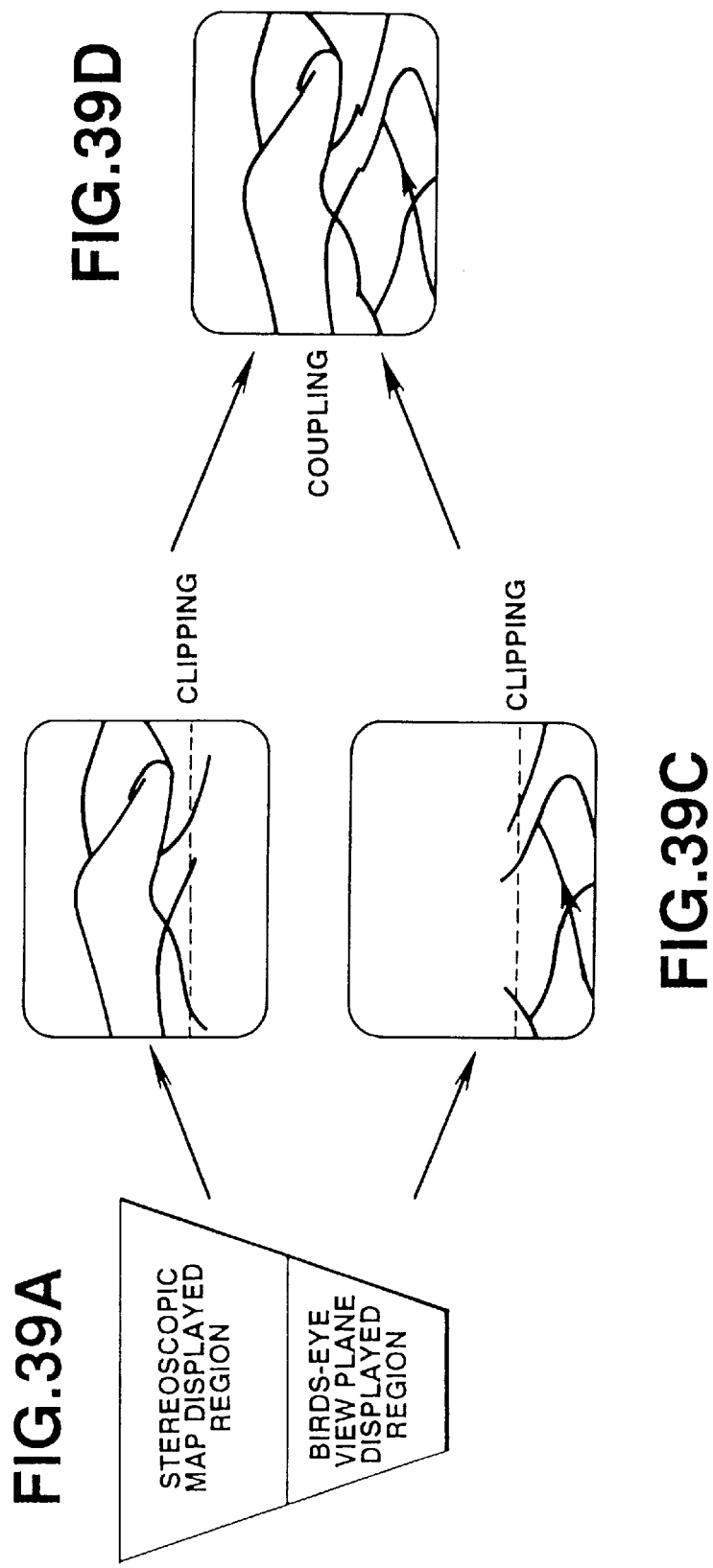
Figure 40:
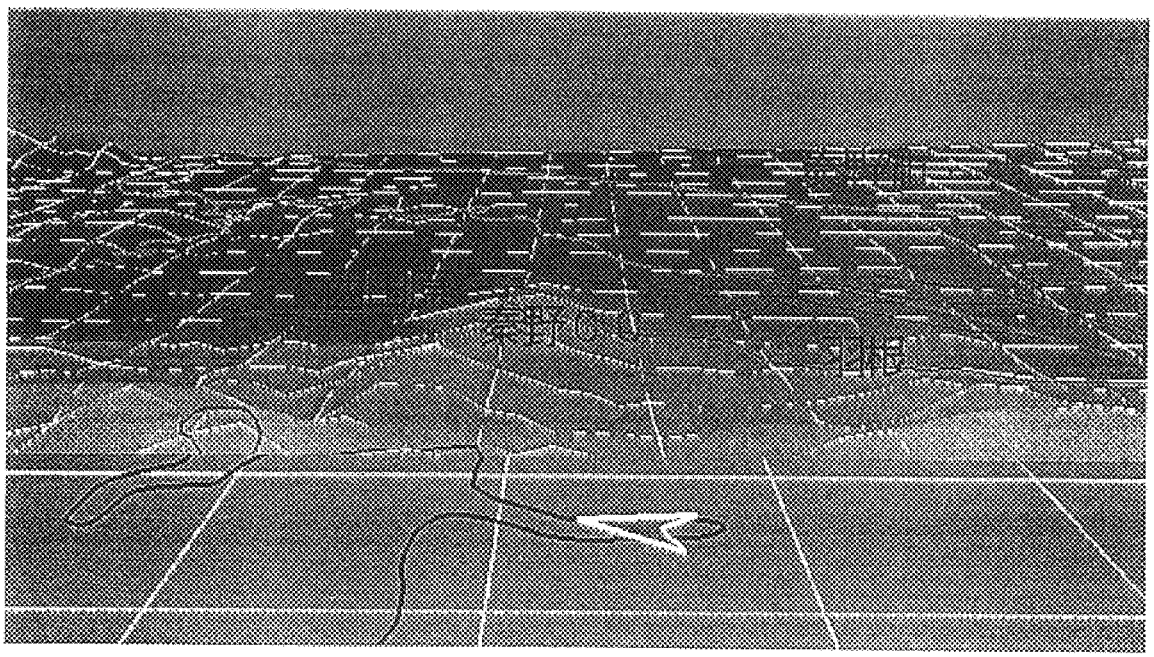

In the following, a seventh embodiment 10G of the present invention will be described with reference to FIGS. 38 to 40.

Figure 28:
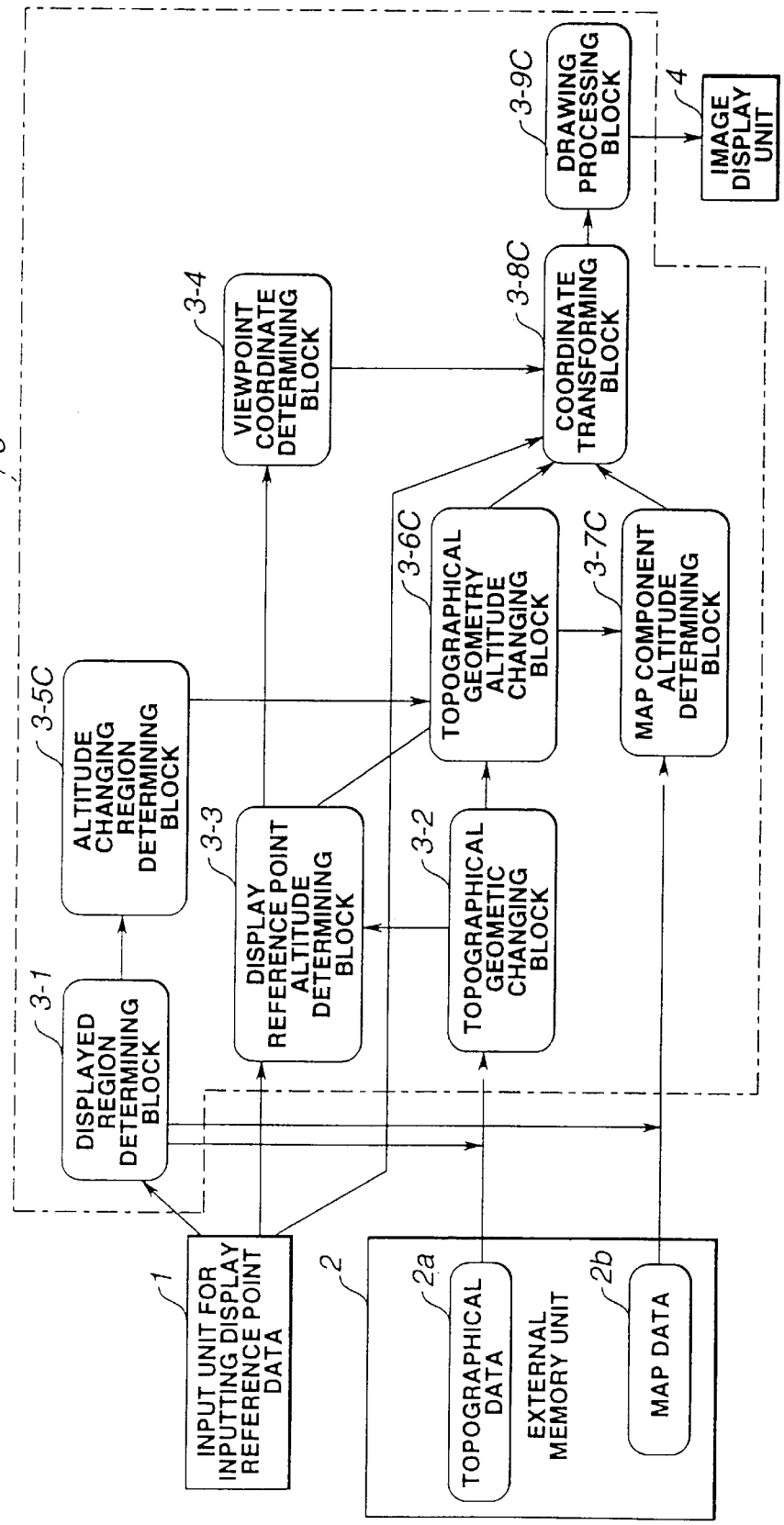

Since the seventh embodiment 10G is similar to the fourth embodiment 10D of FIG. 28, only different portions will be described in the following.

The arithmetic processing unit 3 has, in addition to the blocks 3-1 to 3-4 of the fourth embodiment 10D, a plane displayed region determining block 3-1a, a stereoscopic displayed region determining block 3-1b, an altitude setting block 3-60, a map component altitude determining block 3-70, a coordinate transforming block 3-80, a stereoscopic displayed region determining block 3-91, a birds-eye view plane drawing block 3-92 and an image clipping block 3-93.

In the plane displayed region determining block 3-1a, a predetermined part of the displayed region which is determined by the block 3-1 and thus includes the display reference point (that is, the hatched region shown in FIG. 31A of the fourth embodiment 10D) is determined as a birds-eye view plane displayed region, and in the stereoscopic displayed region determining block 3-1b, a part of the displayed region other than the above-mentioned predetermined part is determined as a stereoscopic map displayed region.

In the altitude setting block 3-60, a map component within the birds-eye view plane displayed region determined by the block 3-1a is read from the map data 2b , and an altitude value of the display reference point determined by the block 3-3 is set to the altitude value of the representing point of the map component.

In the map component altitude determining block 3-70, similar to the block 3-7C of the fourth embodiment 10D, a map component data within the stereoscopic map displayed region is read from the damp data 2b of the external memory unit 2, and if no altitude value is registered, a corresponding altitude value is derived through interpolation by executing the same processing as that for deriving the display reference point altitude value determined by the block 3-3.

In the coordinate transforming block 3-80, similar to the block 3-8C of the fourth embodiment 10D, the two-dimensional coordinate (Sx, Sy) and the depth coordinate Sz on the displayed image are derived through a perspective projection transformation.

In the stereoscopic displayed region determining block 3-91, comparison of the depth coordinate is carried out for each picture element. That is, by updating only the picture element whose depth is smaller than that which has been already drawn, a stereoscopic map drawing signal with a hidden-surface removing function is produced. In the birds-eye view plane drawing block 3-92, the map component within the birds-eye view plane displayed region is drawn with its altitude value equal to that of the display reference point set by the block 3-60 and overwritten on the stereoscopic map produced by the block 3-91. In the image clipping block 3-93, a clipping process is applied to a boundary portion between the stereoscopic map image and the birds-eye view plane image, so that a coupled image signal is fed to the image display unit 4 to permit the same to display a composite image. Color of the displayed map component changes in accordance with the altitude value of the map component, and different colors are allocated to the drawings of roads, rivers and place names. A loud color, such as red, yellow or blue is allocated to the guide route.

In the following, operation of the navigation system of the seventh embodiment 10G will be described with reference to FIGS. 39A to 39D and 40.

As is seen from FIG. 39A, at the displayed region determining block 3-1, a displayed region for the topographical data 2a of the external memory unit 2 is determined based on the position coordinate of the display reference point and the viewing line directional angle received from the input unit 1, and at both the plane displayed region determining block 3-1a and the stereoscopic displayed region determining block 3-1b, both a birds-eye view plane displayed region and a stereoscopic map displayed region within the above-mentioned displayed region are determined.

At the topographical geometric modeling block 3-2, a topographical data within the displayed region is read and modeled, and at the display reference point altitude determining block 3-3, an altitude value of a display reference point is determined, and at the viewpoint coordinate determining block 3-4, a viewpoint coordinate is determined.

At the map component altitude determining block 3-70, an operation identical to that executed by the block 3-7C of the above-mentioned fourth embodiment 10D is carried out. That is, a map display component within the stereoscopic map displayed region determined by the block 3-1b is read from the map data 2b of the external memory unit 2. If no altitude value data is present, a suitable altitude value data is derived through interpolation by using a technique similar to that of deriving the altitude value of the display reference point. At the altitude setting block 3-60, a map display component within the birds-eye view plane displayed region determined by the block 3-1a is read from the map data 2b, and an altitude value of the display reference point determined by the block 3-3 for the map display component is set.

At the coordinate transforming block 3-80, a transparent projection transformation is carried out. With this transformation, a homogenous coordinate "T=(Tx, Ty, Tz, Tw)" is derived. The two-dimensional coordinate (Sx, Sy) used for drawing is derived from the condition "Sx=Tx/Tw, Sy=Ty/Tw" and the depth coordinate "Sz" is also derived. At the stereoscopic displayed region determining block 3-91, a hidden surface removing process is applied to the display map data subjected- to the coordinate transformation. With these steps, a stereoscopic map image as shown in FIG. 39B is produced.

At the birds-eye view plane drawing block 3-92, a birds-eye view plane image as shown in FIG. 39C is produced. That is, a plane terrain is represented by drawing the background with a color determined in accordance with the altitude value of the display reference point. Based on the data subjected to the coordinate transformation at the block 3-80, the map display component whose altitude value has been set to the value of the display reference point at the block 3-60 is overwritten on a corresponding portion. At the image clipping block 3-93, a bordering portion between the stereoscopic map image and the birds-eye view plane image is clipped and these two images are coupled to produce such a final output image as shown in FIG. 39D and FIG. 40. As is seen from FIG. 40, the displayed image includes a stereoscopic area and a plane area.

The seventh embodiment 10G has the following advantages in addition to the advantages possessed by the fourth embodiment 10D. That is, since, in case of the seventh embodiment 10G, the area around the display reference point is displayed with a birds-eye view plane. Accordingly, the area around the display reference point is always displayed on the image even if a higher mountain is actually present at the side of the viewpoint.

In the following, eighth and ninth embodiments 10H and 10I of the present invention will be described with reference to the drawings.

As will become apparent as the description proceeds, in s these embodiments 10H and 10I, the color of the background of the displayed map can change in accordance with the natural condition (such as season, weather, time, etc.,) under which the system-mounted vehicle actually runs.

In FIGS. 41 to 44C, there is shown a navigation system 10H of the eighth embodiment of the present invention.

Figure 41:
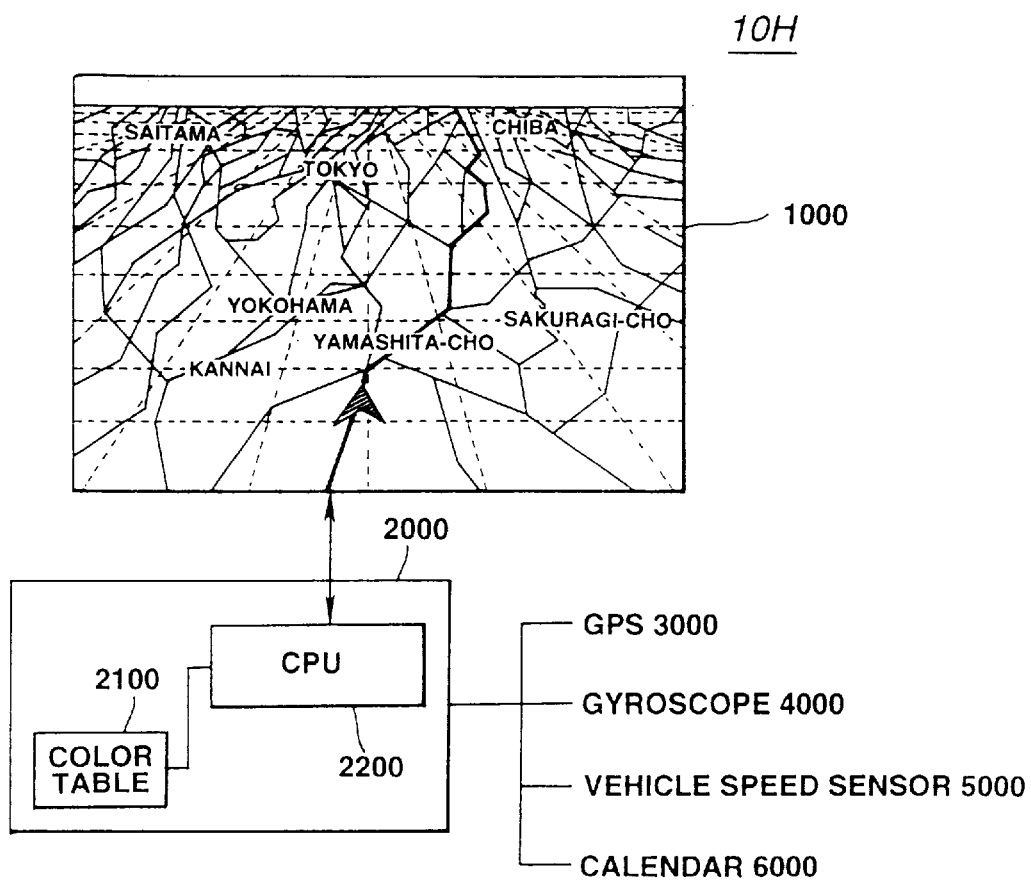

As is seen from FIG. 41, the navigation system 10H comprises generally an image display unit 1000, a navigation device proper 2000, a global positioning system (GPS) 3000, a gyroscope 4000, a vehicle speed sensor 5000 and a calendar clock 6000. The image display unit 1000 is a device for displaying a road map information in color, which is, for example, a liquid crystal color display unit, a cathode ray tube display unit or the like. The navigation device proper 2000 includes a microcomputer and a CD-ROM drive. The drive can operatively drive a CD-ROM which has a road map information stored therein. The global positioning system 3000 senses the position of the system-mounted vehicle, the gyroscope 4000 senses the direction in which the vehicle runs, the vehicle speed sensor 5000 senses the running speed of the vehicle and the calendar clock 6000 shows day, date, month and year. The information from the sensors 3000 to 6000 is fed to the navigation device proper 2000.

The navigation device proper 2000 includes a CPU 2200 for executing various arithmetical processing and a color table 2100 registered for effecting a color correction.

In the following, operation of the navigation system 10H will be described with reference to the flowchart of FIG. 42. That is, by executing various operation steps carried by the flowchart, color correction is automatically carried out in accordance with the natural condition.

At step S1000, information data from the calendar clock 6000 is read and at step S2000, based on the read information data, current natural condition, viz., one of the four seasons, is determined or recognized. Then, at step S3000, based on the season thus determined, a correction for a displayed color is carried out with reference to the color table 2100. With this step, the color of the background of the displayed map image on the screen of the image display unit

1000 is changed. The background of the displayed map may include many things except fixed information members such as roads, place names and the like.

At step S4000, judgment is carried out as to whether or not the changed color for the background satisfies the following inequality (13) which will be described in detail hereinafter.

$$12 \leq \Delta Euv \leq 250/(M+2) \tag{13}$$

That is, at step S4000, judgment is carried out as to whether the changed color is acceptable or not. IF NO, the operation flow goes to step S5000. At this step, the changed color is changed again with reference to the color table 2100. This color changing process repeats until the equation (9) is satisfied, that is, until the changed color is accepted at the step S4000. If accepted, the background is displayed with the accepted color.

In the following, the color table 2100 will be described.

A color scheme of the stereoscopic map display which matches well to that normally memorized by men is set as a reference color scheme. The respective displayed colors for four seasons are selected with reference to literatures on color or by setting out a questionnaire. For example, bluish green, yellow, red and white may be adopted as base colors for spring, summer, autumn and winter.

Figure 43A:
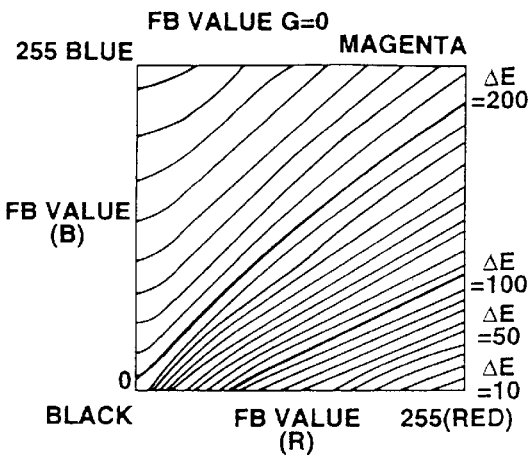
FIGS. 43A, 43B and 43C are graphs depicting the results of calculation of the color difference "ΔEuv"
Figure 43B:
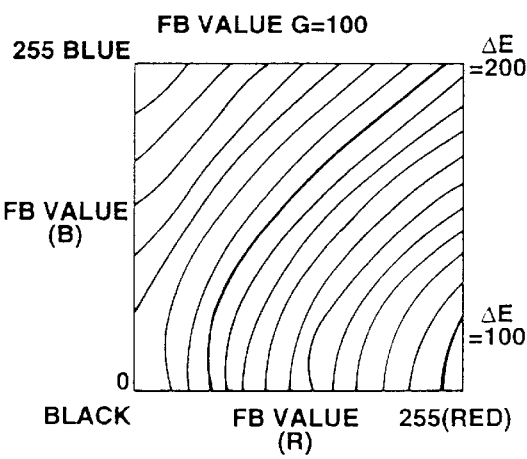
Figure 43C:
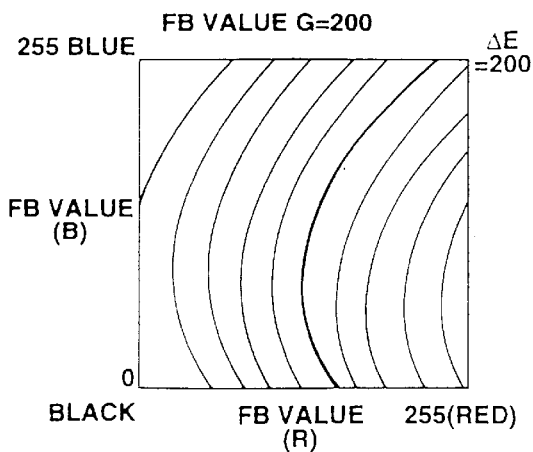

In order to represent a color shift quantitatively, a so-called "CIELUV uniform color space method" may be used. In this case, a color difference "ΔEuv" is derived from an equation which is defined by JIS (viz., Japanese Industrial Standard) based on three stimulus values of display. In case wherein a cathode ray tube (CRT) is employed as the image display unit 4, the color difference "ΔEuv" shows such characteristic as depicted in FIGS. 43A to 43C. That is, the color difference "ΔEuv" is derived by executing the following equation (14).

$$\Delta Euv = \text{Fluorescent substance FB value} - \text{Color difference characteristic} \tag{14}$$

Usually, the value of FB is an integral number from 0 to 255. In the example of the drawings, the equation is made with respect to a fixed color "red (R,G,B)=(255, 0, 0)".

The minimum limit recognition amount between a color for roads and place names and a color for the background is determined to 12 with reference to disclosure of color handbooks and recognized psychological tests. According to these tests, "ΔEab (color discrimination value)>12" and "ΔEab=ΔEuv" have been recognized. The minimum limit recognition amount corresponds to an amount of color shift.

The maximum limit recognition amount between the two colors is determined to an amount smaller than "250/(M+2)" wherein "M" represents the number of intermediate colors used. This determination is based on a fact that the maximum value of color difference in case of display is about 200 to 300. That is, the above-mentioned equation (13) is determined.

A color scheme normally memorized by men as the color scheme of a season depends on the natural color, for example, the color of mountain in the season. In view of this thought, it is effective to change the color of a higher altitude portion, for example, the color of mountains. In the disclosed example, portions having an altitude higher than about 400 m are regarded as mountains to which color change is applied. If it is intended to effect color change to only real mountains, the gradient (which may be 15 to 20° in angle) of each mountain derived from the altitude may be used for recognizing the mountain.

In the following, a case wherein "ATD model method" is used in place of the "CIELUV uniform color space method" will be described. In fact, in case wherein light emitting type display such as CRT, liquid crystal display or the like is used, "ATD model method" is superior to the "CIELUV uniform color space method" in matching the color on the display with a real natural color.

A vector luminance "V" of the ATD model method is derived from the following equation (15). This equation is shown in a thesis of Mr. Guth.

$$V = (A^2 + T^2 + D^2)^{0.5} \tag{15}$$

wherein:

A (brightness) channel=mA·0.9341X

T (red-green) channel=mT·(0.7401X−0.6801Y−0.1567Z)

D (blue-yellow) channel=mD·(−0.0061X−0.0212Y+0.0314Z)

mA=0.3 mT=1 mD=6

X, Y & Z : stimulus values

Figure 44A:
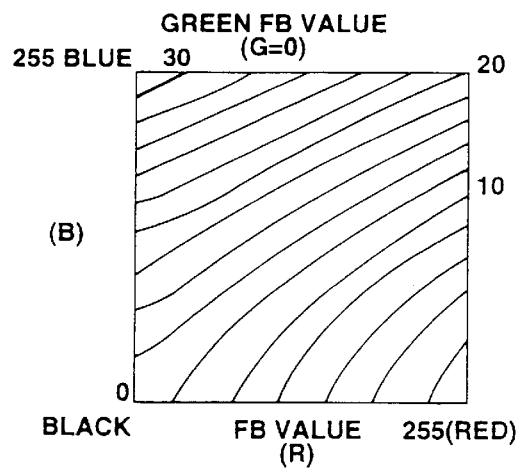
Figure 44B:
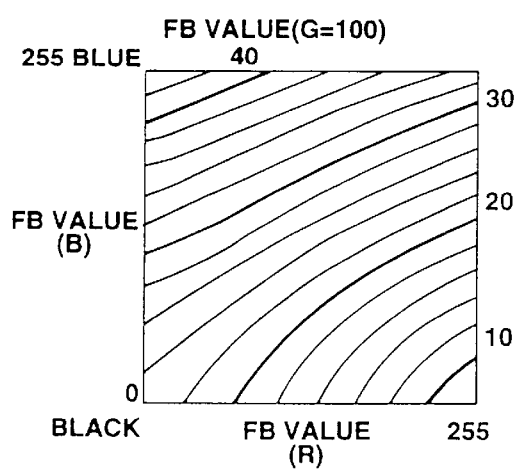
Figure 44C:
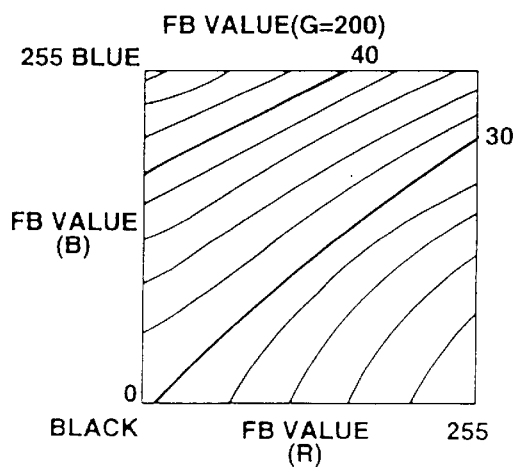

The result of this equation is depicted in FIGS. 44A to 44C. According to this result, a desired amount (ΔATD) of color shift is represented by the following inequality (16).

$$1.5 < \Delta ATD \leq 25/(M+2) \tag{16}$$

By carrying out the above-mentioned processes, incompatibility inevitably sensed when comparing the color of the displayed map on the screen and the real color of the surrounding scenery of the system-mounted vehicle can be lowered.

Figure 45:
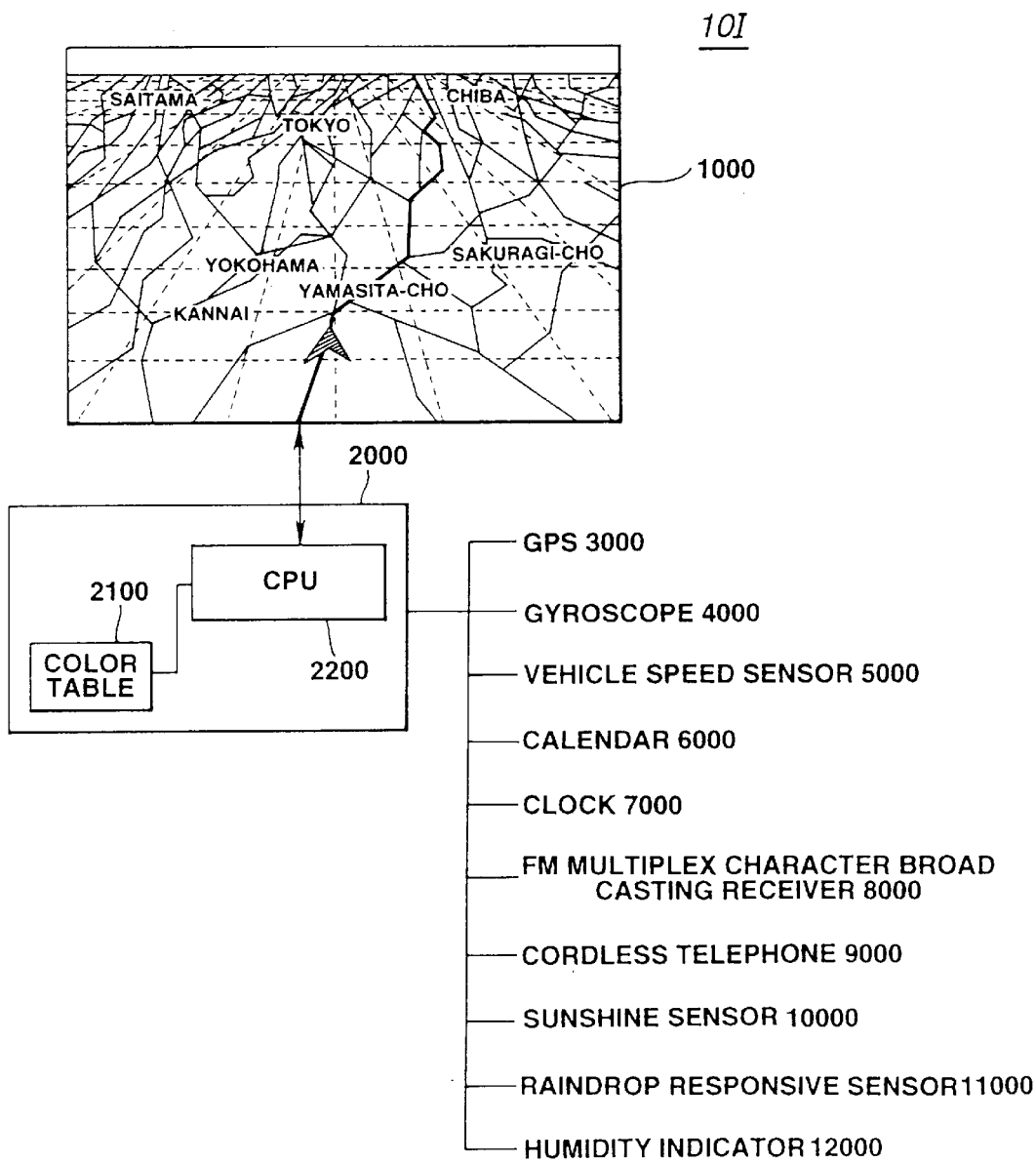
Figure 46:
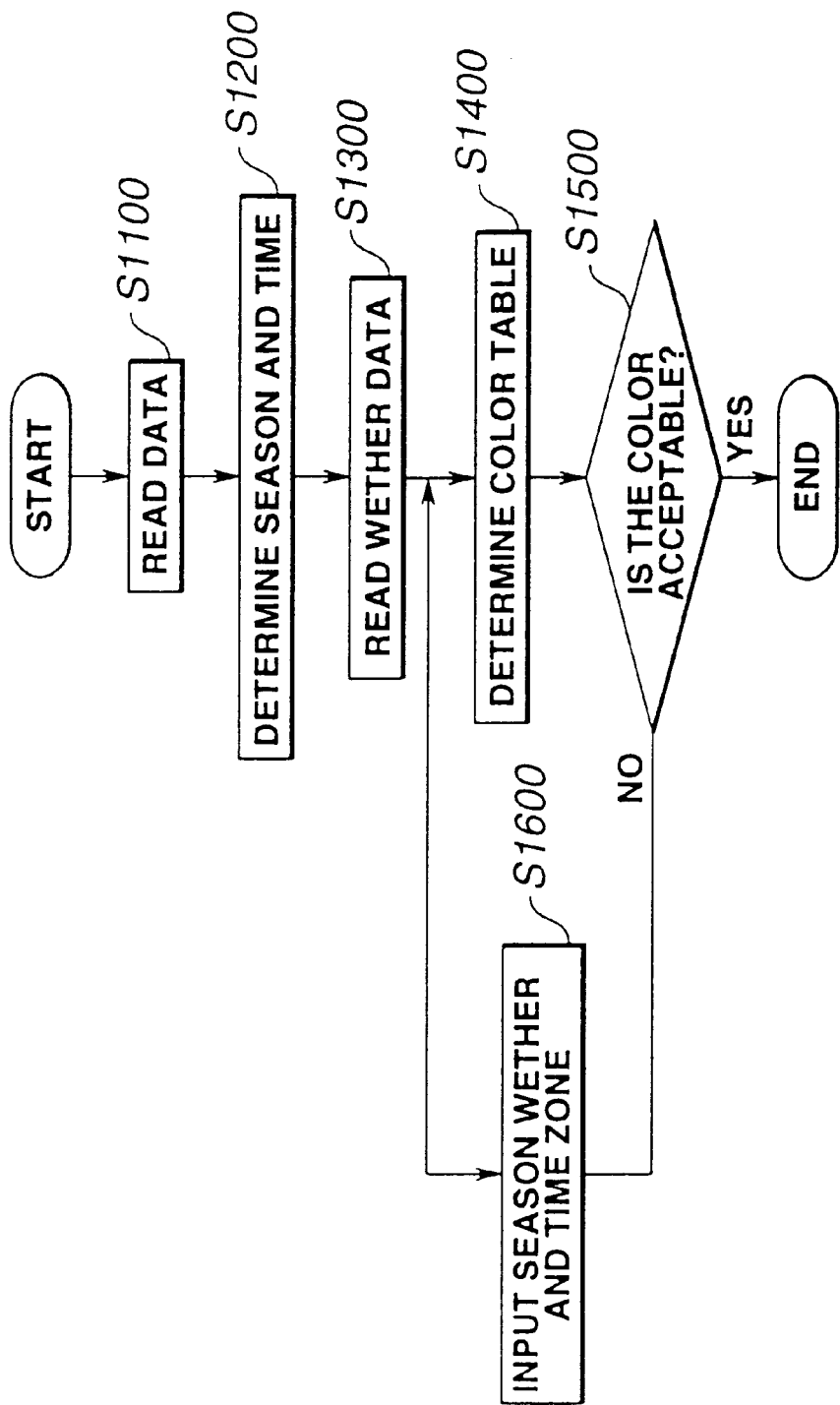

In FIGS. 45 and 46, there is shown a navigation system 10I of the ninth embodiment of the present invention.

Since the system 10I of this embodiment is similar to the system 10H of the above-mentioned eighth embodiment, only portions different from those of the eighth embodiment 10H will be described in the following.

That is, in this ninth embodiment 10I, a clock 7000, a FM multiplex character broadcasting receiver 8000, a cordless telephone 9000, a sunshine sensor 10000, a raindrop responsive sensor 11000 and a humidity indicator 12000 are additionally provided. The clock 7000 shows the present time.

The color table 2100 includes three types of color tables, one being for effecting a color correction in accordance with season, one being for correction in accordance with weather and the other being for correction in accordance with time.

In the following, operation of the navigation system 10I will be described with reference to the flowchart of FIG. 46.

At step S1100, information data from the calendar clock 6000 and the clock 7000 is read, and at step S1200, based on the read information data, current conditions, viz., one of the four seasons and the current time zone, are determined or recognized. Then, at step S1300, weather information from the broadcasting receiver 8000, cordless telephone 9000, sunshine sensor 10000, raindrop responsive sensor 11000 and/or humidity indicator 12000 is read, and based on the read data, the weather at the present time is determined or recognized.

The weather determination based on the information data from the sunshine sensor 10000, the raindrop responsive sensor 11000 and the humidity indicator 12000 is made as follows.

Rainy Condition Determination:

Raindrop responsive sensor 11000 issues ON signal and the humidity indicator 12000 issues a signal representing over 80% humidity.

Cloudy Condition Determination:

Raindrop responsive sensor 11000 issues OFF signal, the humidity indicator 12000 issues a signal representing under 80% humidity and the sunshine sensor 10000 issues a signal representing under 1000 lux.

Fine Condition Determination:

Raindrop responsive sensor 11000 issues OFF signal, the humidity indicator 12000 issues a signal representing under 80% humidity and the sunshine sensor 10000 issues a signal representing over 1000 lux.

If desired, the information data from the sunshine sensor 10000 may be modified in accordance with the position where the system-mounted vehicle actually runs.

In order to avoid too much frequent change in weather determination, it is preferable to use an average value of the brightness (lux) sensed by the sunshine sensor 10000 for over 20 seconds in which the vehicle is running at a speed higher than 10 Km/h.

Then, at step S1400, based the above-mentioned determinations, processing for changing the color of display is carried out with reference to the three types of color tables. Then, at step S1500, judgment is carried out as to whether the changed color is within a reference range or not, that is, whether the color is acceptable or not. If NO, the operation flow goes to step S1600. At this step, the changed color is changed again with reference to the three color tables. This color change process repeats until the color is accepted at the step S1500. If accepted, the background is displayed with the accepted color.

The color change according to the three color tables is carried out as follows.

Colors for Seasons:

Bluish green, yellow, orange and white are adopted as colors for representing spring, summer, autumn and winter respectively.

Weather:

Higher chroma, medium chroma and lower chroma are adopted as representing fine, cloudy and rainy days respectively.

Time Zone:

Higher brightness and lower brightness are adopted as representing day time and afternoon/night time respectively.

That is, for example, in case of fine day of spring and day time, a combination including "bluish green", "higher chroma" and "higher brightness" is adopted, and in case of cloudy day of winter and afternoon time, a combination including "white", "medium chroma" and lower brightness is adopted.

This minimum limit recognition amount between a color for roads and place names and a color for the background is determined from the inequality "$12 \leq \Delta Euv \leq 250/(M+2)$". That is, the color shift is effected within this range.

Correction of the reference color (viz., shifting from the reference color) is made as follows. First, hue (H), chroma (S) and brightness (L) of a base color are represented by HSL color-space-coordinate, and then this coordinate is transformed to RGB color-space-coordinate. Thereafter, linear correction is applied repeatedly to the RGB color-space-coordinate until a desired color is obtained. Assuming that the HSL color-space-coordinate of a certain base color is represented by a point (0, 100, 100) in RGB color-space-coordinate, a color shifting to a point (0, 50, 90) in RGB color-space-coordinate takes the following steps. That is, a line extending between these two points is defined, then points (0, 90, 98), (0, 80, 96), (0, 70, 94), (0, 60, 92) . . . on this line are defined, and then colors corresponding to these points are selected in order. This selection is repeated until the selected color satisfies the inequality "$12 \leq \Delta Euv \leq 250/(M+2)$".

By carrying out the above-mentioned processes, incompatibility inevitably sensed when comparing the color of the displayed map on the screen and the real color of surrounding scenery of the system-mounted vehicle can be lowered.

In the ninth embodiment 10I, the above-mentioned "ATD model method" can be used. In this case, the inequality "$1.5 \leq \Delta ATD \leq 25/(M+2)$" is adopted.

What is claimed is:

1. A navigation system comprising:

a topographical data memory storing a topographical data which provides topographical plane coordinates with altitude values of displayed components;

a map data memory storing position and attribute information on map display components which include roads and names of places;

an input unit which inputs display reference point position coordinates and viewing line directional angle by which the position and direction of displayed map are derived;

a displayed region determining block which determines a region displayed on a screen in accordance with information issued from said input unit;

a topographical geometric modeling block which reads from said topographical data memory a topographical geometric data on the displayed region determined by said displayed region determining block and carries out modeling of the topographical geometry by processing said topographical geometric data;

a display reference point altitude determining block which determines an altitude value of the display reference point by processing both the information from said input unit and the information from said topographical geometric modeling block;

a viewpoint coordinate determining block which determines a viewpoint coordinate by processing both the information from said input unit and said display reference point altitude determining block;

a map component altitude determining block which reads from said map data memory a map display component within said displayed region and determines an altitude value of said map display component with reference to information from said topographical geometry modeling block thereby to produce a display graphic data;

a coordinate transforming block which, based on both information from said viewpoint coordinate determining block and information from said input unit, applies a perspective-projection transformation to both information from said topographical geometric modeling block and information from said map component altitude determining block;

a drawing process block which produces a stereoscopic map image by processing information from said coordinate transforming block; and an image display unit which actually displays said stereoscopic map image.

2. A navigation system as claimed in claim 1, in which said drawing process block processes the information from said coordinate transforming block while effecting a hidden surface removing process.

3. A navigation system as claimed in claim 1, in which said drawing process block draws a displayed guide route with a color and a line which are different from those for a displayed normal road.

4. A navigation system as claimed in claim 1, in which said topographical geometric modeling block forms three-dimensional sampling point groups (x, y, z) by setting suitably distributed point groups in said displayed region and reading from the topographical data memory an altitude value "z" corresponding to the plane coordinates of each point, and forms a polyhedral topographical geometry model by connecting the three-dimensional sampling groups with straight lines in accordance with a given rule.

5. A navigation system as claimed in claim 4, in which the sampling point groups placed near said viewpoint coordinate have a higher distribution density and the sampling points groups placed remote from said viewpoint have lower distribution density.

6. A navigation system as claimed in claim 1, in which said viewpoint coordinate determining block varies the altitude coordinate value of the viewpoint coordinate in accordance with the display reference point altitude value determined by said display reference point altitude determining block.

7. A navigation system as claimed in claim 6, in which said viewpoint coordinate determining block determines the altitude value of said viewpoint coordinate by adding a predetermined offset to said display reference point altitude value.

8. A navigation system as claimed in claim 1, in which, in case wherein the map data stored in said map data memory is of a type wherein position information on the map components is stored in the form of a two-dimensional coordinate and wherein the map components include roads and name places except altitude values therefor, said topographical geometric modeling block derives, with reference to the topographical geometric model produced by said topographical geometric modeling block, a two-dimensional coordinate altitude value corresponding to the two-dimensional coordinate possessed by said map display components and produces the display graph data in the form of a three-dimensional coordinate.

9. A navigation system as claimed in claim 8, in which the map data stored in said map data memory includes a position information described in a two-dimensional coordinate of point groups constituting road links and a road type information indicating whether said road links indicate a high level road or a tunnel, and in which when determining the altitude value of the constituting point based on the two-dimensional position information of said road link constituting point and said topographical geometric model, said map component altitude determining block calculates the altitude value of internal constituting point of the road links in view of altitude values of two terminal points of the road links without respect to the topographical geometric model in case wherein said internal constituting point of the road links show a high level road or a tunnel.

10. A navigation system as claimed in claim 8, in which the map data stored in said map data memory includes a position information described in a two-dimensional coordinate of point groups constituting road links and a road type information indicating whether said road links indicate a high level road or a tunnel, and in which when determining the altitude value of the constituting point based on said position information and the altitude value of said topographical geometric model, said map component altitude determining block adds to said road links new constituting points which divides said road links and calculates the altitude values of said new constituting points with reference to the topographical geometric model in case wherein the road links corresponding to the constituting points do not indicate a high level road nor a tunnel and the density of said constituting points is smaller than that of the sampling points determined by said topographical geometric modeling block.

11. A navigation system as claimed in claim 1, in which when producing said display graphic data for road, railway, water system and facilities, said map component altitude determining block adds to an original altitude value of them given from external and internal information means a predetermined offset value thereby to produce a coordinate value of said road, railway, water system and said facilities in the direction of the height.

12. A navigation system as claimed in claim 11, in which the offset value of said road and said railway is greater than that of said water system and said facilities.

13. A navigation system as claimed in claim 11, in which an offset value used for defining said guide route is greater than that for the road and said railway.

14. A navigation system as claimed in claim 11, in which when determining the altitude value of a graphic data for indicating the present position of the system-mounted vehicle, said map component altitude determining block adds to the altitude value determined based on the topographical geometric model given by the topographical geometric modeling block a predetermined offset value thereby to produce a coordinate value of the present position of the system-mounted vehicle in the direction of height.

15. A navigation system as claimed in claim 14, in which the offset value used for indicating the present position of the system-mounted vehicle is greater than that for the road and said railway.

16. A navigation system as claimed in claim 11, in which when producing the display graphic data used for indicating a position where a place name is shown, said map component altitude determining block adds to an original altitude value of said position given by external and internal information means an offset value which is greater than the offset value determined for the road thereby to produce a coordinate value of the display position for the place name in the direction of the height.

17. A navigation system as claimed in claim 11, in which when producing the display graphic data used for indicating a position where a place name is shown, said map component altitude determining block adds to an original altitude value of said position given by external and internal information means a given offset value thereby to produce a coordinate value of the display position for the place name in the direction of the height, said given offset value being so determined that any character in a character train to be displayed at said position is not hidden by the topographical geometry of the display position.

18. A navigation system as claimed in claim 1, in which when, as a result of said perspective-projection transformation, a plurality of draw elements for the display map component are realized to be overlapped on the same viewing line, said drawing process block operates to display on the image display unit only a portion other than the overlapped portion in case of displaying the draw elements located remote from the viewpoint.

19. A navigation system as claimed in claim 1, in which when, as a result of said perspective-projection transformation, a plurality of draw elements for the display map component are realized to be overlapped on the same viewing line, said drawing process block operates to display on the image display unit the overlapped portion with a color different from that of the other portion in case of displaying the draw elements located remote from the viewpoint.

20. A navigation system as claimed in claim 19, in which the color for said overlapped portion is prepared by mixing the color for the other portion and the color for the overlapped portion.

21. A navigation system as claimed in claim 1, in which when, as a result of said perspective-projection transformation, a plurality of draw elements for the display map component are realized to be overlapped on the same viewing line, said drawing process block operates to display on the image display unit the overlapped portion with a dotted line.

22. A navigation system as claimed in claim 1, in which when drawing a polygon representing the topographical geometry, said drawing process block operates to draw each of planes of said polygon with a color which changes in accordance with the altitude of the topographical geometry.

23. A navigation system as claimed in claim 22, in which during the process for drawing each of the planes of said polygon with the changing color, said drawing process block operates to draw lines each extending between adjacent apexes of said polygon.

24. A navigation system as claimed in claim 23, in which each of said lines which are drawn is one of a line of longitude and a line of latitude.

25. A navigation system as claimed in claim 1, further comprising:
   a first block which issues information on seasons;
   a second block which memorizes color information corresponding to said seasons;
   a third block which displays color determined by said image display unit;
   a fourth block which makes a color correction to the displayed color on the third block by reading, from said second block, the color information in accordance with the seasonal information from said first block.

26. A navigation system as claimed in claim 1, further comprising:
   a first block which issues the present time;
   a second block which memories color information corresponding to the present time;
   a third block which displays color determined by said image display unit;
   a fourth block which makes a color collection to the displayed color on the third block by reading, from said second block, the color information in accordance with the time information from said first block.

27. A navigation system as claimed in claim 1, further comprising:
   a first block which issues the present weather;
   a second block which memorizes color information corresponding to the present weather;
   a third block which displays color determined by said image display unit;
   a fourth block which makes a color collection to the displayed color on the third block by reading, from said second block, the color information in accordance with the weather information from said first block.

28. A navigation system comprising:
   a topographical data memory storing a topographical data which provides topographical plane coordinates with altitude values of displayed components;
   a map data memory storing position and attribute information on map display components which include roads and names of places;
   an input unit which inputs display reference point position coordinates and viewing line directional angle by which the position and direction of displayed map are derived;
   a displayed region determining block which determines a region displayed on a screen in accordance with information issued from said input unit;
   a topographical geometric modeling block which reads from said topographical data memory a topographical geometric data on the displayed region determined by said displayed region determining block and carries out modeling of the topographical geometry by processing said topographical geometric data, said modeling block forming three-dimensional sampling point groups (x, y, z) by setting suitably distributed point groups in said displayed region and reading from the topographical data memory an altitude value "z" corresponding to the plane coordinates of each point, and forming a polyhedral topographical geometry model by connecting the three-dimensional sampling groups with straight lines in accordance with a given rule;
   a display reference point altitude determining block which determines an altitude value of the display reference point by processing both the information from said input unit and the information from said topographical geometric modeling block;
   a viewpoint coordinate determining block which determines a viewpoint coordinate by processing both the information from said input unit and said display reference point altitude determining block;
   a map component altitude determining block which reads from said map data memory a map display component within said displayed region and determines an altitude value of said map display component with reference to information from said topographical geometry modeling block thereby to produce a display graphic data;
   a coordinate transforming block which, based on both information from said viewpoint coordinate determining block and information from said input unit, applies a perspective-projection transformation to both information from said topographical geometric modeling block and information from said map component altitude determining block;
   a topographical geometry drawing process block which draws said polyhedral topographical geometry, which has been subjected- to said perspective-projection transformation by said coordinate transforming block, in order from the depth in an overwriting manner thereby to output a stereoscopic map image;
   a map component altitude comparing block which compares the altitude value of the display position of each map display component determined by the map component altitude determining block with the altitude value of a corresponding portion of the topographical geometry;
   a map component drawing process block which, based on the result of the comparison by said map component altitude comparing block, overwrites on said topographical geometry the map display component whose altitude value is equal to and greater than the altitude value of the corresponding portion of the topographical geometry; and an image display unit which couples the stereoscopic map image produced by said topographical geometry drawing process block and the map component image produced by said map component drawing process block and displays the coupled image.

29. A navigation system as claimed in claim 28, in which, based on the color drawn on the topography, said map component altitude comparing block compares the altitude value of the display position of each map display component with the altitude value of the corresponding portion of the topographical geometry.

30. A navigation system as claimed in claim 28, in which when the map display component to be displayed is a guide route, said map component drawing process block draws said guide route with color or line which is different from that drawn for a normal road.

31. A navigation system as claimed in claim 28, in which when said map display component is of a line-figured map component, said map component altitude comparing block instructs said map component drawing process block to carry out overwriting of links of the line-figured map component when the altitude values of both ends of said links are equal to or greater than the altitude values of the corresponding portions of the topographical geometry, and in which when said map display component is of a flat map component, said map component altitude comparing block instructs said map component drawing process block to carry out overwriting of the surface map component when the altitude values of all apexes of said surface map component are equal to or greater than the altitude values of the corresponding portions of the topographical geometry.

32. A navigation system as claimed in claim 28, in which when said map display component is of a line-figured map component, such as road, river or railroad, said map component altitude comparing block instructs said map component drawing process block to draw the line-figured map component with a color or line different from that of the other portion when one of the altitude values of ends of said links is smaller than the altitude value of the corresponding portion of the topographical geometry.

33. A navigation system as claimed in claim 28, further comprising:
  a first block which issues information on seasons;
  a second block which memorizes color information corresponding to said seasons;
  a third block which displays color determined by said image display unit;
  a fourth block which makes a color collection to the displayed color on the third block by reading, from second block, the color information in accordance with the seasonal information from said first block.

34. A navigation system as claimed in claim 28, further comprising:
  a first block which issues the present time;
  a second block which memorizes color information corresponding to the present time;
  a third block which displays color determined by said image display unit;
  a fourth block which make a color correction to the displayed color on the third block by reading, from said second block, the color information in accordance with the time information from said first block.

35. A navigation system as claimed in claim 28, further comprising:
  a first block which issues the present weather;
  a second block which memorizes color information corresponding to the present weather;
  a third block which displays color determined by said image display unit;
  a fourth block which makes a color correction to the displayed color on the third block by reading, from said second block, the color information in accordance with the weather information from said first block.

36. A navigation system comprising:
  a topographical data memory storing a topographical data which provides topographical plane coordinates with altitude values of displayed components;
  a line-figured data memory storing position and attribute information on map display components which include roads, rivers and railway;
  a place name and background data memory storing position and attribute information on map display components which include name places and icons;
  an input unit which inputs display reference point position coordinates and viewing line directional angle by which the position and direction of displayed map are derived;
  a displayed region determining block which determines a region displayed on a screen in accordance with information issued from said input unit;
  a topographical geometric modeling block which reads from said topographical data memory a topographical geometric data on the displayed region determined by said displayed region determining block and carries out modeling of the topographical geometry by processing said topographical geometric data, said modeling block forming three-dimensional sampling point groups (x, y, z) by setting suitably distributed point groups in said displayed region and reading from the topographical data memory an altitude value "z" corresponding to the plane coordinates of each point, and forming a polyhedral topographical geometry model by connecting the three-dimensional sampling groups with straight lines in accordance with a given rule;
  a display reference point altitude determining block which determines an altitude value of the display reference point by processing both the information from said input unit and the information from said topographical geometric modeling block;
  a viewpoint coordinate determining block which determines a viewpoint coordinate by processing both the information from said input unit and said display reference point altitude determining block;
  a map component altitude determining block which reads from said line-figured data memory a line-figured data within said displayed region, reads from said place name and background data memory said place name and background data and determines an altitude value of each of said line-figured map component and the positions of said place name and said icon with reference to information from said topographical geometry modeling block thereby to produce a display graphic data;
  a coordinate transforming block which, based on both the viewpoint coordinate determined by said viewpoint coordinate determining block and the viewing line directional angle input from said input unit, applies a perspective-projection transformation to both said topographical geometry model and said display graphic data, such as the line-figured map component, the place name and the icon whose altitude values have been determined;

a drawing process block which effects drawing and outputs a stereoscopic map image signal while carrying out a hidden surface removing process applied to the data to which said transparent-projection transformation has been applied by said coordinate transforming block;

a line-figured data altitude comparing block which compares the altitude value of an end of each link of the line-figured data determined by said map component altitude determining block with the altitude value of a corresponding portion of the topographical geometry;

a line-figured data drawing process block which, based on a result of the comparison by said line-figured data altitude comparing block, overwrites on the topographical geometry the line-figured map component when the altitude value of the end of the link of the line-figured component is equal to or greater than the altitude value of the corresponding portion of the topographical geometry; and an image display unit which couples the stereoscopic map image from said drawing process block and the line-figured image from said line-figured data drawing process block and displays the coupled image.

37. A navigation system as claimed in claim 36, in which when said line-figured component to be displayed is a guide route, said line-figured data drawing process block draws said guide route with color or line which is different from that drawn for a normal road.

38. A navigation system as claimed in claim 37, in which when the altitude values of each link of the line-figured map component are equal to or greater than the altitude values of the corresponding portions of the topographical geometry, said line-figured data altitude comparing block instructs said line-figured data drawing process block to carry out overwriting of the links of the line-figured map component.

39. A navigation system as claimed in claim 36, in which when the altitude value of at least one of ends of each link of said line-figured map component is smaller than the altitude value of a corresponding portion of the topographical geometry, said line-figured data altitude comparing block instructs said line-figured data drawing process block to carry out overwriting of the line-figured map component with a color or line which is different from that drawn for other portion.

40. A memorizing medium memorizing a navigation program including the steps of:
(a) determining a displayed region based on a position coordinate of a display reference point and a viewing line directional angle data;
(b) reading a topographical geometric data within said displayed region and effecting modeling of the topographical geometry;
(c) determining an altitude value of said display reference point with reference to both said position coordinate of said display reference point and said topographical geometric model;
(d) determining a viewpoint coordinate for a perspective-projection transformation with reference to the position coordinate of said display reference point, said viewing line directional angle and the altitude value of said display reference point;
(e) reading map display component data within said displayed region and determining an altitude value of the map display component based on, if needed, said topographical geometric model thereby to provide a display graphic data;
(f) applying a transparent-projection transformation to both said topographical geometry model and said map display component whose altitude value has been determined, with reference to both said viewpoint coordinate and said viewing line directional angle; and
(g) producing a stereoscopic map image signal from the data to which said transparent-projection transformation has been applied.

41. A memorizing medium memorizing a navigation program including the steps of:
(a) determining a displayed region based on a position coordinate of a display reference point and a viewing line direction angle data;
(b) forming three-dimensional sampling point groups (x, y, z) by setting suitably distributed point groups in said displayed region and reading an altitude value "z" corresponding to plane coordinates (x, y) of each point, and forming a polyhedral topographical geometry model by connecting the three-dimensional sampling groups with straight lines in accordance with a given rule;
(c) determining an altitude value of said display reference point with reference to the position coordinate of said display reference point and said topographical geometric model;
(d) determining a viewpoint coordinate for a perspective-projection transformation with reference to the position coordinate of said display reference point, said viewing line direction angle and the altitude value of said display reference point;
(e) reading map display component data within said displayed region and determining an altitude value of the map display component based on, if needed, said topographical geometric model thereby to provide a display graphic data;
(f) applying a transparent-projection transformation to both said topographical geometric model and said map display component whose altitude value has been determined, with reference to both said viewpoint coordinate and said viewing line directional angle;
(g) producing an image signal for drawing a polygon which shows the transformed topographical geometry, said polygon being drawn in order from the depth in overwriting manner;
(h) comparing the altitude value of the display position of each map display component with the altitude value of a corresponding portion of the topographical geometric model; and
(i) producing in accordance with the result of the comparison an image signal by which only the map display component whose altitude value is greater than that of the corresponding portion of said topographical geometry is overwritten on the topographical geometric model.

42. A memorizing medium memorizing a navigation program including the steps of:
(a) determining a displayed region based on a position coordinate of a display reference point and a viewing line direction angle data;
(b) forming three-dimensional sampling point groups (x, y, z) by setting suitably distributed point groups in said displayed region and reading an altitude value "z" corresponding to plane coordinates (x, y) of each point, and forming a polyhedral topographical geometry model by connecting the three-dimensional sampling groups with straight lines in accordance with a given rule;

(c) determining an altitude value of said display reference point with reference to the position coordinate of said display reference point and said topographical geometric model;

(d) determining a viewpoint coordinate for a perspective-projection transformation with reference to the position coordinate of said display reference point, said viewing line direction angle and the altitude value of said display reference point;

(f) reading a line-figured map display component data within said displayed region, reading a place name and background data and determining an altitude value of each of said line-figured map component and the positions of said place name and said icon with reference to said topographical geometric model thereby to produce a display graphic data;

(g) based on the viewpoint coordinate and the viewing line directional angle, applying a transparent-projection transformation to both said topographical geometry model and said display graphic data, such as the line-figured map component, the place name and the icon whose altitude values have been determined;

(h) effecting drawing and outputting a stereoscopic map image signal while carrying out a hidden surface removing process applied to the data to which the transparent-projection transformation has been applied; and (i) comparing the altitude value of an end of each line of the line-figured map component with the altitude value of a corresponding portion of the topographical geometry, and based on a result of the comparison, overwriting on the topographical geometry the line-figured map component when the altitude value of the end of the link of the line-figured component is greater than the altitude value of the corresponding portion of the topographical geometry.

43. A navigation system comprising:

a topographical data memory storing a topographical data which provides topographical plane coordinates with altitude values of displayed components;

a map data memory storing position and attribute information on map display components which include roads and names of places;

an input unit which inputs display reference point position coordinates and viewing line directional angle by which the position and direction of displayed map are derived;

a displayed region determining block which determines a region which is to be displayed on a screen in accordance with information issued from said input unit;

an altitude changing region determining block which determines a changing region in the displayed region in accordance with a certain rule which is determined with reference to the display reference point and the viewing line directional angle;

a topographical geometric modeling block which reads from said topographical data memory a topographical geometric data of sampling points within the displayed region determined by said displayed-region determining block and carries out modeling of the topographical geometry by processing said topographical geometric data;

a display reference point altitude determining block which determines an altitude value of the display reference point by processing both the information from said input unit and the information from said topographical geometric modeling block;

a topographical geometry altitude changing block which changes the altitude values of the sampling points to values similar to the altitude value of the display reference point, thereby to remodel the topographical geometry model;

a viewpoint coordinate determining block which determines a viewpoint coordinate by processing both the information from said input unit and the information from said display reference point altitude determining block;

a map component altitude determining block which reads from said map data memory a map display component within said displayed region and determines an altitude value of said map display component with reference to the remodeled topographical geometry derived by said topographical geometry altitude changing block, thereby to produce a display graphic data;

a coordinate transforming block which, based on both information from said viewpoint coordinate determining block and information from said input unit, applies a perspective-projection transformation to both information from said topographical geometric modeling block and information from said map component altitude determining block;

a drawing process block which produces a stereoscopic map image of the area within said displayed region by processing information from said coordinate transforming block; and an image display unit which actually displays said stereoscopic map image.

44. A navigation system comprising:

a topographical data memory storing a topographical data which provides topographical plane coordinates with altitude values of displayed components;

a map data memory storing position and attribute information on map display components which include roads and names of places;

an input unit which inputs display reference point position coordinates and viewing line directional angle by which the position and direction of displayed map are derived;

a displayed region determining block which determines a region displayed on a screen in accordance with information issued from said input unit;

an altitude changing region determining block which determines a changing region in the displayed region in accordance with a certain rule which is determined with reference to the display reference point and the viewing line directional angle;

a topographical geometric modeling block which reads from said topographical data memory a topographical geometric data on the displayed region determined by said displayed region determining block and carries out modeling of the topographical geometry by processing said topographical geometric data, said modeling block forming three-dimensional sampling point groups (x, y, z) by setting suitably distributed point groups in said displayed region and reading from the topographical data memory an altitude value "z" corresponding to a plane coordinate (x, y) of each point, and forming a polyhedral topographical geometry model by connecting the three-dimensional sampling groups with straight lines in accordance with a given rule;

a display reference point altitude determining block which determines an altitude value of the display reference point by processing both the information from said input unit and the information from said topographical geometric modeling block;

a viewpoint coordinate determining block which determines a viewpoint coordinate by processing both the information from said input unit and information from said display reference point altitude determining block;

a topographical geometry altitude changing block which changes the altitude values of the sampling points to values similar to the altitude value of the display reference point, thereby to remodel the topographical geometry model;

a map component altitude determining block which reads from said map data memory a map display component within said displayed region and determines an altitude value of said map display component with reference to the remodeled topographical geometry derived by said topographical geometry altitude changing block, thereby to produce a display graphic data;

a coordinate transforming block which, based on both information from said viewpoint coordinate determining block and information from said input unit, applies a perspective-projection transformation to both information from said topographical geometric modeling block and information from said map component altitude determining block;

a topographical geometry drawing process block which draws the polyhedral topographical geometry, which has been subjected to said perspective-projection transformation by said coordinate transforming block, in order from the depth in an overwriting manner thereby to output a stereoscopic map image;

a map component altitude comparing block which compares the altitude value of the display position of each map display component determined by the map component altitude determining block with the altitude value of a corresponding portion of the topographical geometry;

a map component drawing process block which, based on the result of the comparison by said map component altitude comparing block, overwrites on said topographical geometry the map display component whose altitude value is equal to and greater than the altitude value of the corresponding portion of the topographical geometry; and an image display unit which couples the stereoscopic map image produced by said topographical geometry drawing process block and the map component image produced by said map component drawing process block and displays the coupled image.

45. A navigation system comprising:

a topographical data memory storing a topographical data which provides topographical plane coordinates with altitude values of displayed components;

a line-figured data memory storing position and attribute information on map display components which include roads, rivers and railways;

a place name and background data memory which stores position and attribute information on map display components which include a character train such as place name and position and attribute information on map display components which include a background which can be represented in image by a polygon or surface graphic;

an input unit which inputs display reference point position coordinates and viewing line directional angle by which the position and direction of displayed map are derived;

a displayed region determining block which determines a region displayed on a screen in accordance with information issued from said input unit;

an altitude changing region determining block which determines a changing region in the displayed region in accordance with a certain rule which is determined with reference to the display reference point and the viewing line directional angle;

a topographical geometric modeling block which reads from said topographical data memory a topographical geometric data on the displayed region determined by said displayed region determining block and carries out modeling of the topographical geometry by processing said topographical geometric data, said modeling block forming three-dimensional sampling point groups (x, y, z) by setting suitably distributed point groups in said displayed region and reading from the topographical data memory an altitude value "z" corresponding to a plane coordinate (x, y) of each point, and forming a polyhedral topographical geometry model by connecting the three-dimensional sampling groups with straight lines in accordance with a given rule;

a display reference point altitude determining block which determines an altitude value of the display reference point by processing both the information from said input unit and the information from said topographical geometric modeling block;

a topographical geometry altitude changing block which changes the altitude values of the sampling points to values similar to the altitude value of the display reference point, thereby to remodel the topographical geometry model;

a viewpoint coordinate determining block which determines a viewpoint coordinate by processing both the information from said input unit and information from said display reference point altitude determining block;

a map component altitude determining block which reads from said line-figured data memory a line-figured data within said displayed region, and reads from said place name and background data memory said place name and background data and determines an altitude value of each of said line-figured map component and the position of said place name with reference to the remodeled topographical geometry derived by said topographical geometry altitude changing block, thereby to produce a display graphic data;

a coordinate transforming block which, based on both information from said viewpoint coordinate determining block and information from said input unit, applies a perspective-projection transformation to both information from said topographical geometric modeling block and information from said map component altitude determining block;

a hidden surface removing drawing block which carries out a drawing for the topographical geometry data and the place name and background data while effecting a hidden surface removing processing, said topographical geometry data and the place name and background data having been subjected to the perceptive-projection transformation;

a line-figured data altitude comparing block which compares the altitude value of an end of each link of the line-figured data determined by said map component altitude determining block with the altitude value of a corresponding portion of the topographical geometry;

a line-figured data drawing process block which, based on a result of the comparison by said line-figured data altitude comparing block, overwrites on the topographical geometry the line-figured map component when the altitude value of the end of the link of the line-figured component is equal to or greater than the altitude value of the corresponding portion of the topographical geometry; and an image display unit which couples the stereoscopic map image from said drawing process block and the line-figured image from said line-figured data drawing process block and displays the coupled image.

46. A navigation system comprising:

a topographical data memory storing a topographical data which provides topographical plane coordinates with altitude values of displayed components;

a map data memory storing position and attribute information on map display components which include roads and names of places;

an input unit which inputs display reference point position coordinates and viewing line directional angle by which the position and direction of displayed map are derived;

a displayed region determining block which determines a region which is to be displayed on a screen in accordance with information issued from said input unit;

a plane/stereoscopic display part determining block which determines in the displayed region a first part which is to be displayed in a plane manner and a second part which is to be displayed in a stereoscopic manner, the determination being made in accordance with a given rule determined with reference to the display reference point and the viewing line directional angle;

a topographical geometric modeling block which reads from said topographical data memory a topographical geometric data of sampling points within the displayed region determined by said displayed region determining block and carries out modeling of the topographical geometry by processing said topographical geometric data;

a display reference point altitude determining block which determines an altitude value of the display reference point by processing both the information from said input unit and the information from said topographical geometric modeling block;

a viewpoint coordinate determining block which determines a viewpoint coordinate by processing both the information from said input unit and the information from said display reference point altitude determining block;

a map component altitude determining block which reads from said map data memory a map display component which is to be displayed in said second part and determines an altitude value of the map display component with reference to said topographical geometric model derived by said topographical geometric modeling block, thereby to produce a stereoscopic display graphic data;

an altitude setting block which reads from said map data memory a map display component which is to be displayed in said first part and determines the altitude value of the map display component to a value substantially equal to the display reference point altitude value determined by said display reference point altitude determining block, thereby to produce a plane display graphic data;

a coordinate transforming block which, based on both information from said viewpoint coordinate determining block and information from said input unit, applies a perspective-projection transformation to both said topographical geometric model and said stereoscopic display graphic data;

a stereoscopic map drawing process block which, based on the data subjected to the perspective-projection transformation by said coordinate transforming block, draws a stereoscopic map image within the displayed region;

a plane perspective-projection drawing process block which, based on said plane display graphic data, draws a plane perspective-projection image which is to overwritten on the image drawn by said stereoscopic map drawing process block; and an image display unit which displays both said stereoscopic map image drawn by said stereoscopic map drawing process block and the plane perspective-projection image drawn by said plane perspective-projection drawing process block.

47. A memorizing medium memorizing a navigation program Including the steps of:

(a) determining a displayed region based on a position coordinate of a display reference point and a viewing line directional angle data;

(b) determining an altitude changing region in said displayed region in accordance with a given rule determined with reference to said position coordinate of the display reference point and said viewing line direction angle data;

(c) reading a topographical geometric data within said displayed region to carry out modeling of the topographical geometry;

(d) determining an altitude value with reference to the position coordinate of the display reference point and said topographical geometric model;

(e) determining a viewpoint coordinate for a transparent-projection transformation with reference to the position coordinate of said display reference point, said viewing line directional angle and the altitude value of said display reference point;

(f) determining sampling points within the altitude changing region and changing the altitude values of the sampling points to values similar to the altitude value of the display reference point, thereby to remodel the topographical geometry model;

(g) reading a map display component within said displayed region and determining an altitude value of said map display component with reference to the remodeled topographical geometry, thereby to produce a display graphic data;

(h) applying the perspective-projection transformation to both said remodeled topographical geometry model and the map display component whose altitude value has been determined; and (i) producing a stereoscopic map image from the data to which said transparent-projection transformation has been applied.

48. A memorizing medium memorizing a navigation program including the steps of:

(a) determining a displayed region based on a position coordinate of a display reference point and a viewing line directional angle data;
(b) setting in said displayed region a group of sampling points having a given density, producing a group of three-dimensional sampling points (x, y, z) by deriving an altitude value (z) corresponding to a plane coordinate (x, y) of each sampling point, and producing a polyhedral topographical geometry model by connecting the three-dimensional sampling points with straight lines in accordance with a given rule;
(c) determining an altitude value of the display reference point with reference to said position coordinate of the display reference point and said topographical geometry model;
(d) determining a viewpoint coordinate for a perspective-projection transformation, with reference to the position coordinate of the display reference point, said viewing line directional angle and the altitude value of said display reference point;
(e) determining in said displayed region an altitude changing region, in accordance with a given rule determined with reference to the position coordinate of the display reference point and said viewing angle directional angle;
(f) changing the altitude values of said sampling points to values similar to the altitude value of the display reference point, thereby to remodel the topographical geometry model;
(g) reading a map display component within said displayed region and determining an altitude value of said map display component with reference to the remodeled topographical geometry, thereby to produce a display graphic data;
(h) applying the perspective-projection transformation to both said remodeled topographical geometry model and the map display component whose altitude value has been determined; and
(i) comparing the altitude value of the display position of each map display component with the altitude value of a corresponding portion of the topographical geometry, and based on the result of the comparison, overwriting on said topographical geometry the map display component whose altitude value is equal to and greater than the altitude value of the corresponding portion of the topographical geometry.

49. A memorizing medium memorizing a navigation program Including the steps of:
(a) determining a displayed region based on a position coordinate of a display reference point and a viewing line directional angle data;
(b) determining in the displayed region a first part which is to be displayed in a plane manner and second part which is to be displayed in a stereoscopic manner, the determination being made in accordance with a given rule determined with reference to the display reference point and the viewing line directional angle;
(c) reading a topographical geometric data of sampling points within said displayed region and carrying out modeling of the topographical geometry by using said geometric data;
(d) determining a viewpoint coordinate for a perspective-projection transformation, with reference to the position coordinate of the display reference point, the viewing line directional angle and the altitude value of the display reference point;
(e) reading a map display component which is to be displayed in said second part and determining an altitude value of the map display component with reference to topographical geometric model, thereby to produce a stereoscopic display graphic data;
(f) reading a map display component which is to be displayed in said first part and determining an altitude of the map display component to a value substantially equal to the display reference point altitude value, thereby to produce a plane display graphic data;
(g) based on the viewpoint coordinate and the viewing line directional angle, applying the perspective-projection transformation to both said topographical geometric model and said stereoscopic display graphic data;
(h) based on the data which has been subjected to the perspective-projection transformation, drawing a stereoscopic map image with said displayed region; and
(i) based on said plane display graphic data, drawing a plane perspective-projection image and overwriting said image on the stereoscopic map image.

* * * * *